(12) United States Patent
Penland, Jr. et al.

(10) Patent No.: US 10,895,044 B2
(45) Date of Patent: *Jan. 19, 2021

(54) LIGHTWEIGHT UNIVERSAL PANEL MAT

(71) Applicant: QUALITY MAT COMPANY, Beaumont, TX (US)

(72) Inventors: Joe Penland, Jr., Beaumont, TX (US); Scott Calvert, Beaumont, TX (US); Don Couvillon, Beaumont, TX (US)

(73) Assignee: QUALITY MAT COMPANY, Beaumont, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/309,096

(22) PCT Filed: Jul. 27, 2017

(86) PCT No.: PCT/US2017/044137
§ 371 (c)(1),
(2) Date: Dec. 11, 2018

(87) PCT Pub. No.: WO2018/022860
PCT Pub. Date: Feb. 1, 2018

(65) Prior Publication Data
US 2019/0119863 A1    Apr. 25, 2019

Related U.S. Application Data

(60) Provisional application No. 62/368,954, filed on Jul. 29, 2016, provisional application No. 62/402,391, (Continued)

(51) Int. Cl.
*E01C 9/08* (2006.01)
*E01C 5/00* (2006.01)
(Continued)

(52) U.S. Cl.
CPC ............ *E01C 9/086* (2013.01); *B32B 3/06* (2013.01); *B32B 3/266* (2013.01); *B32B 3/30* (2013.01);
(Continued)

(58) Field of Classification Search
CPC .......... E01C 5/001; E01C 3/006; E01C 9/004; E01C 9/08; E01C 5/18; E01C 5/20;
(Continued)

(56) References Cited

U.S. PATENT DOCUMENTS 1,935,823 A    11/1933   Turner
2,819,026 A    1/1958    Leyendecker
(Continued)

FOREIGN PATENT DOCUMENTS

EP    2 733 261 A2    5/2014
WO    03/023145 A1    3/2003
WO    2014/068087 A1   5/2014

OTHER PUBLICATIONS

Introduction to the Mat System, Technical Bulletin, DURA-BASE Composite Mat System, vol. 5, No. 1, 2 pgs. (undated).
(Continued)

*Primary Examiner* — Abigail A Risic
(74) *Attorney, Agent, or Firm* — Winston & Strawn LLP

(57) ABSTRACT

A lightweight universal panel mat (100, 400, 500, 600, 700, 800, 1100, 1500, 1800, 2005, 2010, 2015, 2020) made of plastic or elastomeric material and having a first section that provides a relatively flat, textured or structured top surface to facilitate movement over the mat and a second section having geometry that includes a plurality of cells having top surfaces that support the first section. The panel mats have first, second, third and fourth sides (110,120,135,145) that are configured to matingly engage or connect to the second, third, fourth and first sides, respectively. The connection can
(Continued)

be by insertion or snap-locking of one side to another, or by the use of fastening elements that more securely holds the sides together. Thus, similarly configured panel mats can be connected by interlocking to form a temporary support surface, deck, walkway or roadway. Additional side ramps (2030) and adapters (2050) can be used to facilitate installation of the mats (2005, 2010, 2015, 2020) and access to the upper surfaces of the joined mats.

16 Claims, 53 Drawing Sheets

Related U.S. Application Data filed on Sep. 30, 2016, provisional application No. 62/402,404, filed on Sep. 30, 2016.

(51) Int. Cl.

| | | |
|---|---|---|
| *E01C 11/22* | (2006.01) | |
| *E01C 13/04* | (2006.01) | |
| *E04F 11/00* | (2006.01) | |
| *E04F 15/02* | (2006.01) | |
| *E04F 15/10* | (2006.01) | |
| *E04F 19/06* | (2006.01) | |
| *H02G 9/02* | (2006.01) | |
| *E01C 5/18* | (2006.01) | |
| *E01C 5/20* | (2006.01) | |
| *B32B 3/06* | (2006.01) | |
| *B32B 3/26* | (2006.01) | |
| *B32B 3/30* | (2006.01) | |
| *B32B 27/08* | (2006.01) | |
| *E04B 5/02* | (2006.01) | |

(52) U.S. Cl.
CPC .............. *B32B 27/08* (2013.01); *E01C 5/005* (2013.01); *E01C 5/18* (2013.01); *E01C 5/20* (2013.01); *E01C 11/222* (2013.01); *E01C 13/045* (2013.01); *E04F 11/002* (2013.01); *E04F 15/02038* (2013.01); *E04F 15/02161* (2013.01); *E04F 15/02172* (2013.01); *E04F 15/02183* (2013.01); *E04F 15/02194* (2013.01); *E04F 15/105* (2013.01); *E04F 15/107* (2013.01); *E04F 19/061* (2013.01); *H02G 9/025* (2013.01); *B32B 2419/04* (2013.01); *E01C 2201/12* (2013.01); *E01C 2201/16* (2013.01); *E04B 5/023* (2013.01); *E04B 5/026* (2013.01); *E04F 2201/021* (2013.01); *E04F 2201/042* (2013.01); *E04F 2201/043* (2013.01); *E04F 2201/0505* (2013.01)

(58) Field of Classification Search
CPC ... E01C 9/086; E01C 2201/14; E02D 29/124; E02D 17/20
See application file for complete search history.

(56) References Cited

U.S. PATENT DOCUMENTS

| | | |
|---|---|---|
| 3,603,221 A | 9/1971 | Barton et al. |
| 3,909,996 A | 10/1975 | Ettlinger, Jr. et al. |
| 4,440,818 A | 4/1984 | Buchan et al. |
| 4,462,712 A | 7/1984 | Penland, Sr. |
| 4,600,336 A | 7/1986 | Waller, Jr. |
| 4,600,337 A | 7/1986 | Sarver |
| 4,840,825 A | 6/1989 | Kristodimou |
| 4,875,800 A | 10/1989 | Hicks |
| 4,889,444 A | 12/1989 | Pouyer |
| 4,896,993 A | 1/1990 | Bohnhoff |
| 4,973,193 A | 11/1990 | Watson et al. |
| 5,020,937 A | 6/1991 | Pouyer |
| 5,032,037 A | 7/1991 | Phillips et al. |
| 5,087,149 A | 2/1992 | Waller, Jr. |
| 5,163,776 A | 11/1992 | Pouyer |
| 5,201,601 A | 4/1993 | Stanley et al. |
| 5,273,373 A | 12/1993 | Pouyer |
| 5,316,408 A | 5/1994 | Stanley et al. |
| 5,364,204 A | 11/1994 | MacLeod |
| 5,527,128 A | 6/1996 | Rope et al. |
| 5,653,551 A | 8/1997 | Seaux |
| 5,787,654 A | 8/1998 | Drost |
| 5,822,944 A | 10/1998 | Penland, Sr. |
| 6,089,784 A | 7/2000 | Arden |
| 6,474,905 B1 | 11/2002 | Smith, Jr. et al. |
| 6,511,257 B1 | 1/2003 | Seaux et al. |
| 6,612,776 B1 | 9/2003 | Jansson |
| 6,652,183 B2 | 11/2003 | Stasiewich et al. |
| 6,662,508 B1 | 12/2003 | Else |
| 6,695,527 B2 | 2/2004 | Seaux et al. |
| 6,945,732 B2 | 9/2005 | Renick |
| 6,966,155 B2 | 11/2005 | Nevison |
| 7,114,298 B2 | 10/2006 | Kotler |
| 7,162,838 B2 | 1/2007 | Arden |
| 7,303,800 B2 | 12/2007 | Rogers |
| 7,340,865 B2 | 3/2008 | Vanderhoef |
| 7,413,374 B2 | 8/2008 | Rogers et al. |
| 7,516,587 B2 | 4/2009 | Barlow |
| 7,571,572 B2 | 8/2009 | Moller, Jr. |
| 7,607,265 B2 | 10/2009 | Curry et al. |
| 7,690,160 B2 | 4/2010 | Moller, Jr. |
| 7,793,471 B2 | 9/2010 | Hill |
| 8,071,186 B1 | 12/2011 | Quimby |
| D667,114 S | 9/2012 | Else |
| D667,144 S * | 9/2012 | Else ........................... D25/158 |
| 8,288,652 B2 | 10/2012 | Lubanski |
| 8,341,896 B2 | 1/2013 | Moller, Jr. et al. |
| 8,407,951 B2 | 4/2013 | Haney et al. |
| 8,919,054 B2 | 12/2014 | Tillery et al. |
| 8,936,374 B1 | 1/2015 | Royse |
| 8,955,278 B1 | 2/2015 | Mills |
| 9,133,628 B2 | 9/2015 | Moller, Jr. et al. |
| 9,249,570 B2 | 2/2016 | Jean |
| 9,315,949 B1 | 4/2016 | Penland, Jr. et al. |
| 9,337,586 B2 | 5/2016 | McDowell et al. |
| 9,506,255 B1 | 11/2016 | Jones et al. |
| 9,617,698 B1 | 4/2017 | Stiles |
| 9,631,375 B1 | 4/2017 | Barlow |
| D794,225 S | 8/2017 | Jean et al. |
| 2002/0110418 A1 | 8/2002 | Renick |
| 2004/0005430 A1 | 1/2004 | Rogers |
| 2005/0108968 A1 | 5/2005 | Forster |
| 2005/0224690 A1 | 10/2005 | Hobbs |
| 2005/0252109 A1 | 11/2005 | Fuccella et al. |
| 2005/0284704 A1 | 12/2005 | Hernandez, Jr. |
| 2006/0265987 A1 | 11/2006 | Iannone |
| 2006/0272252 A1 | 12/2006 | Moller, Jr. |
| 2006/0286341 A1 | 12/2006 | Fowler |
| 2007/0042828 A1 | 2/2007 | Krushke, Jr. et al. |
| 2007/0102243 A1 | 5/2007 | Ruminski |
| 2007/0266669 A1 | 11/2007 | Rapaz |
| 2008/0292397 A1 | 11/2008 | Farney et al. |
| 2009/0087261 A1 | 4/2009 | Fournier |
| 2009/0094918 A1 | 4/2009 | Murphy et al. |
| 2013/0276399 A1 | 10/2013 | Rapaz |
| 2013/0287493 A1 | 10/2013 | Rusch et al. |
| 2013/0291457 A1 | 11/2013 | Tillery et al. |
| 2014/0137505 A1 | 5/2014 | Jean |
| 2014/0270945 A1 | 9/2014 | Bach et al. |
| 2015/0029040 A1 | 1/2015 | McDowell et al. |
| 2015/0266669 A1 | 9/2015 | McDowell |
| 2016/0312413 A1 | 10/2016 | Malmquist |
| 2016/0340911 A1 | 11/2016 | Jean |
| 2017/0081862 A1 | 3/2017 | Gucbilmez |

(56) References Cited

U.S. PATENT DOCUMENTS

2017/0241084 A1 8/2017 Else et al.
2018/0044861 A1 2/2018 Stiles

OTHER PUBLICATIONS

Composite Mat Solutions, Newpark Resources Incorporated, 1 pg., retrieved on Jun. 22, 2006. http://www.newpark.com/dynamic.php?pg=Top/Composite.
DURA-BASE Mats "Fit the Bill" for Operations in Marsh Location, SOLOCO Oilfield & Environmental Contractor, a Newpark Company, 3 pgs., retrieved on Jun. 22, 2006. http://www.solocllc.com/solco_news-detail.php?article_id=17.
BRAVO Mat System, 3 pgs., retrieved on Jun. 22, 2006. http://www.compositemat.com/products-bravo-facts_and_features.php.
The Function of Fasteners and Their Proper Use, Technical Bulletin, DURA-BASE Composite Mat System, vol. 4, No. 3, 3 pgs. (undated).
Bravo Mat Line is the Answer, 1 pg., retrieved on Jun. 22, 2006. http://www.compositemat.com/products-bravo-specifications.php.
DURA-BASE, Installation & Handling, 2 pgs., retrieved on Jun. 22, 2006. http://www.compositemat.com/products-durabase-installation_and_handling.php.
Mold-Base System, Protect Your Assets, 1 pg., retrieved on Jun 22, 2006 http://www.compositemat.com/images/page_blocks/CMS_moldbase_logo.jpg.
DURA-BASE, Your Extreme Environment Access Solution, 2 pgs., retrieved on Jun. 22, 2006. http://www.compositemat.com/products-durabase-facts_and_features.php.
DURA-BASE, Measurements, 1 pg., retrieved on Jun. 22, 2006. http://www.compositemat.com/products-durabase-specifications.php.
DURA-BASE, Your Extreme Environment Access Solution, 1 pg., retrieved on Jun. 22, 2006. http://www.compositemat.com/products-durabase.php.
Composite mat image, 1 pg., retrieved on Jun. 22, 2006. http://www.compositemat.com/images/page_blocks/body-sample-bravo_05_10_25_19_22.
International Search Report and Written Opinion, Appl. No. PCT/US2017/044137, dated Nov. 2, 2017.
International Search Report and Written Opinion, Appl. No. PCT/US2017/044157, dated Nov. 29, 2017.
U.S. Appl. No. 15/661,316, Non-Final Rejection, dated Mar. 7, 2018.
U.S. Appl. No. 15/661,400, Non-Final Rejection, dated Mar. 7, 2018.
U.S. Appl. No. 15/661,400, Notice of Allowance, dated Sep. 20, 2018.
U.S. Appl. No. 15/661,400, Corrected Notice of Allowability, dated Oct. 17, 2018.

* cited by examiner

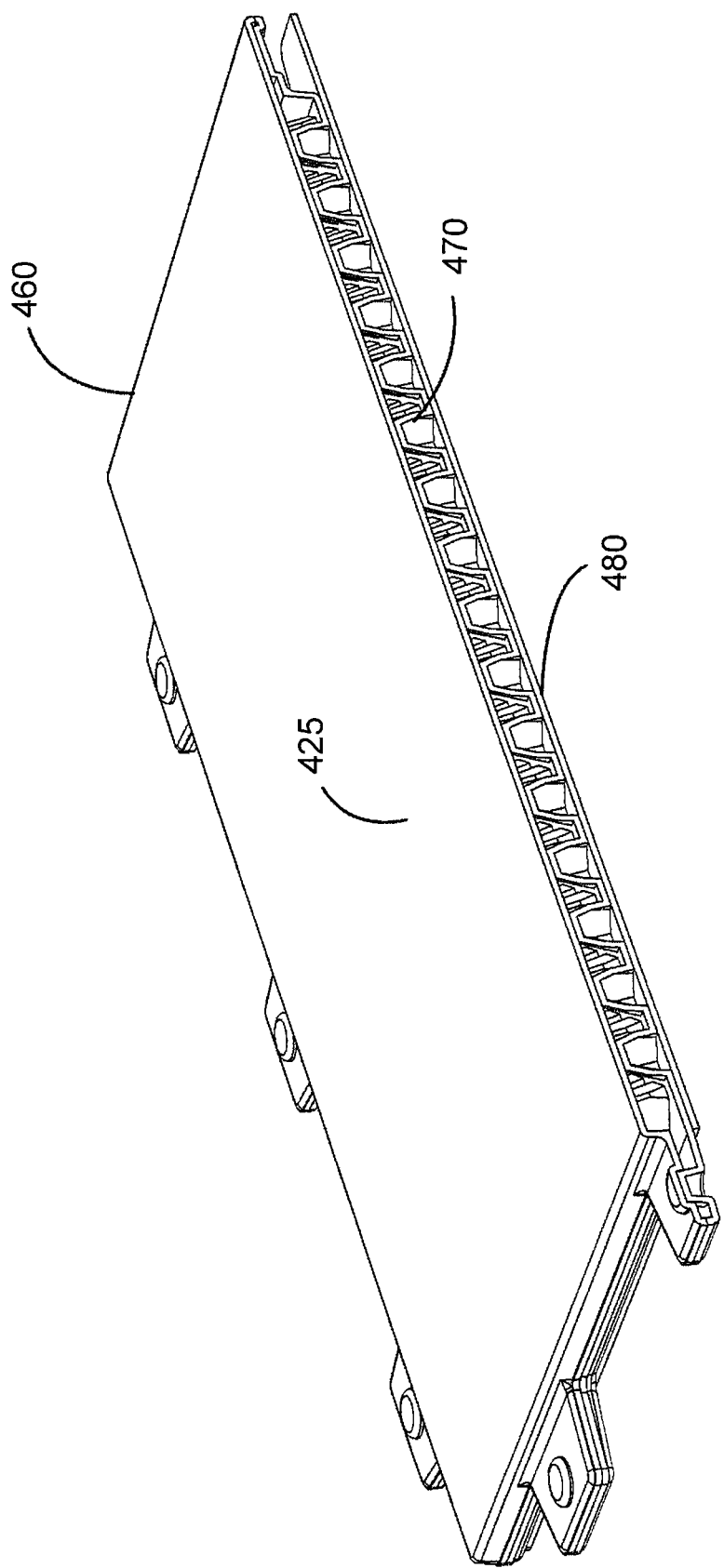
FIG. 12-A

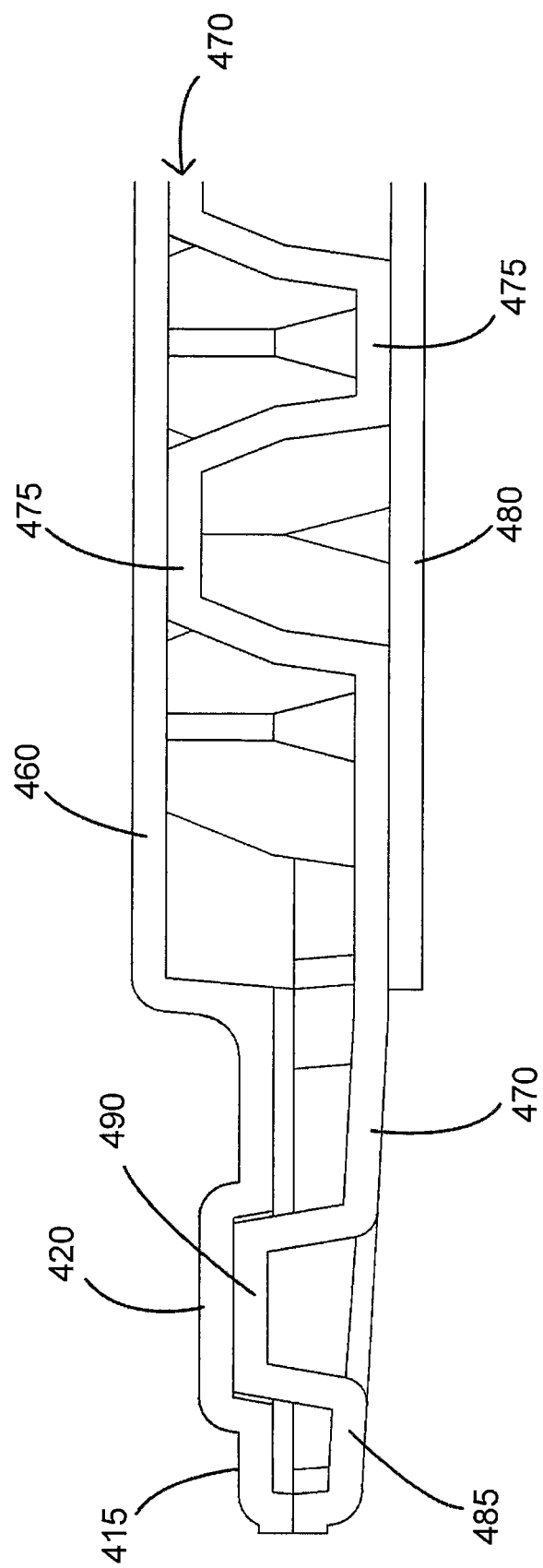
FIG. 12-B

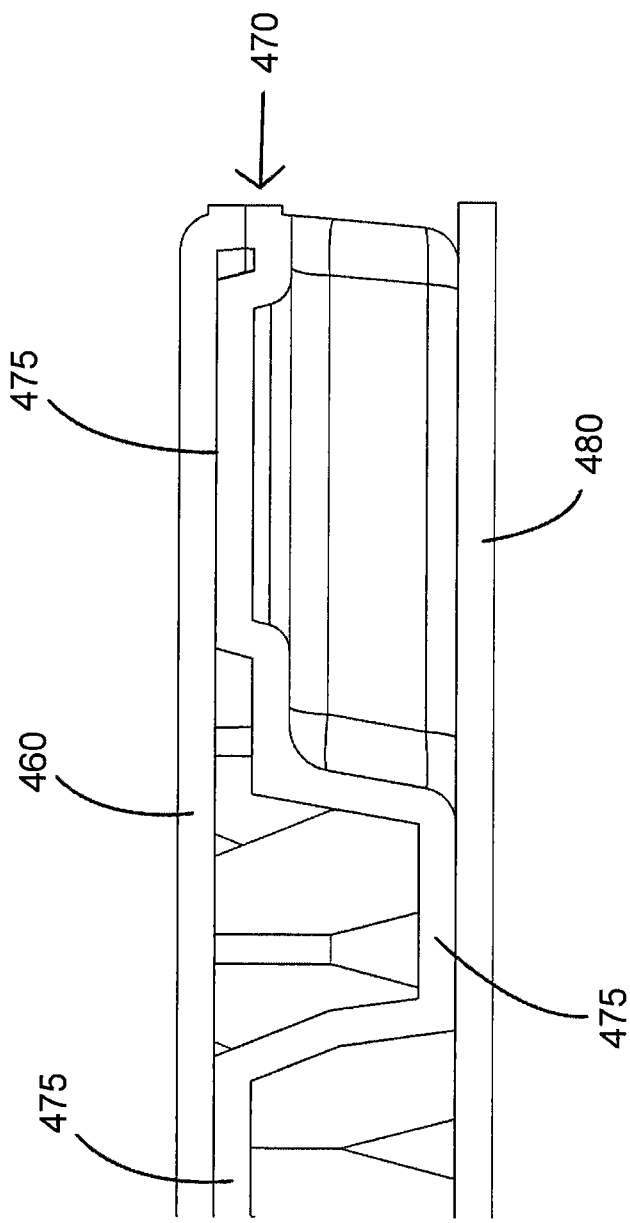
FIG. 12-C

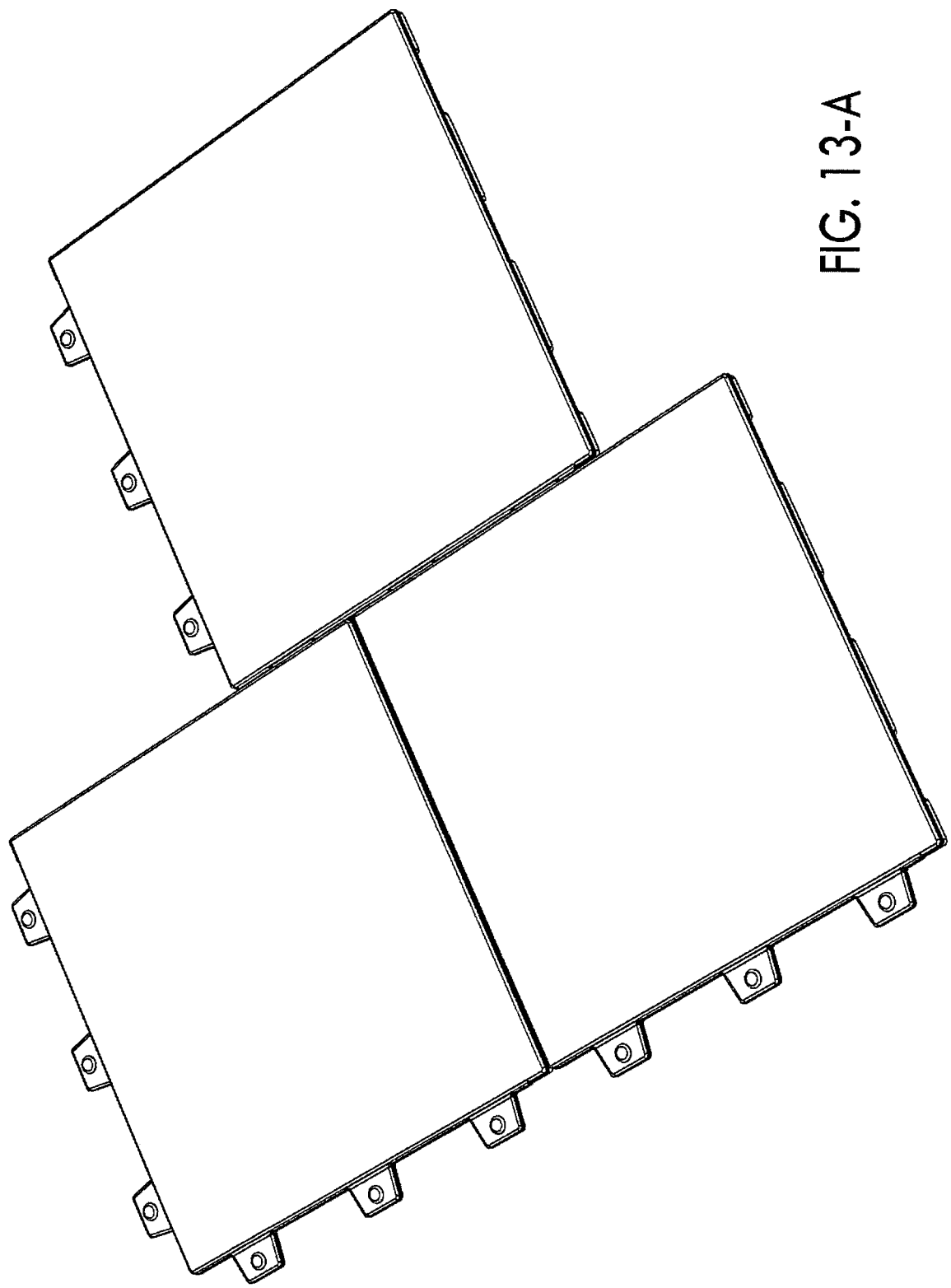
FIG. 13-A

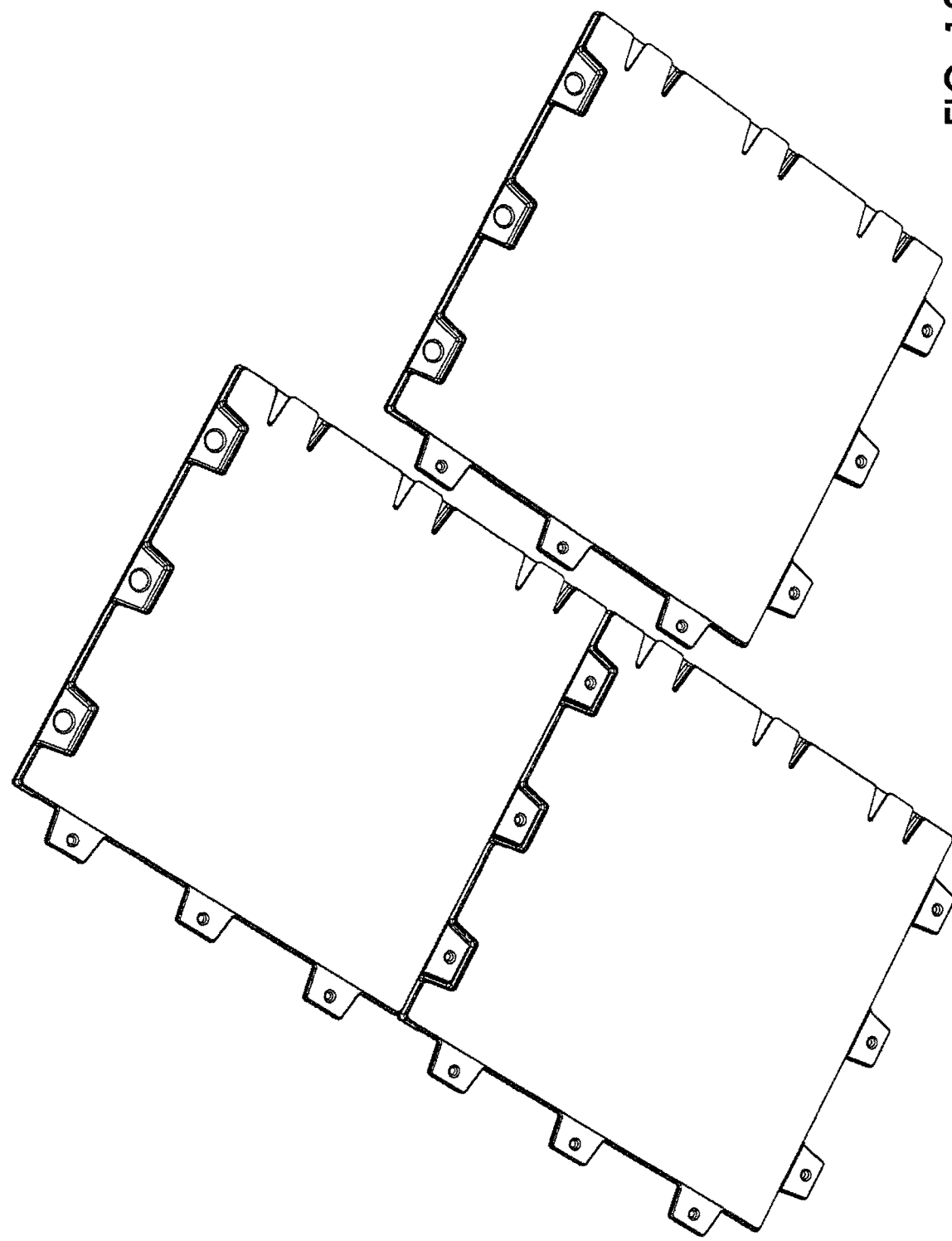
FIG. 13-B

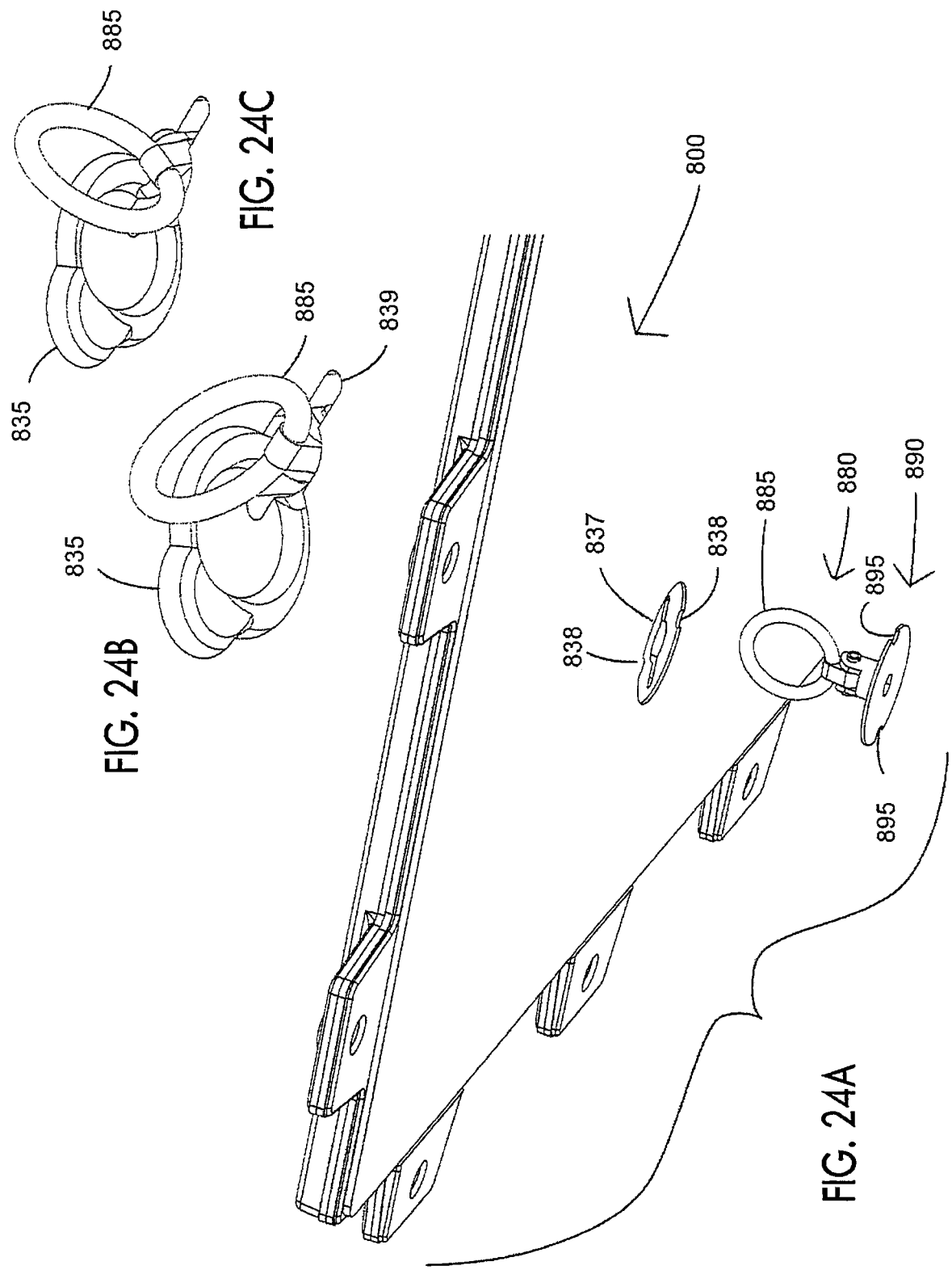

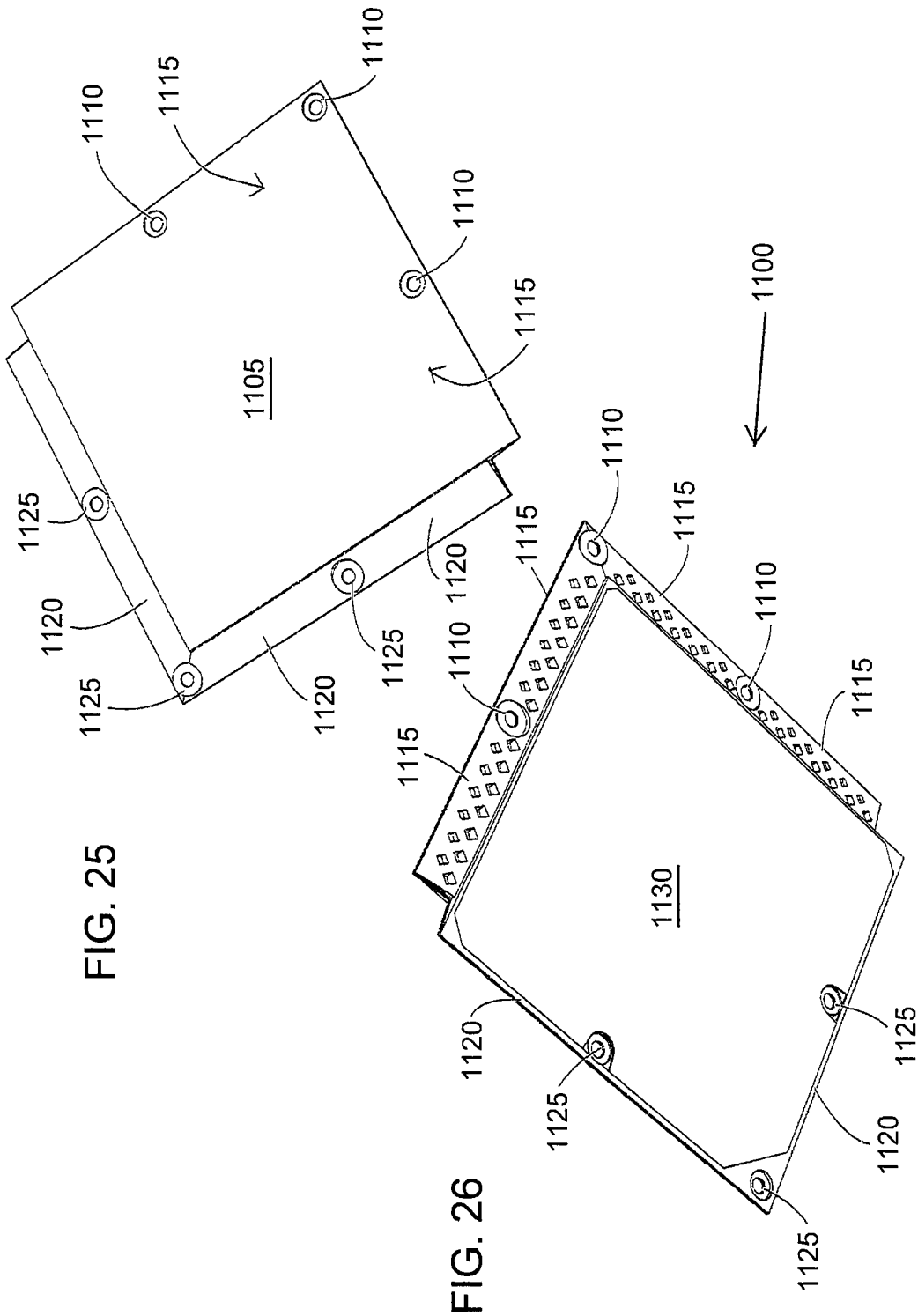

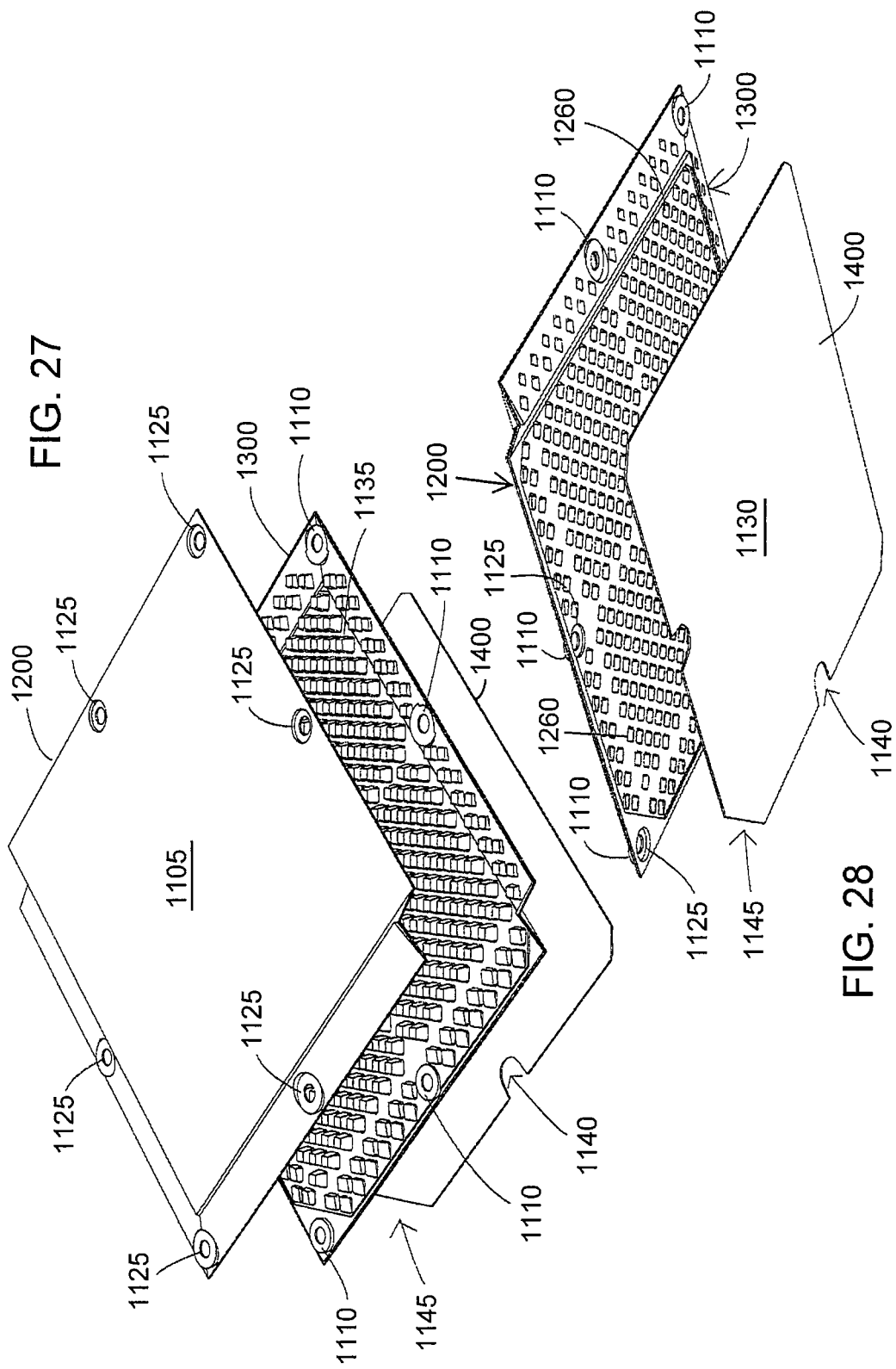

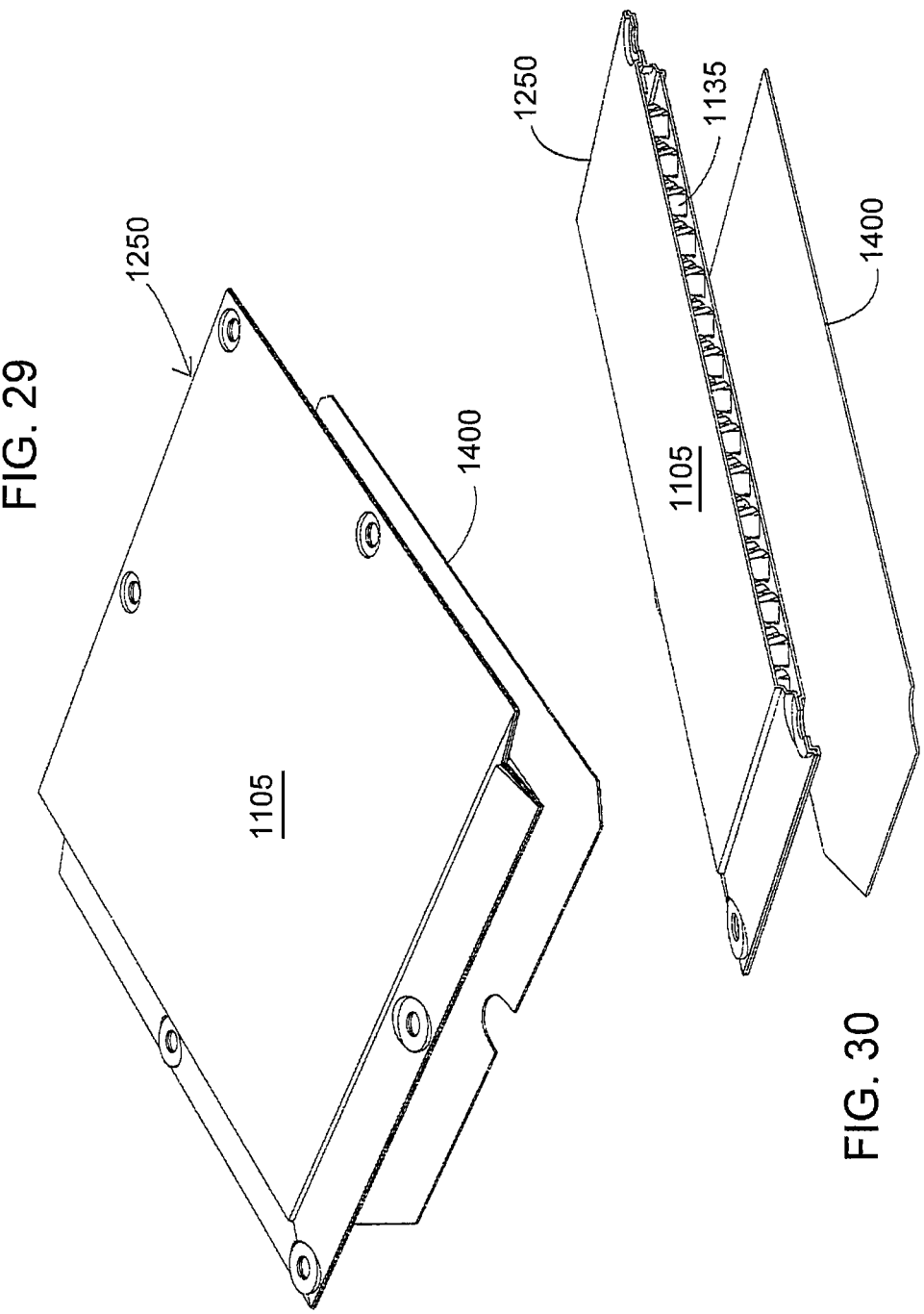

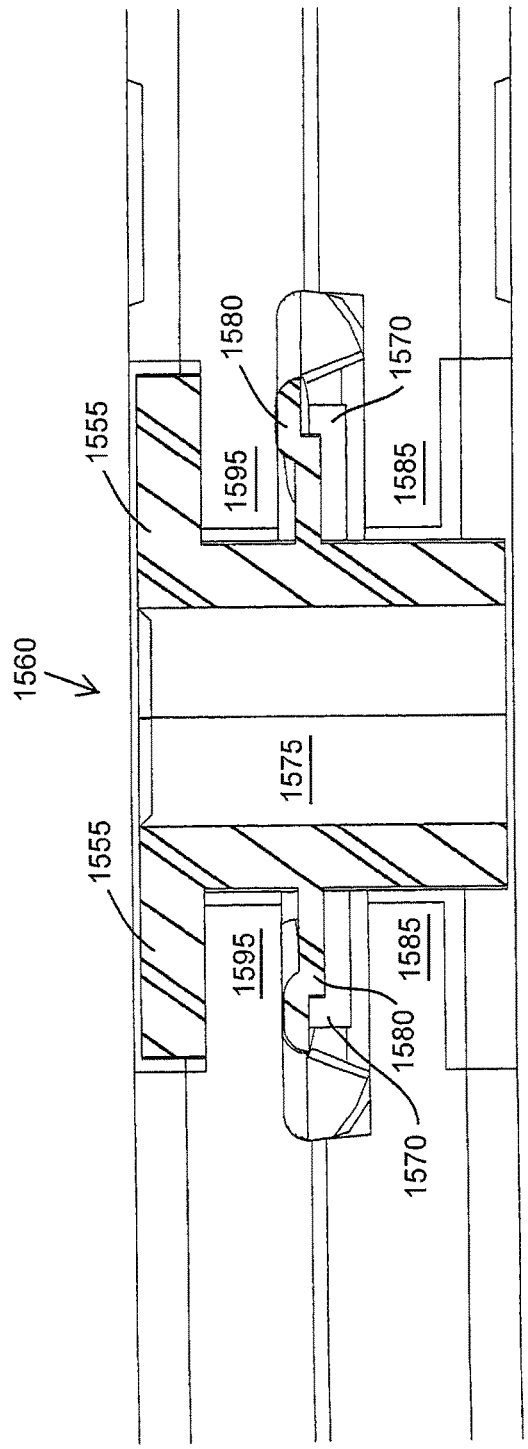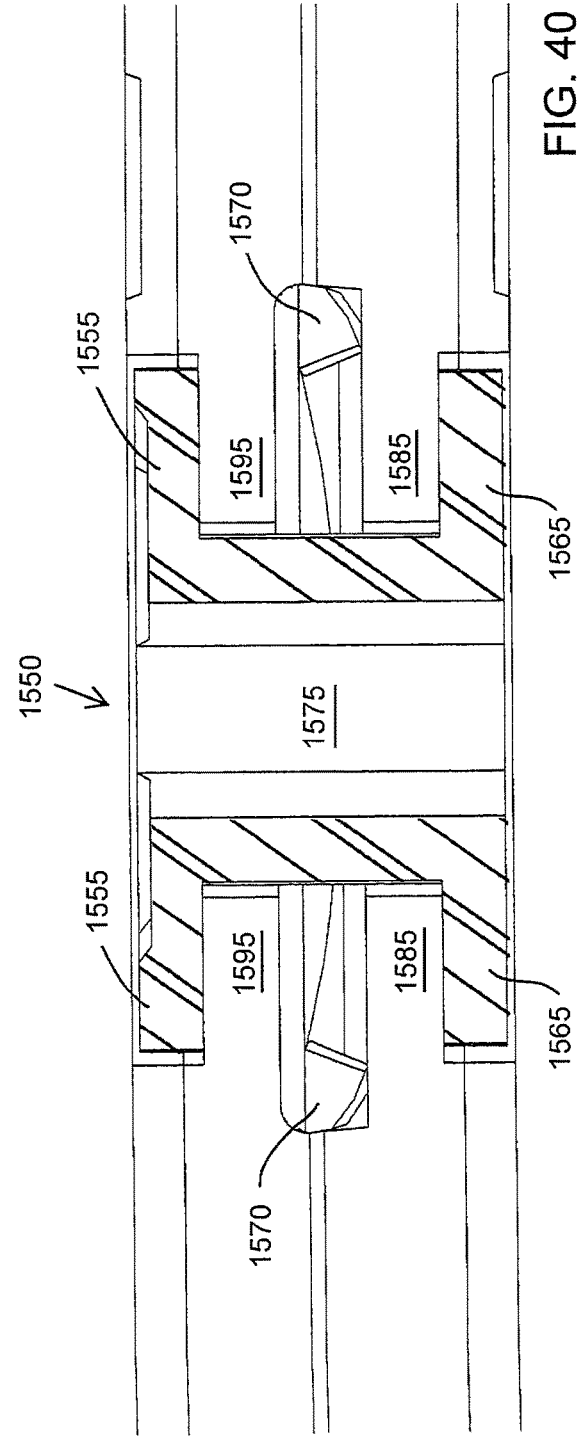

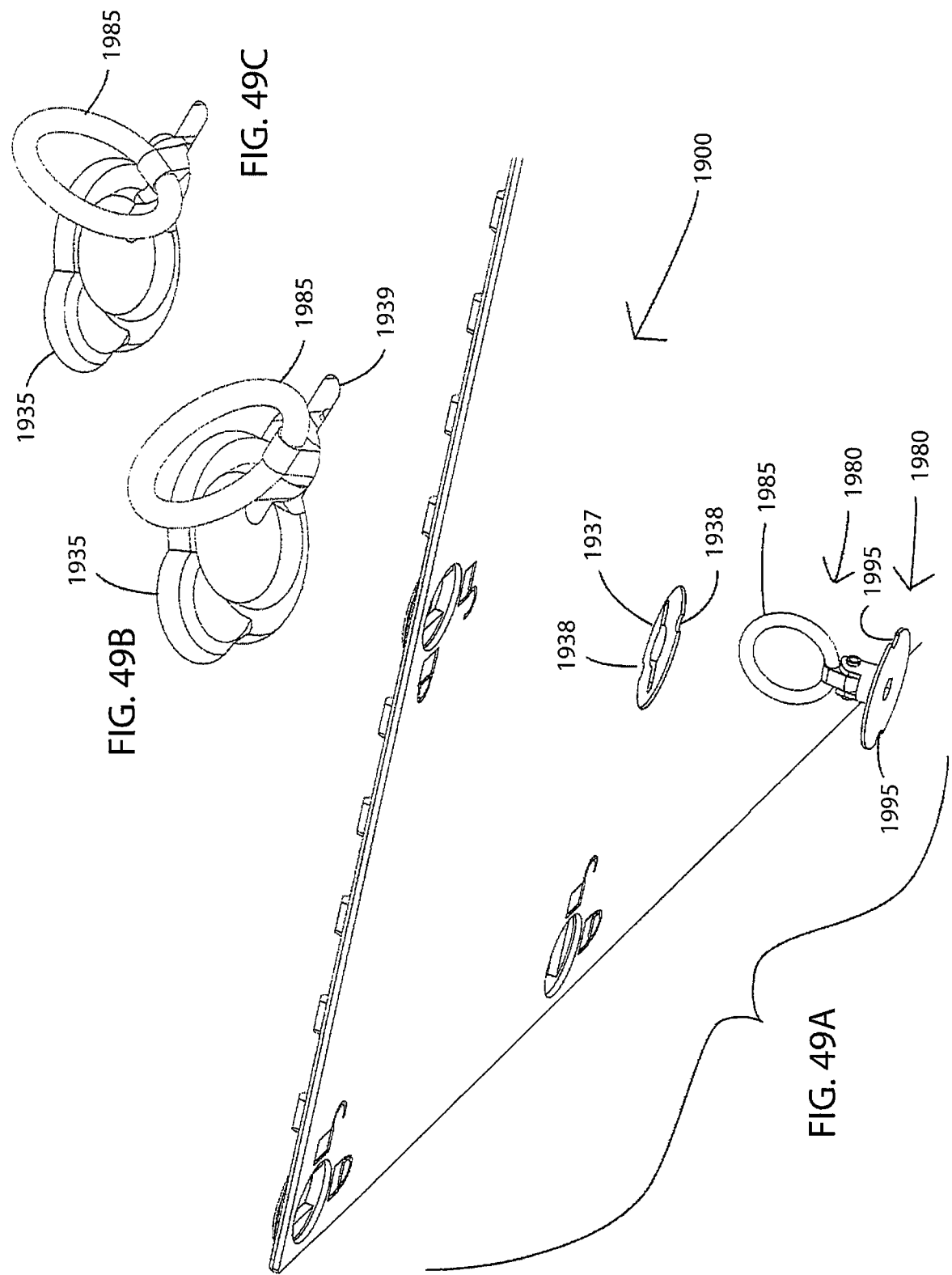

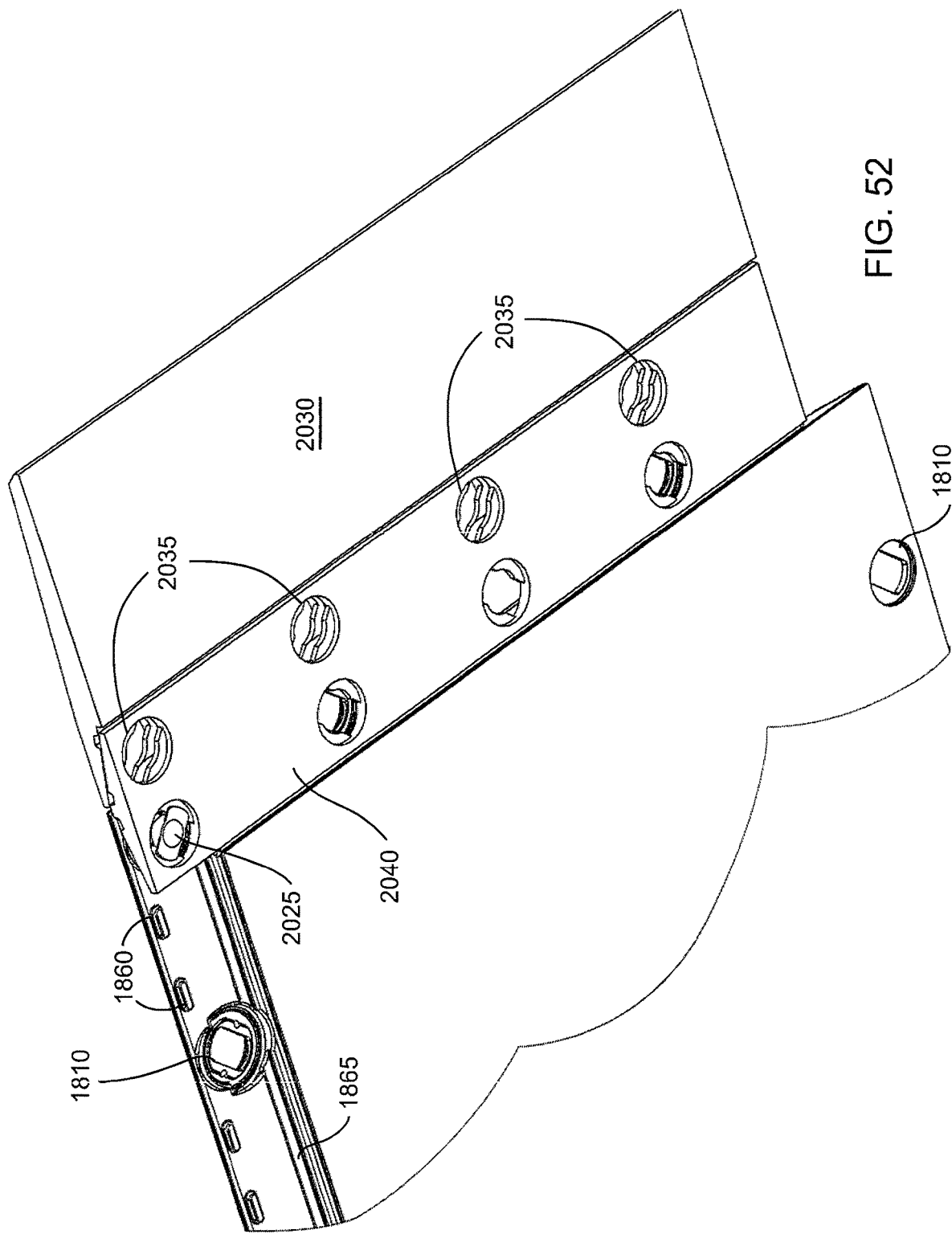

LIGHTWEIGHT UNIVERSAL PANEL MAT

CROSS-REFERENCE TO RELATED APPLICATIONS

This application is a 371 filing of International Patent Application PCT/US2017/044137 filed Jul. 27, 2017, which claims the benefit of US applications nos. 62/368,954 filed Jul. 29, 2016, 62/402,391 filed Sep. 30, 2016, and 62/402,404 filed Sep. 30, 2016.

BACKGROUND

The present invention relates to a reusable lightweight panel mat system for the construction of equipment support surfaces and temporary walkways and roadways in areas having poor ground integrity characteristics. More particularly, the present invention relates to a reusable system of durable panel mats which are much lighter than wood or wood/steel mats which can be quickly and easily positioned in a single layer to form equipment support surfaces, walkways or roadways and which can thereafter be easily removed and stored until needed again.

While conventional wood mats provide useful service at a reasonable cost, the wood core can deteriorate over time due to moisture causing gradual rotting and degradation of the wood material. This causes the mat to be discarded, because unlike some of the other materials that are used on the upper and lower layers of the mat, the core cannot be replaced without essentially making an entirely new mat.

Also, wood mats generally require heavy equipment for installation due their weight and bulk. Accordingly, alternatives to wood mats are needed for alternatives for wood mats that need to possess the necessary physical properties to be able to withstand harsh outdoor conditions as well as to support equipment. And of course cost is a factor in determining the selection of alternate materials, as it is not cost-effective to provide a mat that is multiple times more expensive than one that can be made of wood.

Thus, there is a need for improvement in these types of mat constructions both to provide longer service lives as well as to conserve natural resources and facilitate installation, and these needs are now satisfied by the panel mats of the present invention.

SUMMARY OF THE INVENTION

The invention now provides a lightweight universal panel mat made of plastic or elastomeric material having sides designed to be interlocked with the sides of additional panel mats of similar configurations. These panel mats have a first section having an upper surface that forms a top surface of the panel mat and is relatively flat, textured or structured to facilitate movement over the upper surface and a second section having geometry that includes a plurality of cells having a polygonal, circular or elliptical sidewall shape and that are either all open or where some or all of the cells have flat top surfaces that support the first section. The cells provide a plurality of open lower surfaces or if desired some or all of the cells can have closed bottom ends flat top surfaces. These panel mats have first, second, third and fourth sides wherein the first and second sides are configured and dimensioned to be complementary to and matable with the third and fourth sides, so that (a) the first side of a first mat can be interlocked with one of the third or fourth side of a second mat, (b) the second side of the first mat can be interlocked with one of the third or fourth sides of a second mat, (c) the third side of first mat can be interlocked with the one of the first or second sides of a third mat, and (d) the fourth side can be interlocked contact with the one of the first or second sides of a fourth mat. Additionally, the upper surface of the first section is generally rectangular of length L and width W where L and W each may be any value between 1 foot and 12 feet, and the first and second sections are welded or bonded together to form a unitary panel mat.

Advantageously, the first and second sides have protruding structures or extensions, while the third and fourth sides have receiving structures, openings or recesses, so that (a) the protrusions or extensions of the first side of the first mat are present within the receiving structures, openings or recesses of an adjacent mat, (b) the protrusions or extensions of the second side of the first mat are present in the receiving structures, openings or recesses of an adjacent mat, (c) the receiving structures, openings or recesses of the third side of the first mat receive the protrusions or extensions of an adjacent mat, and (d) the receiving structures, openings or recesses of the fourth side of the first mat receive the protrusions or extensions of an adjacent mat.

In one embodiment, the first, second, third and fourth sides of the panel mats have the following features: the first side is configured with a plurality of tabular extensions; the second side is located adjacent the first side and is configured with a plurality of tabular extensions; the third side is located opposite the first side and is configured with openings that are unobstructed and configured, dimensioned and arranged to receive therein the plurality of first side tabular extensions; and the fourth side is located opposite the second side and is configured with slots or recesses that are configured, dimensioned and arranged to receive therein the plurality of second side tabular extensions.

The tabular extensions on the first side, the second side or on both sides preferably include either a protruding bump or depression, and the openings, slots or recesses of the third or fourth sides have an upper surface that includes a corresponding depression or protruding bump that enables the respective tabular extensions to be snap-lockingly engaged together. Also, the tabular extensions and openings, slots or recesses can be formed on the first section, the second sections, or partially on each section. The upper surface of the first section is generally rectangular of length L and width W where L and W each may be any value between 1 foot and 16 feet; and the first and second sections are welded or bonded together to form a unitary panel mat.

The first and second sections may be parts of an integral component that is molded together or the tabular extensions, openings and slots or recesses can be milled or routered in a solid plastic or elastomeric component. If desired, these panel mats may include metal wire, bar or plate reinforcement located within the first and second sections.

In one embodiment, the first side is configured with at least three tabular extensions; the second side is configured with at least three tabular extensions each having a depression on an upper surface; the third side is located opposite the first side and is configured with openings that are unobstructed and configured, dimensioned and arranged to receive therein the first plurality of tabular extensions; and the fourth side is located opposite the second side and is configured with spaced slots or recesses that are configured, dimensioned and arranged to receive the second tabular extensions therein, wherein the slots or recesses each have an upper surface that includes a protruding bump configured and dimensioned to at least partially engage a depression of the second tabular extension to provide snap-locking of the bumps into the depressions; wherein the tabular extensions and openings, slots or recesses are formed partially on each section.

In another embodiment, the first side is configured with at least three tabular extensions, each having a protruding bump on an upper portion thereof; the second side is configured with at least three tabular extensions each having a protruding bump on an upper portion thereof; the third side is located opposite the first side and is configured with openings that are unobstructed and configured, dimensioned and arranged to receive therein the plurality of first side tabular extensions, with the openings having an upper surface that includes a depression therein that is configured and dimensioned to receive a protruding bump of the first side tabular extensions; and the fourth side is located opposite the second side and is configured with spaced slots or recesses that are configured, dimensioned and arranged to receive the plurality of second side tabular extensions therein, wherein the slots or recesses each have an upper surface that includes a depression therein that is configured and dimensioned to receive a protruding bump of the second side tabular extensions.

In yet another embodiment, the first side is configured with at least two tabular extensions, each having at least two protruding bumps on an upper portion thereof; the second side is configured with at least two tabular extensions each having at least two protruding bumps on an upper portion thereof; the third side is located opposite the first side and is configured with openings that are unobstructed and configured, dimensioned and arranged to receive therein the first side tabular extensions, with the openings having an upper surface that includes at least two depressions therein that are configured and dimensioned to receive the protruding bumps of the first side tabular extensions; and the fourth side is located opposite the second side and is configured with spaced slots or recesses that are configured, dimensioned and arranged to receive therein the second side tabular extensions, wherein the slots or recesses each have an upper surface that includes at least two depressions therein that are configured and dimensioned to receive the protruding bumps of the second side tabular extensions.

Preferably, each slot or recess of the fourth side of the panel has a lower surface that includes a bridge or rail structure forming a lower entry of the slot or recess for initial contact with the lower surface of a second side tabular extension that is to be received therein. Similarly, the second side tabular extensions are configured with an angled bottom portion that allows the forward end of the second side tabular extensions to move away from the upper portion of the slot or recess to allow detachment of the second side tabular members from the slots or recesses.

Typically, the protruded bumps and depressions are circular or oval in configuration and the depression has a slightly larger circumference than the protruding bumps. Also, some or all of the openings, slots or recesses include either a cut out end portion, an open bottom or an opening adjacent and behind the bridge or rail structure to allow dirt or water to exit the opening, slot or recess and to facilitate entry of the tabular members therein.

When the panel mat of these embodiments is square, it includes two or three each of the first tabular members, second tabular members, openings and slots or recesses or and when rectangular it includes four or six first tabular members, four or six openings, two or three second tabular members and two or three slots or recesses. Each side of the panel mats advantageously includes multiple tabular members and multiple openings. Typically, between 2 and 8 tabular members and openings are provided on the first and second sides of the mat but in some designs those numbers of members and openings can be provided on each side of the mat for more secure connection between conjoined mats.

In another embodiment, the first and second sides of the mats are adjacent and each includes an upper structure that has an upper surface that extends the top surface of the mat and a lower surface that slopes downwardly towards the bottom surface of the mat; and the third and fourth sides are adjacent and each includes a lower structure that has a lower surface that extends the bottom surface of the mat and an upper surface that slopes upwardly towards the top surface of the mat. The downwardly sloped lower surface of the upper structure and the upwardly sloped upper surface of the lower structure are preferably configured to allow for overlapping with respective lower and upper structures of other like mats when placed adjacent thereto for joining therewith by which the overlapped upper and lower structures form generally flat and continuous top and bottom surfaces of the overlapped mats.

The upper and lower structures preferably include one or more alignment tabs and one or more tab receiving slots with the tab(s) provided in one of the upper or lower structures and with the slot(s) provided in the other of the upper or lower structures. Each upper and lower structure typically includes a plurality of spaced openings with the openings of the upper and lower structures configured to be in alignment when overlapping the respective lower and upper structures of other like mats using the alignment tabs and slots. These openings are configured to interlock or to receive a fastening device therein when aligned to assist in more securely holding overlapped mats together.

Advantageously, in each upper and lower structure one opening is located in a corner of the mat between the adjacent first and second sides and another opening is located in a corner of the adjacent third and fourth sides. While any number of spaced openings can be provided depending upon the size of the mat, typically, five openings are provided on the upper structures and seven openings are provided on the lower structures to allow adjacent mats to be assembled by aligning at least some of the openings of the upper structure over the openings of the lower structure in full adjacent relation, or in a staggered configuration. The latter configuration enables the arrangement of adjacent mats in a ⅓, ½ or ⅔ extension overlap depending upon which two openings on the lower structure are overlaid with the corner opening and adjacent opening of the upper structure before receiving a fastening device therein in each overlaid pair of openings. This avoids the presence of a linear seam between rows of adjacently joined mats which adds to the stability of the installation.

The upper surface of the first section is preferably a structured surface that includes a raised pattern of spaced elements in a pattern, with the open lower surfaces of the cells of the second section providing a secure footing when the panel mat is placed on wet or muddy ground. Some or all of the cells have top surfaces that extend to and support the upper surface of the first section to strengthen that surface of the panel mat.

The panel mat also can include a third section located below and welded, molded, bonded, joined or sealed together to the second section, the third section configured and dimensioned to close off the openings of the cells and form a bottom surface for the panel mat that is relatively flat, textured or structured with the panel mat being able to withstand point loads of between 300 and 500 psi and spread loadings of 40,000 to 50,000 pounds per square foot. When the upper surface of the first section is relatively flat and the third section is a relatively flat plate, the bottom surface of the third section will also be relatively flat. This type construction is more suited for installations on a flat surface such as a concrete or asphalt pad or a wooden floor in e.g., a gymnasium. And to strengthen the mat to resist higher loading, metal wire, bar or plate reinforcement can be provided, with the reinforcement located within the second section or between the first and third sections.

In one configuration, the upper surface of the first section is a structured surface that includes a raised pattern of spaced elements in a pattern, such as a herringbone or spaced longitudinal line pattern, or one that includes indicia. For outdoor use, the top surface of the first section, the bottom surface of the third section, or both surfaces preferably include channels that assist in allowing drainage of water from that surface of the mat, with the channels molded therein or formed between a plurality of raised islands, elongated bumps or protrusions, raised indicia, other surface features, or combinations thereof.

For any of the embodiments described herein, a preferred embodiment of the invention provides a third section located below and welded, molded, bonded, joined or sealed together to the second section, with the third section configured and dimensioned to close off the openings of the cells and form a bottom surface for the panel mat that is relatively flat, textured or structured. This further strengthens the mat without adding significant weight as it allows the cells to provide better resiliency and compression properties to the panel mat.

It is also possible for the upper surface of the first section to relatively flat and when the third section is a relatively flat plate, the bottom surface of the third section is also relatively flat. This type of construction is ideal for placement of the panel mats for temporarily protecting gym flooring or athletic fields from events such as graduations, concerts, of other large gatherings. It is also very helpful to evenly distribute any loads on the mats and prevents any edges of the open cells from cutting into soft surfaces such as grass or filling up with mud or dirt.

The top surface of the first section, the bottom surface of the third section, or both surfaces can include channels that assist in allowing drainage of water from that surface of the mat, with the channels molded therein or formed between a plurality of raised islands, elongated bumps or protrusions, raised indicia, other surface features, or combinations thereof.

The upper surface of the first section may be a structured surface that includes a plurality of raised islands spaced by and closely arranged, with the islands having a polygonal, circular, or elliptical shape; and wherein the cells of the second section have top surfaces that are configured in the same shape as the islands and extend to and within the islands to support the upper surface of the first section to strengthen the panel mat.

Alternatively, when the top surface of the first section is structured, the bottom surface of the third section can be structured in a similar fashion to provide better engagement with the ground or to allow the mats to be used with either side facing upwards and away from the ground.

The panel mats of the invention are typically rectangular wherein W=2L or square wherein W=L, and wherein L is preferably 2.5, 3, 3.5, 4, 4.5, 5, 6, 7, or 8 feet and W is preferably 2.5, 3, 3.5, 4, 4.5, 5, 6, 7, 8, 9, 10, 12, 14 or 16 feet. These panel mats generally weigh between about 10 and 125 pounds making them easily movable manually by one or two workers without the use for heavy equipment.

The panel mats of the invention may also include one, two, three or four lifting elements that are affixed to the mats to allow lifting and installation or reclamation. These lifting elements include (a) a ring or U or D shaped member that is movable between first and second positions, wherein the first position is one where the member resides below the surface of the mat and the second position is an operative position where the ring or U- or D-shaped member is exposed for engagement with lifting equipment, and (b) a structure that secures the ring or U- or D-shaped member to the mat. Preferably, the structure that secures the ring or U- or D-shaped member to the mat includes a plate that engages the surface of the mat opposite the surface from which the member extends, and a post that extends through the mat for engagement with the ring or U- or D-shaped member either directly or through a connecting element.

Thus, the mats of the present invention can be assembled to easily provide a temporary support surface, deck, walkway or roadway using a plurality of connected panel mats as disclosed herein. The mats can be joined together in a manner that allows the ends to be aligned or not. A staggered configuration is generally preferable as it avoids generating a long seam that can separate more easily during use of the temporary flooring. Therefore, it is preferred that the tabular members and openings are arranged on the sides of the mat in a configuration that allows the mats to be joined in an offset or staggered manner so that the ends of the mat are not aligned when installed.

The installation of the panel mats can proceed by a number of ways depending upon what is desired. For a smaller installation, smaller size mats that are easily lifted and installed by one or two workers are preferable, while the larger size mats facilitate a faster construction because more area is covered by each mat. The lifting elements assist in allowing these larger mats to be lifted and installed or reclaimed by equipment. And often, combinations of the different mats would be utilized so that the temporary flooring best covers the entire space to be protected by the mats.

Advantageously, each upper and lower structure of the mats further includes spaced openings with the openings of the upper and lower structures configured to be in alignment when overlapping the respective lower and upper structures of adjacent mats; and wherein the openings are configured to interlock or to receive a fastening device therein to assist in more securely holding overlapped mats together, and wherein in each upper and lower structure one opening is located in a corner of the mat between the adjacent first and second sides and another opening is located in a corner of the adjacent third and fourth sides. The openings are configured to interlock or to receive a fastening device.

Preferably, five openings are provided on the upper structures and seven openings are provided on the lower structures to allow adjacent mats to be assembled by aligning at least some of the openings of the upper structure over the openings of the lower structure in full adjacent relation, or in a staggered configuration wherein adjacent mats are arranged in a ⅓, ½ or ⅔ extension overlap depending upon which two openings on the lower structure are overlaid with the corner opening and adjacent opening of the upper structure before receiving a fastening device therein in each overlaid pair of openings.

The fastening device is a cam, pin, stake, bolt, clamp, screw, clip, or peg which is configured to be received in the aligned openings of the upper and lower structures and which lock those structures together. Preferably, the fastening device is a cam that includes a first locking tab that when rotated engages an opening in an adjacent mat to interlock the mats together, and wherein the upper surface of each mat includes indicia adjacent each opening to indicate whether the cam is in a locked or unlocked position.

The mats or combined mat installation can further comprise one or more side ramps that facilitate smooth access to the upper surface of a mat by wheelchairs or other wheeled articles; and a separate adapter for each ramp wherein each adapter is connected to both the mat and the side ramp, wherein the ramps have sloped bottom surfaces that align with the upwardly sloped upper surface of the lower structure and the adapter has an upper surface with two sloped portions, one that aligns with the downwardly sloped lower surface of the upper structure of the mats and the other that aligns with the sloped bottom surfaces of the ramps. The side ramps and adapters form additional embodiments of the invention.

The side ramp is usable with any mat that includes an upper surface that forms a top surface of the mat and a lower structure that extends from at least one side of the mat, with the lower structure sloping downwardly from the side of the mat to the extended end of the lower structure and including one or more openings therein. The side ramp preferably comprises upper and lower surfaces wherein the lower surface is configured with a downward slope that corresponds to the downward slope of the lower structure of the mat; and one or more openings therein that correspond and align with the one or more openings of the mat. Similar to the openings that allow interlocking of mats, the openings of the side ramps are configured to interlock with openings of the mat or to receive a fastening device therein to so the side ramp can be connected to the mat.

The side ramps can also include one or more alignment tabs and one or more tab receiving slots with the tab(s) provided in one of the downward sloped surface of the side ramp or the downward slope of the lower structure of the mat and with the slot(s) are provided in the other of the downward sloped surface of the side ramp or the downward slope of the lower structure of the mat. Most preferably, the upper surface of the side ramp is configured to have a slope of $1/12$ to meet American Disability Act requirements, with the length of the ramp determined based on that slope and mat thickness. For example, for a 3" thick mat, the length of the ramp would be 36 inches.

The adapter comprises an elongated member having first and second sides and an upper surface that has first and second upwardly sloping portions extending respectively from the first and second sides of the elongated member to form first and second sloped surfaces, wherein one sloped surface of the adapter conforms to the upwardly sloped upper surface of the mat and the other sloped surface of the adapter conforms to the lower sloped structure of the side ramp.

To interlock with the mat and side ramps, each sloped upper surface of the adapter further comprises one or more alignment tabs or one or more tab receiving slots, with the tab(s) provided either in the adapter sloped surface or one of the downward sloped surface of the side ramp or the downward slope of the lower structure of the mat, and with the slot(s) are provided in the other of the adapter or one of the downward sloped surface of the side ramp or the downward slope of the lower structure of the mat. Preferably, the mat and side ramp each have a plurality of spaced openings and the adapter has a plurality of spaced openings that are configured to be in alignment with the openings of the side ramp or mat so that the adapter and side ramp or mat can either interlock or receive a fastening device therein with the fastening device comprising a cam, pin, stake, bolt, clamp, screw, clip, or peg.

Thus, a preferred combination according to the invention comprises one or more mats as defined herein, with one or a plurality of side ramps and if necessary a respective adapter, as disclosed herein. The side ramps can be directly interlocked with the lower structures of the mats, while each adapter is connected to an upper structure of the mat and a side ramp. This allows access to the upper surface of the mat from any side that includes the side ramp and if necessary the adapter.

BRIEF DESCRIPTION OF THE DRAWING FIGURES

The invention is more fully appreciated upon a review of the appended drawing figures which illustrate the most preferred embodiments of the invention and wherein:

FIGS. 12A to 12C are cross-sectional views of the panel mat of FIG. 8 with FIG. 12A showing a cross section across the entire panel mat, FIG. 12B illustrating a cross-section of the extension tab and FIG. 12C illustrating a cross-sectional view of the tab receiving opening;

FIGS. 13A and 13B illustrate the joining of three panel mats according to FIG. 8, with FIG. 13A showing the joined panel mats from a top view thereof and FIG. 13B showing the joined mats from a bottom view thereof;

FIGS. 24A, 24B and 24C illustrates an alternative construction for a lifting element wherein FIG. 24A illustrates how the lifting element is inserted into the mat, while FIG. 24B illustrates the ring of the lifting element in an operative position and FIG. 24C illustrates the ring pivoted for placement in the retracted position in the mat;

FIG. 25 is a perspective view of a panel mat according to another embodiment of the present invention showing the top surface of the first section;

FIG. 26 is a perspective view of the mat of FIG. 25 showing a lower surface of the third section;

FIG. 27 is an exploded view of the mat of FIG. 25;

FIG. 28 is an exploded view of the mat of FIG. 26;

FIG. 29 is an illustration of the mat of FIG. 25 wherein the third section is not yet welded to the first and second sections;

FIG. 30 is an illustration of the mat of FIG. 26 wherein the third section is not yet welded to the first and second sections;

FIGS. 39 and 40 are side cross-sectional views of the cam fastening element of FIG. 34 in the adjacent mats in unlocked and locked positions respectively;

FIGS. 49A, 49B and 49C illustrates an alternative construction for a lifting element wherein FIG. 49A illustrates how the lifting element is inserted into the mat, while FIG. 49B illustrates the ring of the lifting element in an operative position and FIG. 49C illustrates the ring pivoted for placement in the retracted position in the mat;

FIG. 52 is bottom view of the mat, connector and side ramp of FIG. 51.

DETAILED DESCRIPTION OF THE INVENTION

Figure 1:
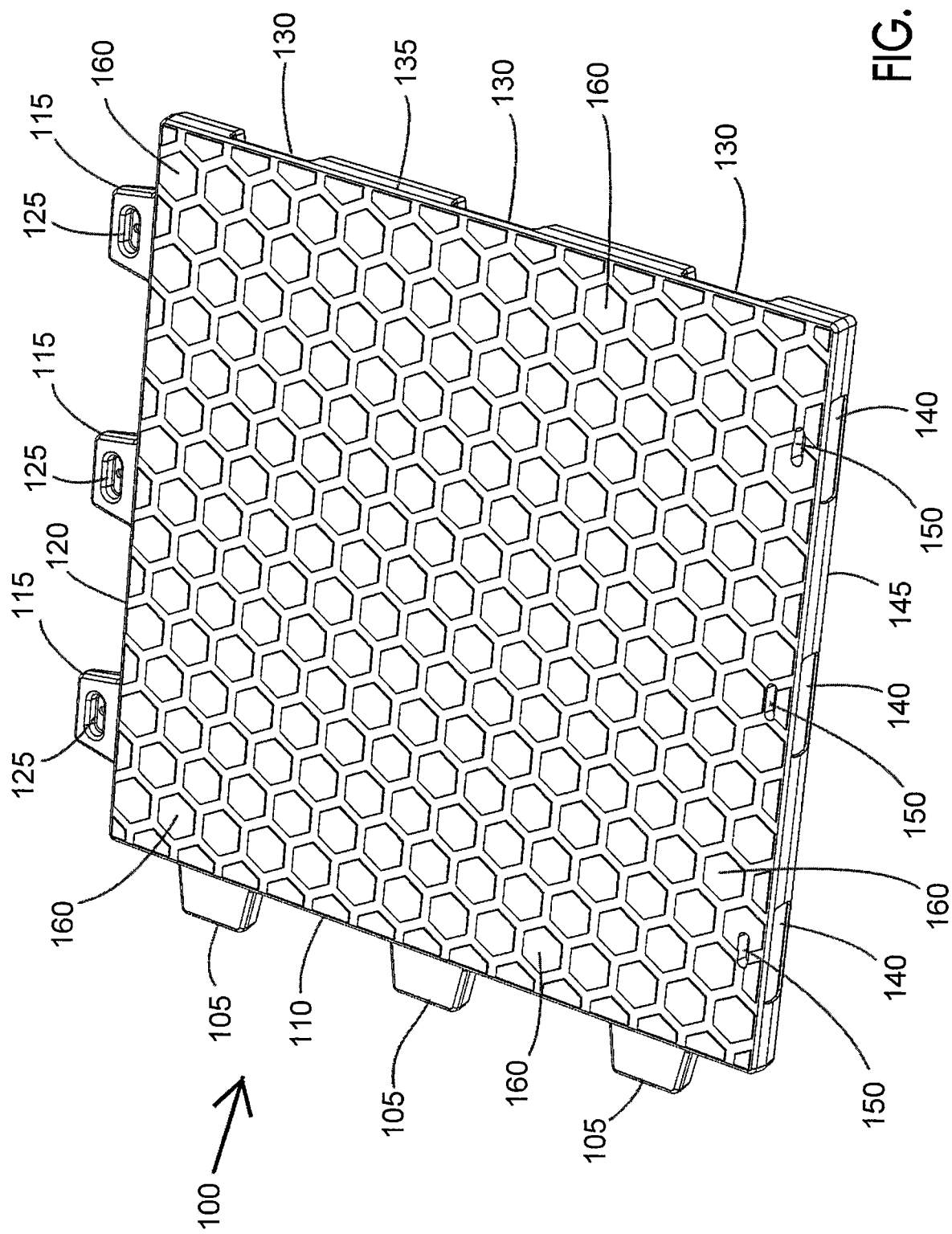
FIG. 1 is a perspective view of a panel mat according to the present invention showing the top surface of the first section.

Certain terms that are used herein are defined hereinbelow to assist in the understanding of the invention.

The terms "substantially" and "relatively" are used for their ordinary meanings to indicate that the dimensions or configurations are not precise or exact. A skilled artisan can readily determine what tolerances are acceptable to provide a surface that is considered to be flat based upon the size of the panel mats and the type of service that the panel mats are expected to provide. Typically, the terms "substantially" or "relatively" will mean that a surface can vary by as much as an inch or two although in the more preferred embodiments the variance is less than 1 inch.

Additionally, all dimensions recited herein are approximate and can vary by as much as ±10% to in some case ±25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

The invention relates to a rectangular panel mat that is preferably square or rectangular and that is made of plastic or elastomeric material. The panel mat can be made of first and second sections (for two layer mats) or with an additional third section (for three layer mats) which are part of an integral component that is molded to have the desired configuration and features. Typically, the first and second sections are molded together in one operation while the third section is later joined to the mat formed from the first and second sections. Alternatively, a two layer mat can be made from a solid integral plastic or elastomeric component wherein the tabular extensions, openings and slots or recesses are milled or routered into the component top provide the configurations and features. The third section can then be added to the formed mat. Preferably, however, the first and second sections are separately molded and then combined in the desired configurations disclosed herein. To form the panel, the molded first and second sections may be are joined together by welding, an adhesive, molding, bonding, or by joining via an interlocking structure. Having each section heated and joined together in a press is another and more preferred joining option.

A typical panel mat has a 42" square configuration as this facilitates molding of the first and second sections and results in a lightweight panel mat that can be easily installed manually. The sections are typically molded to a thickness of between about 1/16" to 1/8" depending upon the plastic or elastomeric material that is used to make the panel. The panels can range in size from 1'×1' to 16'×16'. They can be square of any size at or it within those values and of any particular feet, inches or inch fractions. Alternatively, the panels can be rectangular, e.g., 1'×2', 2'×6', 3'×8', 4'×8', 4'×10', 6'×9', 6'×12', 8'×12', 8'×16" and even 12'×16'. The 42 inch square panel would have a weight of approximately 40 pounds when molded from upper and lower halves of high density polyethylene each having a skin thickness of 0.2 inches. The preferred panels have sizes of 2.5'×2.5', 3'×3', 3.5'×3.5' or 4'×4' as these are relatively easy to be moved because they would have a weight of about 100 pounds or less so that they can be lifted and installed by manual labor rather than heavy equipment. The larger size panels are heavier but the temporary flooring can be installed more quickly given the greater area that these mats cover.

Also, rectangular mats can be used wherein the length dimension is double the size of the width dimension. So for example in the preferred embodiments, one side of the mat would have three tabular extensions while the adjacent side would have six tabular extensions. Thus, along the length of one mat, two additional similarly configured mats would be joined thereto whereas the width dimension would be joined to half of the length of an adjacent mat. And if desired, combinations of square and rectangular mats can be joined together to form any particular shape decking or temporary roadway or walkway. As an example, a 42 inch square panel mat can also be joined to a rectangular panel mat that is 42"×7' long. And if desired, rectangular or square mats can be made. The only limitation is the way that these mats are shipped with widths up to about 8 feet being preferred so that the mats can be shipped by conventional tractor trailers.

The larger size square or rectangular mats that weight more than 100 pounds are provided with lifting elements as disclosed herein. And while the lifting elements are very useful and possibly necessary when provided on the larger, heavier mats, they also are useful when applied to any size mats. For example, this would allow multiple smaller mats to be lifted together by such elements to expedite loading of the mats onto a truck or even for installation or reclamation of such mats in connection with the forming or breakdown of the temporary flooring.

As noted, the overall size (length, width) should be maximized for loading the panel mats into standard ISO containers and more importantly for concise packing into trucks, tractor trailers or rail cars for shipping. Also the thickness of the panel mats should be between about 1 and 3" and typically between 1.5" to 1.75" thick. The mats are constructed to withstand repeated traffic from shop forklifts carrying loads, semi-truck and trailer travel, and stage point loads all while being rigid enough to protect the surface from damage and prevent any rutting of the subgrade. Point loads of between 300 and 500 psi are provided as point loadings while spread loadings of 40,000 to 50,000 pounds per square foot are provided. The highest loadings are achieved with the three section constructions described herein and with the densest array of geometrical cells therein. Particularly preferred materials for these panel mats are HDPE or Polypropylene. The panel mat should not have any external fasteners as the tabs and openings, slots or recesses are incorporated into the mat structure itself to facilitate interlocking during installation.

When a third section is desired to seal off the cells, it can be provided in the form of a plate or solid flat structure that is bonded, adhered, welded or otherwise joined to the other sections. It also can provide a relatively flat bottom surface for the panel mat when desired, such as when the panel mats are to be installed on a flat surface such as a floor.

The panel mats can be molded of many different materials, including any conventional polymeric or copolymeric thermoplastic materials, thermosetting materials, or even fiberboard materials made of recycled plastic or polymeric materials from used carpets, plastic packaging and the like. Mixtures or combined blends of plastic materials may also be used. The panels may also be made of elastomeric materials which can be thermosets (requiring vulcanization) or thermoplastic.

A wide range of thermoplastic or polymeric materials can be used for the sections of the panel mats of this invention. These materials would be molded or cast to the desired size and thickness of the mat. Useful materials include:

Acrylonitrile butadiene styrene (ABS)
Acrylic (PMA)
Celluloid
Cellulose acetate
Cyclo olefin Copolymer (COC)
Ethylene-Vinyl Acetate (EVA)
Ethylene vinyl alcohol (EVOH)
Fluoroplastics (PTFE, alongside with FEP, PFA, CTFE, ECTFE, ETFE)
Ionomers
Kydex, a trademarked acrylic/PVC alloy
Liquid Crystal Polymer (LCP)
Polyacetal (POM or Acetal)
Polyacrylates (Acrylic)
Polyacrylonitrile (PAN or Acrylonitrile)
Polyamide (PA or Nylon)
Polyamide-imide (PAI)
Polyaryletherketone (PAEK or Ketone)
Polybutadiene (PBD)
Polybutylene (PB)
Polybutylene terephthalate (PBT)
Polycaprolactone (PCl)
Polychlorotrifluoroethylene (PCTFE)
Polyethylene terephthalate (PET)
Polycyclohexylene dimethylene terephthalate (PC (PC) T)
Polycarbonate
Polyhydroxyalkanoates (PHAs)
Polyketone (PK)
Polyethylene (PE)
Polyetheretherketone (PEEK)
Polyetherketoneketone (PEKK)
Polyetherimide (PEI)
Polyethersulfone (PES)—see Polysulfone
Polyethylenechlorinates (PEC)
Polyimide (PI)
Polylactic acid (PLA)
Polymethylpentene (PMP)
Polyphenylene oxide (PPO)
Polyphenylene sulfide (PPS)
Polyphthalamide (PPA)
Polypropylene (PP)
Polystyrene (PS)
Polysulfone (PSU)
Polytrimethylene terephthalate (PTT)
Polyurethane (PU)
Polysulfone (PSU)
Polytrimethylene terephthalate (PTT)
Polyvinyl chloride (PVC)
Polyvinylidene chloride (PVDC)
Styrene-acrylonitrile (SAN)

It is also possible to utilize fiberboard as the elongated members or sheets that form the core structure. The fiberboard material is made of recycled plastic or polymeric materials from used carpets, plastic packaging, rice hulls and the like. They can be provided in the desired sizes for use as the core structure of the mats of this invention. They can be combined with other plastic materials as is generally known. In addition to being environmentally resistant due to their plastic content, these fiberboard/recycled materials are environmentally friendly by allowing recycling of used plastics or polymeric materials.

The top and bottom sections may also be made of an elastomeric material. The elastomers are usually thermosets (requiring vulcanization) but may also be thermoplastic. Typical elastomers include:

Unsaturated rubbers that can be cured by sulfur vulcanization—these are preferred from a strength and hardness standpoint:

Natural polyisoprene: cis-1,4-polyisoprene natural rubber and trans-1,4 polyisoprene gutta-percha;
  Synthetic polyisoprene;
  Polybutadiene;
  Chloroprene rubber, i.e., polychloroprene;
  Butyl rubber (i.e., copolymer of isobutylene and isoprene) including halogenated butyl rubbers (chloro butyl rubber; bromo butyl rubber);
  Styrene-butadiene Rubber (copolymer of styrene and butadiene); and
  Nitrile rubber (copolymer of butadiene and acrylonitrile).
Saturated (i.e., non-vulcanizable) rubbers include:
  Ethylene propylene rubber (EPM);
  Ethylene propylene diene rubber (EPDM);
  Epichlorohydrin rubber;
  Polyacrylic rubber;
  Silicone rubber;
  Fluorosilicone Rubber;
  Fluoroelastomers;
  Perfluoroelastomers;
  Polyether block amides; and
  Chlorosulfonated polyethylene.

The elastomeric, thermoplastic or thermosetting materials disclosed herein can also be provided with conventional fillers to increase weight and hardness. They also can be reinforced with particulates, fibers such as glass, fabric or metal screening or scrim to reduce elongation and provide greater rigidity.

Regarding the configuration of the panels, the sections are separately molded with peripheral boundaries that are configured to match each other. The first and second sections can be blow-molded or compression molded to the desired sizes. Then, the sections are joined together where the boundaries are in contact by welding, adhesives, heating, or interlocking connections or combinations thereof. It is desirable for the sections to be joined together to form a waterproof structure so that any openings existing between the sections do not fill up with dirt or water during use. Typically, the first and second sections are sealed by welding or adhesives at a peripheral seam. To facilitate an adhesive or weld the joint, the peripheral boundaries can be provided with a minimum flange detailed to provide additional surface area for sealing. The third section can then be joined to the other two to form a three ply mat. As noted, the third section provides additional compression and strength to the panel mat by holding the cells in position where they cannot move laterally.

The first section can be configured with an appropriate top surface that may be relatively flat, textured or structured to facilitate movement over the panel mat. While a completely smooth top surface may be used, it is preferred that the top surface at least include some texture or channels that facilitate the drainage of moisture and provide a more secure footing for movement across the panels. The channels can be formed by texturing or spaced raised islands or other structures that are provided in the top surface. The top surface can also include raised or embossed patterns or designs that indicate the supplier or owner of the mats. When a flat or relatively flat surface is provided for the top surface, grit or particles can be included to assist in providing better traction when the surface becomes wet. The panels are configured to be oriented with the top section being the surface which is traversed by personal or equipment while the lower portion of the second section faces the ground.

The bottom surface of the panel mats may also configured with a flat, textured or structured surface. Preferably, the bottom surface is textured, structured or is provided with openings so that the panel mat can be securely placed on wet or muddy ground. For the latter feature, the bottom surface can be provided with closed holes that are of essentially the same configuration as the islands of the top section and that are sufficient tall to extend to the islands to provide further support to the upper surface of the top section. If desired, the holes can be configured as wells or cups that have the same configuration as the islands so that the top surfaces of the holes or cups fit into the islands. This provides reinforcement of the upper surface to movement or articles that contact that surface, If desired, the holes and islands can be joined together by welding, adhesives, bonding, heating or by snap-locking.

Alternatively, the first and second sections can be molded together as a single component. For this the top section is a plate or sheet that has a flat bottom surface so that it forms the upper portion and tops of the cells while the second section includes the cell sidewalls. The result is that the cells are closed at the top by the first section and the cell sidewalls provide the strength reinforcement of the top section. The first and second sections can be molded together to form the single component. The same result can be obtained by welding or adhering a top section plate that has a flat bottom to the upper ends of the cells of the second section.

The third section can be provided as a flat plate if desired so that the bottom surface of the panel mat is relatively flat. Of course, the third section can also be provided with cells or can be in the form of a grating or other structure that has openings, channels or indentations. As the second section provides some of this the third section is typically used to provide a flat bottom surface and to hold the cells of the second section in position between the first and third sections. And in some embodiments, the bottom surface can also include a textured surface or a raised or embossed patterns or designs that indicate the supplier or owner of the mats so that it appears the same as to top surface of the mat or to provide better gripping or more secure placement on the ground.

Generally, the ground is prepared to be relatively flat to receive the bottom surfaces of the panel mats, but the panel mats can also be placed on a previously prepared flat cement or asphalt surface to provide temporary protection of such surfaces. Typically, however, the panel mats are placed on earth, grass, or similar terrain to provide better footing and support for personnel or light equipment traffic. The textured or structure bottom surface facilitate a more secure placement on gravel or wet or muddy ground.

One advantageous structure for the upper surface of the first section is one that includes raised circular or polygonal islands, or combinations thereof, with the islands spaced and arranged closely together near each other. This forms channels between and around the islands that are typically between 0.25 and 1 inch wide. When polygonal islands are used, the spacing can be somewhat uniform but it also can be random. The islands can be oriented along a horizontal or vertical direction if desired. The only restrictions would be that the islands not be too high (more than 1 inch tall) or spaced too far apart (more than 2 inches) so that a person's foot can get caught or twisted between the islands. A preferred hexagonal structure is illustrated in the drawings, but other structures that include squares, rectangles, triangles, octagons, pentagons or other shapes including circles or ovals can be used. A surface texture that mimics spaced boards or tire thread designs are also suitable.

An advantageous structure for the lower surface of the second section can be described as a honeycomb or open cell structure. The term "honeycomb structure" refers to a structure that has openings or open cells therein which extend to the bottom surface of the bottom section. The shape of the cells can be hexagonal, square, rectangular, or of another polygonal shape, or they can even be round or oval provided that the top surfaces or configurations of the cells match the configuration and arrangement of the islands of the top section. Some or all of the cells have a top surface which extend up to and into the islands through the lower surface of the top section. The cells have a top surface which extend up to and into the islands through the lower surface of the top section. As noted, the top surfaces of these cells are joined to the lower surfaces of the islands by a press fit, snap-locking, adhesives or spot welding. The flat tops of the cells can also support a flat lower surface of the top section. With this construction, the strength of the panel can be further increased as each cell acts as a separate support for the upper surface of the top section.

Typically, the honeycomb pattern of geometrical cells includes those that have a top surface having a perimeter of 3 to 12 inches. This includes round top surfaces of about 1" to about 4" diameter and square or rectangular trapezoids having side of about 1" to about 4". As noted, the tops of the cells can be open or some or all of them can be closed. The same is true of the bottoms of the cells, which again can be open or where some or all of the cells terminate in closed flat surfaces. Similar perimeters would be provided for other shapes (i.e., oval, pentagonal, hexagonal, octagonal, etc.). For greater compressive strengths, more dense (i.e., smaller size) cells may be provided. A skilled artisan can design the cell configuration for any particular compressive strength requirements based on the overall size of the mat and number of sections that are to be included.

The sidewalls of the cells are also configured to impart strength to the mat. These are typically provided at an angles with regard to the top or bottom surfaces of the mat rather than being perpendicular. Angles of between 45 and 75 degrees are preferred with 60 to 65 degrees being optimal.

The cells can be spaced apart or can be placed with at least part of their sidewalls in contact. The number of cells and their spacing and arrangement can vary but a skilled artisan can easily determine any optimum arrangements based on the anticipated loading that will be applied to the mats. It is also possible to have some, typically half, of the cells face upward and others, again typically half, facing downward. This allows half of the cells to include flat surfaces facing the first section and half of the cells to have flat bottom surfaces facing the third section. The flat surfaces can be placed within recesses in the top and/or bottom plates or the can support a flat surface of the top and/or bottom plates that face the cells. Of course, other arrangements are possible including from 10% to all of the cells having flat top surfaces, as well as from 10% to all of the cells having flat bottom surfaces. The half and half arrangement provides better support for the upper and lower surfaces of the mat when the first and third sections are provided as plates.

The panel mats are carefully designed so that they can interlock with adjacent, similarly sized and configured panel mats to form a temporary surface or substrate upon which people or light equipment can be placed thereon or moved across much like the a building floor. This interlocking is achieved by various configurations of the sides of the mats. These panel mats have first, second, third and fourth sides wherein the first and second sides are configured and dimensioned to be complementary to and/or matable with the third and fourth sides, so that (a) the first side of a first mat can be interlocked with one of the third or fourth side of a second mat, (b) the second side of the first mat can be interlocked with one of the third or fourth sides of a second mat, (c) the third side of first mat can be interlocked with the one of the first or second sides of a third mat, and (d) the fourth side can be interlocked with the one of the first or second sides of a fourth mat.

Advantageously, in one embodiment, the first and second sides have protruding structures or extensions, while the third and fourth sides have receiving structures, openings or recesses, so that (a) the protrusions or extensions of the first side of the first mat are present within the receiving structures, openings or recesses of an adjacent mat, (b) the protrusions or extensions of the second side of the first mat are present in the receiving structures, openings or recesses of an adjacent mat, (c) the receiving structures, openings or recesses of the third side of the first mat receive the protrusions or extensions of an adjacent mat, and (d) the receiving structures, openings or recesses of the fourth side of the first mat receive the protrusions or extensions of an adjacent mat.

In one preferred embodiment, the interlocking is achieved through a unique design of tabular members and corresponding recesses. A first side of the panel has spaced tabular members arranged along that side. These tabular members can have a trapezoidal, rectangular, square, half oval or half round shape. For example on a square 42 inch panel, three tabular members would be provided, typically on 1 foot centers. More or less tabular members can be included depending upon the actual dimensions of the panel mat and the size of the tabular members. One preferred arrangement disclosed herein includes two tabular members on each side of a square panel mat and more can be used on the longitudinal sides of the mat when it is rectangular rather than square. For example, a 42" by 84" rectangular mat could 4 to 6 tabular members on the longitudinal sides and 2 to 3 tabular members on the shorter sides. For larger mats, as many as 8 to 12 tabular members per side can be used. The tabular members can also be formed on either the top or bottom section of the panel mat on a first side thereof, or with a portion of each tabular member part provided on each section. Preferably each section provides about 25 to 75% of the tabular member, with typically about 50% formed on each section. When about half of the tabular member is provided on each section, the halves can be joined together the welding or adhesive used to provide the seal at the periphery boundary of the panel mat.

The opposite side of the panel mats from the first tabular members would be configured with corresponding openings configured and dimensioned to receive the tabular members. The opening can be a full opening into which the tabular member extends, or it can be a slot formed between the top and bottom sections. In an alternative and preferred embodiment, the openings are made in the lower half of the panel while the upper half of the panel provides a continuous surface above the opening. This arrangement facilitates cleanout of the openings if mud or other debris is caught in them. Neither the first tabular members nor the openings include any means for joining or connecting the first tabular members to the openings in any temporary or permanent way. This allows the tabular members to simply slide into and out of the openings for a smooth and fast installation or removal of the panel mats.

An arrangement of additional or second tabular members is provided on a second side of the panel mat that is adjacent to the first side that includes the first tabular members. These second tabular members include a central depression on a top surface thereof. The depression may be a well that may be cylindrical, oval, rectangular or square with rounded edge openings. These additional tabular members also preferably include a bottom surface that is angled so that the forwardmost end of the tabular member is located at a higher position than the rearwardmost end. This configuration facilitates interlocking and disengagement of the tabular members.

The opposite side of the panel from the additional tabular members includes slots or recesses that are configured and dimensioned to receive the additional tabular members therein. An opening is provided on the lower surface of the slot or recess to allow for drainage of water, dirt, rocks or other debris that may enter therein. The opening is located sufficiently inwardly from the end of the slot so that a bridge or rail structure is provided at the entry for initial contact with the lower surface of the additional tabular members and for providing support to the tabular member when it is present in the slot or recess. The upper surface of the slot or recess includes a male member for interlocking with the depression of the additional tabular member of an adjacent panel. These male members are configured and dimensioned to only partially engage the apertures of the additional tabular members to receive only part of the male members to provide a snap-locking connection between the slots or recesses with the additional tabular members of an adjacent panel when installing the panels on a properly graded or flat surface. The depression is configured with a rounded opening to facilitate movement of the male member into and out of the depression to facilitate installation and subsequent withdrawal of the tabular member from the slot or recess. The angled bottom portion of the additional tabular members assists in the removal of the male member from the depression as it allows the forward ends of the tabular member to move away from the male members when the opposite end of the panel mat is lifted for detachment of the interlocked male members and apertures during removal of the panel mats.

The tabular members can instead include a protruding bump on an upper surface while the openings, slots or recesses include an upper surface that includes a depression for facilitating a snap-locking engagement of the bumps and depressions. Of course, a skilled artisan would readily recognize that the reverse arrangement is also acceptable, namely that the tabular members can include the recesses while the upper surfaces of the openings slots or recesses includes the bumps or other male member protrusions. Combinations can also be made with bumps and/or depressions provided on the tabular members and the corresponding engageable depressions and/or bumps on the openings, slots or recesses.

The openings or recesses are configured to be shorter or smaller than the width of the mat. This facilitates the insertion of the tabular members into the recesses or openings. And the bumps and other interlocking structures can be provided on only one of the sides or on both sides as desired. Usually, providing the interlocking structure on the tabular members on one side of the mat is sufficient to achieve good interlocking when the temporary flooring is installed. Alternatively, each opening or recess should also have a portion of the cut out so that there is enough room for the tabular member end to slide in easily without binding. Preferably, this allows the tabular members to be inserted at a 45 degree angle.

For even greater connection of the mats, each side of the mat can include multiple tabular members, from 2 to as many as 8 to 12 tabular members being possible, with openings for receiving the provided number of such members arranged between the tabular members. The larger mats would include at least 8 tabular members on two sides. When a rectangular panel is to be made, the longer side would be provided with additional tabs and matching openings or slots or recesses as applicable. As noted as many as 8 to 12 tabular members can be included. This can be done with either the smooth tabular members or the additional tabular members that include the bumps or depressions.

In another embodiment, the mats can be interlocked by providing, as noted, each of the first and second sides with an upper structure that has an upper surface that extends the top surface of the mat and a lower surface that slopes downwardly towards the bottom surface of the mat, while the third and fourth sides each include a lower structure that has a lower surface that extends the bottom surface of the mat and an upper surface that slopes upwardly towards the top surface of the mat. The downwardly sloped lower surface of the upper structure and the upwardly sloped upper surface of the lower structure are configured to allow for overlapping with respective lower and upper structures of other like mats when placed adjacent thereto for joining therewith by which the overlapped upper and lower structures form a generally flat continuous top and bottom surface of the overlapped mats.

To assist in connecting the mats and ramps together, one or more alignment tabs and one or more tab receiving slots are provided, with the tab(s) provided (a) on one of the upper or lower structures of the mat and the slots provided on the other of the upper or lower structures of the mat, or (b) on one of the downward sloped surface of the side ramp or the downward slope of the lower structure of the mat and with the slot(s) provided in the other of the downward sloped surface of the side ramp or the downward slope of the lower structure of the mat.

Like the mats and side ramps, each adapter may further comprise one or more alignment tabs and one or more tab receiving slots with the tab(s) provided (a) on a side portion of the adapter and one of the upper structure of the mat and the slots provided on the other of the side portion of the adapter and the upper structure of the mat, or (b) on one of a side portion of the adapter and the downward sloped surface of the side ramp with the slot(s) provided in the other of the side portion of the adapter and the downward sloped surface of the side ramp.

The upper and lower structures of the mats also include a plurality of openings. The openings of the upper structures are provided with a lower portion that protrudes below the sloping side while the openings of the lower structures are configured to be slightly wider and recessed then the protruding portions of the upper structures. Alternatively, the upper structures can be provided with downwardly facing protrusions while the lower structures can be provided with recesses that receive the protrusions. These configurations allow the protruding portions of the upper structures to be received within the openings of the lower structures so that a secure connection can be made. In some embodiments, the components are configured to provide snap blocking of the upper layer into the lower layer. This can be done by providing a narrower rim around the upper edge of the lower opening or recess. Alternatively, the openings can be designed to receive a fastening or pinning member, such as a cam, which can be inserted and rotated to lock the upper structures to the lower structures. This provides the most secure connection between the mats that is the least resistant to separate or move apart when in use. The same is true for the corresponding structures of the ramps and adapters. Details of all these configurations are described herein in connection with the appended drawings.

These panels are designed for quick and easy installation by one or two workers. To do this, a first mat is installed in a particular position with the lower structures exposed in the direction for addition of further mats. Thereafter, the upper structures of the additional mats are placed above the lower structures of the previously placed mat to connect the subsequent mats to the initially placed one. These operations are repeated until the entire temporary floor structure is completed. And the ends of the initially placed mats that have upper structures which are not in contact with lower structures of adjacent mats, a separate board or configured component can be placed beneath those sections for support to prevent breaking of upper structures. Alternatively, a certain number of the mats that are to be installed can be provided with only the lower structures on two sides and with opposite sides that are have the thickness of the entire mat. Similarly, on the last mats to be installed, the lower structure would not be receiving the upper structure of an additional mat. Again, a separate component can be added onto the lower structure to form the remaining upper surface of the mat, or certain mats can be provided only with upper structures on two sides and with the other two sides configured to have the thickness of the entire mat.

The openings are aligned so that they can easily be connected together, either by the upper protrusion engaging the opening of the lower opening, with or without snap-locking, and without requiring a large amount of force to connect the structures together during installation or to disengage them when removing the installation. Alternatively, the holes can be configured to receive a fastening component that can be quickly placed therein and turned to lock the edges together.

The configuration of these mats as well as the various sizes that can be used, facilitates a relatively quick and efficient installation of a temporary flooring system. The smaller mats are easily lifted and installed by one or more workers without the use of any connecting hardware. The mats are designed such that each subsequent mat can be laid upon an installed mat with the sloping members in contact.

These panels are designed for quick and easy installation by one or two workers. The snap-locking feature of the additional tabular members avoids the use of bolting, adding pins or complicated joining configuration which take time and effort resulting in much higher labor costs to install and remove the panels. And the openings or recesses are designed to easily receive the bumps and depressions of the tabular members to allow snap-locking without requiring a large amount of force to lock them together during installation or to disengage them when removing the installation.

The configuration of these mats as well as the various sizes that can be used, facilitates a relatively quick and efficient installation of a temporary flooring system. The smaller mats are easily lifted and installed by one or more workers without the use of any connecting hardware. The mats are designed such that the tabular members can easily slide into the openings of an adjacent mat when the additional mat to be installed is held at approximately a 45 degree angle. This enables the tabular members to be smoothly and easily received in the slots or recesses for a quick snap locking of the mats.

The same is true for the mats that include openings on the upper and lower structures of the sides of the mats. The openings can be configured so that those on the side of one mat can be received by or placed upon those on the corresponding side of another mat with the alignment tabs and slots assisting in the proper placement of one mat next to another. And when a very secure flooring is needed, the cams or other pinning elements can be used to connect the openings of those sides of the mats together in a locked position.

The configuration of the openings are designed and made either with cutouts or with a shorter or smaller dimension that does not extend to the full width of the mat such that the tabular members can be easily placed therein without binding. In addition when larger panel mats are in use, the lifting elements allows those mats to be simply and easily transported into position. In fact, the flooring installation proceeds in a manner such that after the initial panels are in place, the equipment that is lifting the mats can then move over the previously installed mats such that the field or gymnasium surface is not damaged by the installation equipment.

Turning now to the drawings, FIG. 1 shows a square panel mat 100 that has three tabular members or tabs 105 on the first side 110 thereof, and three additional tabular members or tabs 115 on the second side 120 thereof. The additional tabs 115 have a depression 125 in the form of an oval opening that has rounded edges and that extends into the tab, the function of which will be described with respect to FIG. 6. The upper surface of panel mat 100 also includes a plurality of raised hexagonal islands 160 which are spaced to provide channels therebetween which allow water to drain from the mat.

The panel mat 100 also has three openings 130 located on side 135 and three slots or slot-like recesses 140 located on side 145. Slots 140 also include a male member 150 which extends into the slot, the function of which is also explained with regard to the description of FIG. 5.

Figure 2:
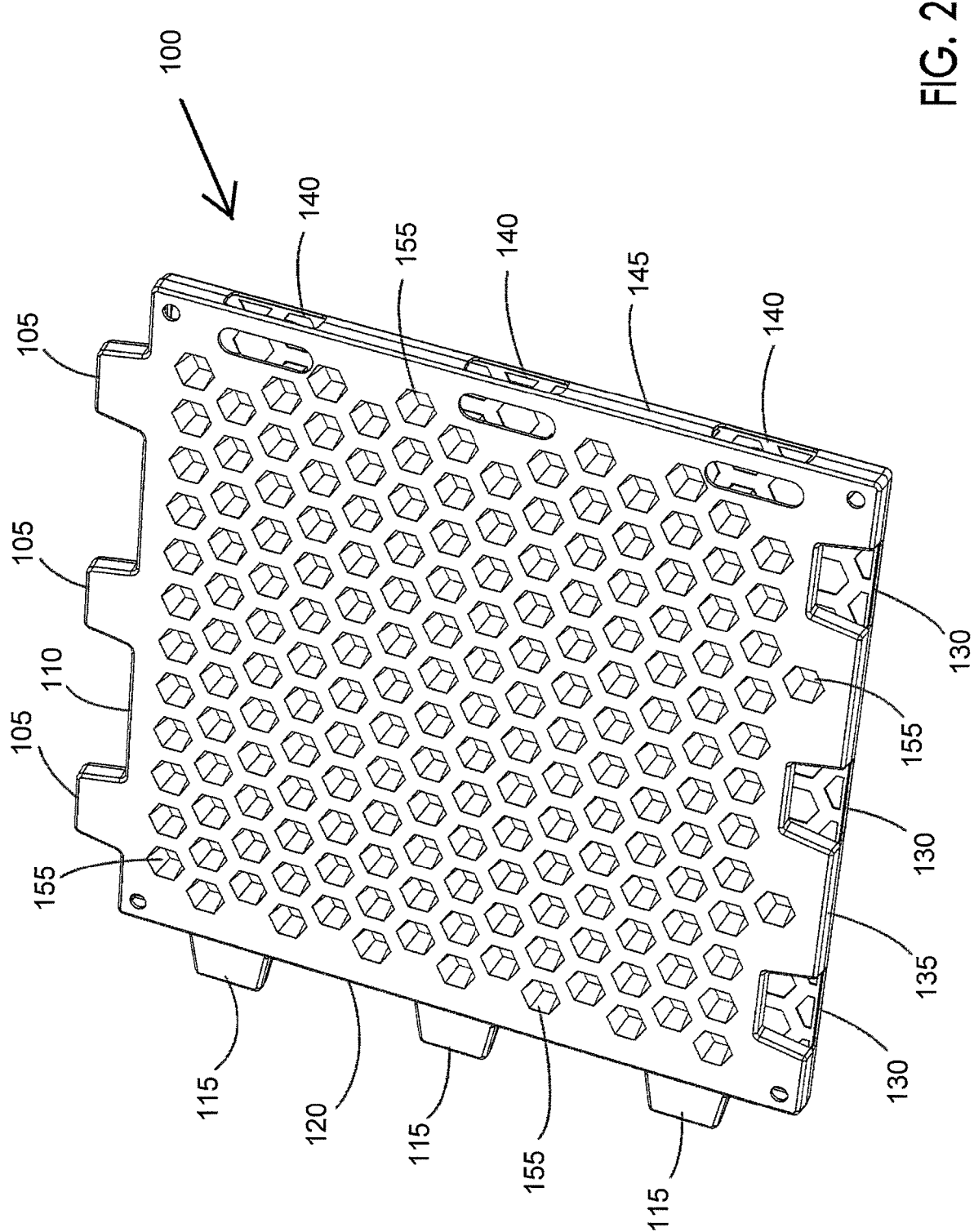
FIG. 2 is a perspective view of the mat of FIG. 1 showing a lower surface of the second section.

FIG. 2 illustrates the bottom surface of panel mat 100 wherein the same element numbers are used to describe the same components or features shown in FIG. 1. Additionally, the lower surface of panel mat 100 includes a plurality of hexagonal shaped holes 155.

Figure 3:
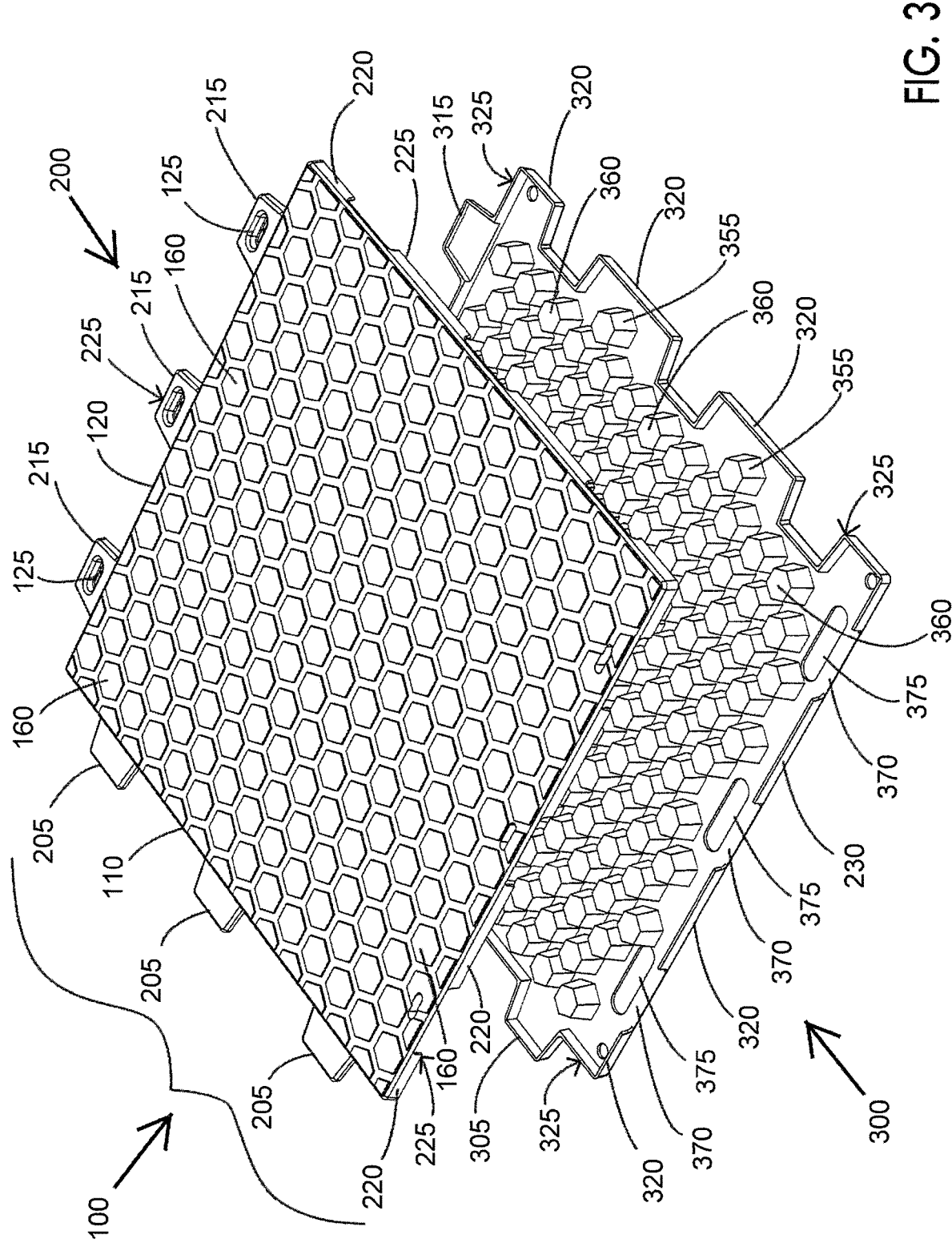
FIG. 3 is an exploded view of the mat of FIG. 1.

FIG. 3 more clearly shows that the panel mat 100 of FIG. 1 is initially molded in two sections, a top section 200 and a bottom section 300. The top section 200 includes the upper portions 205 of tabs 105 and upper portions 215 of additional tabs 115. The upper portions 205, 215 of the tabs are integrally formed with the top section 200. The top section 200 also has a peripheral boundary 225 which is located at the end of the downward facing edges 220 that are provided as well as below the sides of tab portions 205, 215. The bottom section 300 includes the lower portions 305 of the first tabs 105 as well as lower portions 315 of the additional tabs 115 with both portions integrally formed with the bottom section 300. Bottom section 300 also has upwardly extending edges 320 the ends of which form peripheral boundary 325. Peripheral boundary 325 also includes the ends of the tab portions 305, 315.

When the top and bottom sections of the mat are placed upon each other, the peripheral boundaries 225, 325 come into contact with each other and can be joined together by welding or an adhesive. This allows the spaces between the sections to be sealed from the entry of water, dirt or debris.

FIG. 3 also illustrates the holes 155 on the bottom surface of the bottom section to show how they are molded into the panel mat. These holes, which in this figure appear as hexagonal cups 355, have top surfaces 360 that fit beneath and contact the lower surfaces of islands 160 of the top section 200. Bottom section 300 also shows the bridge or rail structure 370 and adjacent openings 375 that allow dirt or debris that enters into slots 140 to exit rather than to remain in the panel mat.

Figure 4:
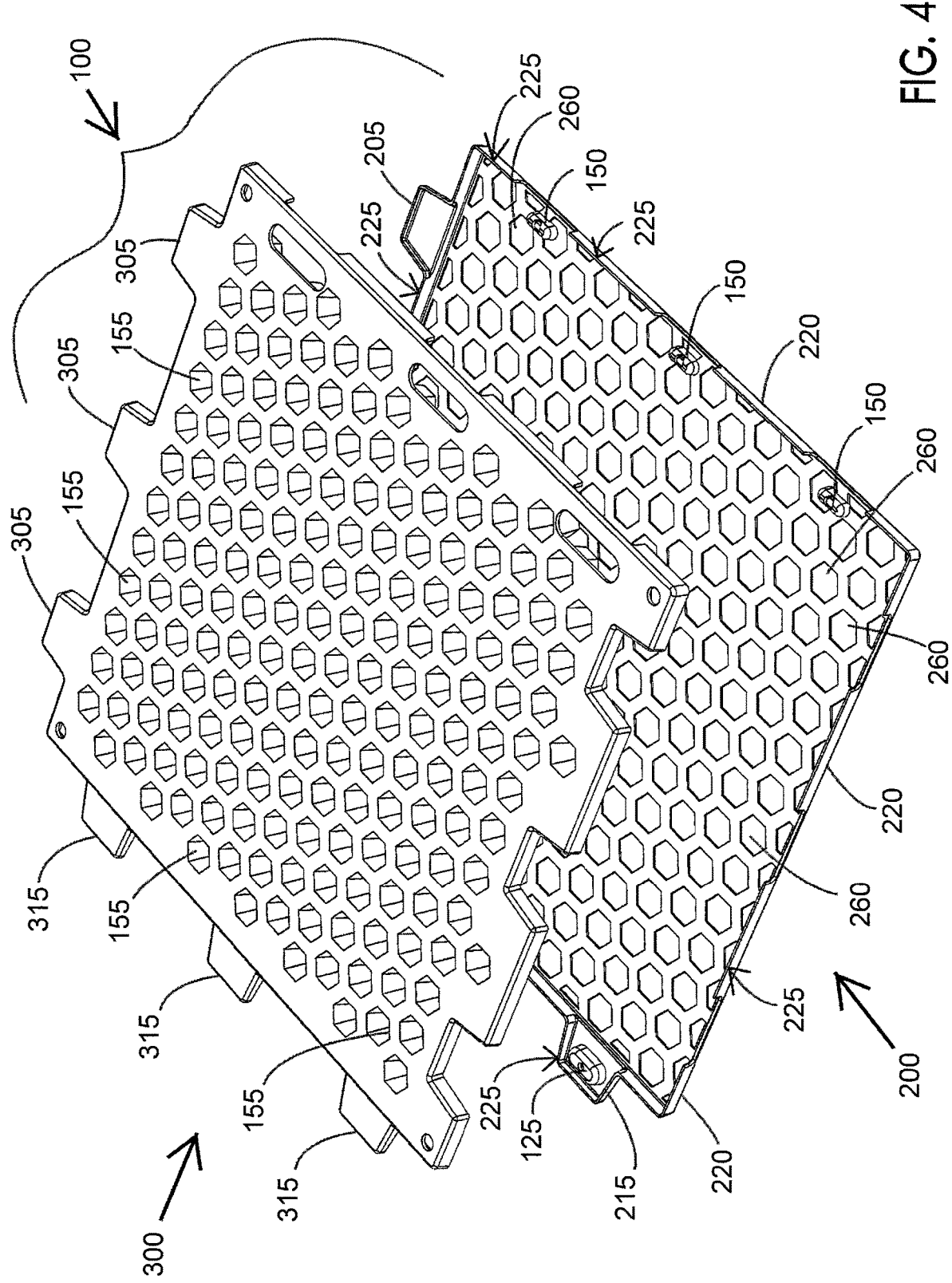
FIG. 4 is an exploded view of the mat of FIG. 2.

FIG. 4 shows the bottom surface of the bottom section 300 of the panel mat 100 with greater detail of the internal surface of the top section 200. The same numerals used in FIG. 3 are used in FIG. 4 to designate the same components. The internal surface of the top section shows the back sides 260 of the raised islands. Also shown is the bottom of depression 125 which as shown is an oval well or cup, and male member 150. These features are more clearly shown in FIG. 6.

Figure 5:
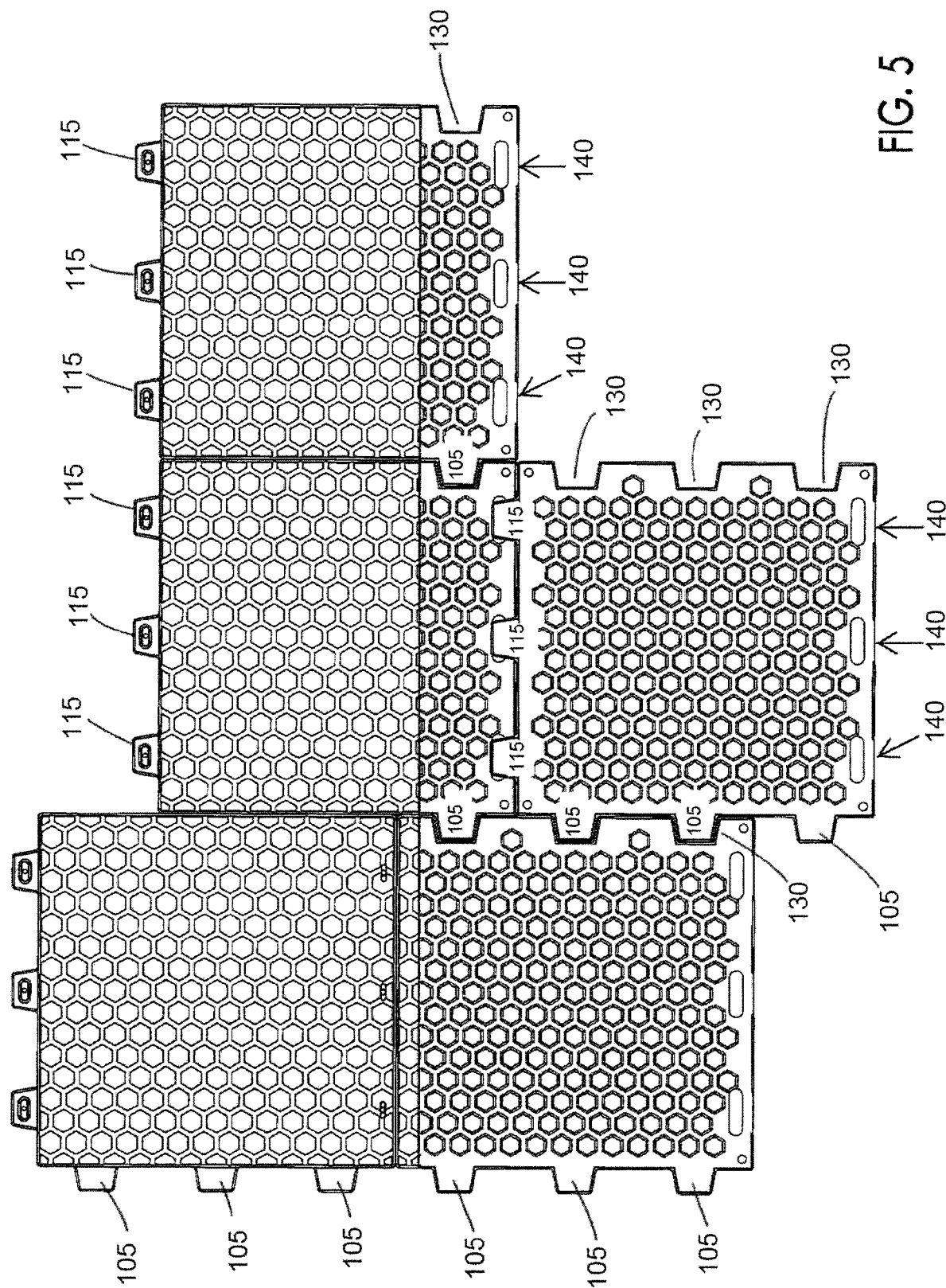
FIG. 5 is an illustration of five mats that are interconnected with the light areas illustrating the top surfaces of the connected mats and the dark areas illustrating the bottom surfaces of the connected mats.

FIG. 5 illustrates a number of connected mats wherein the lighter colors show the upper surfaces of the panel mats and the darker colors illustrate the bottom portions of the panel mats. The first tabs 105 of one panel mat are received in the openings 130 of an adjacent panel mat. Similarly, the additional tabs 115 are received in slots 140 of an adjacent panel mat. The details of these interlocking connections are illustrated in FIGS. 6 and 7.

Figure 6:
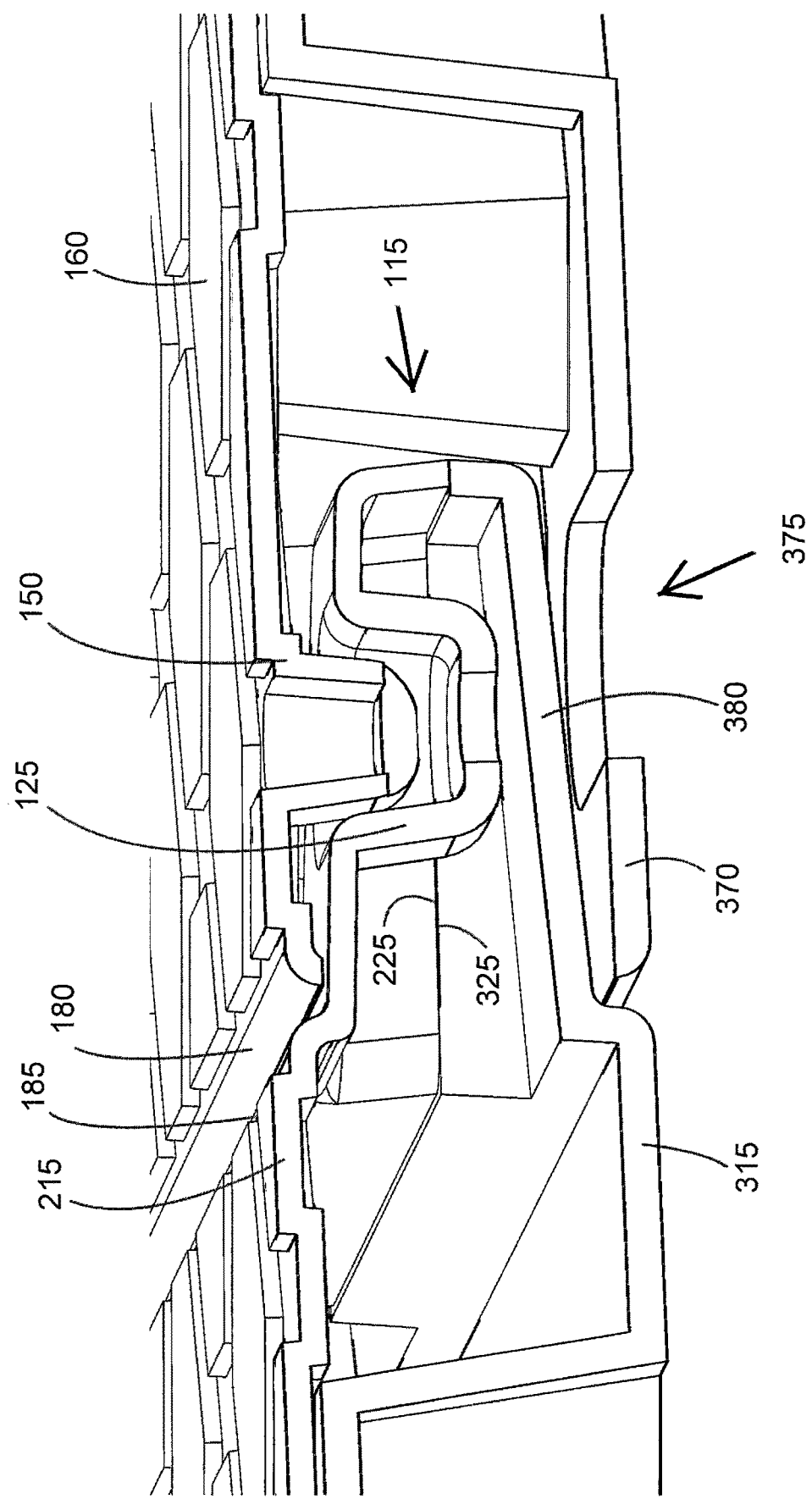
FIG. 6 is a cross-sectional detail of the snap-locking engagement of the male members and depressions of adjacently connected mats.

FIG. 6 shows that the additional tab 115 is formed by joining upper section 215 to lower section 315 at the point where the peripheral boundaries 225, 325 meet. Depression 125 is shown in position after having received male member 150 to provide snap-locking of one panel mat to another. FIG. 6 also shows the angled bottom portion 380 of additional tab 115 which is provided to disengage the interlocking of male member 15 in depression 125. This is achieved by lifting the opposite end of the panel mat upward so that the sloped bottom portion 380 moves downward in order to minimize engagement of male member 150 with depression 125. This along with the curved upper portions of the depression 125 allow the male member to slip out of the depression to disengage the snap-lock connection.

Figure 7:
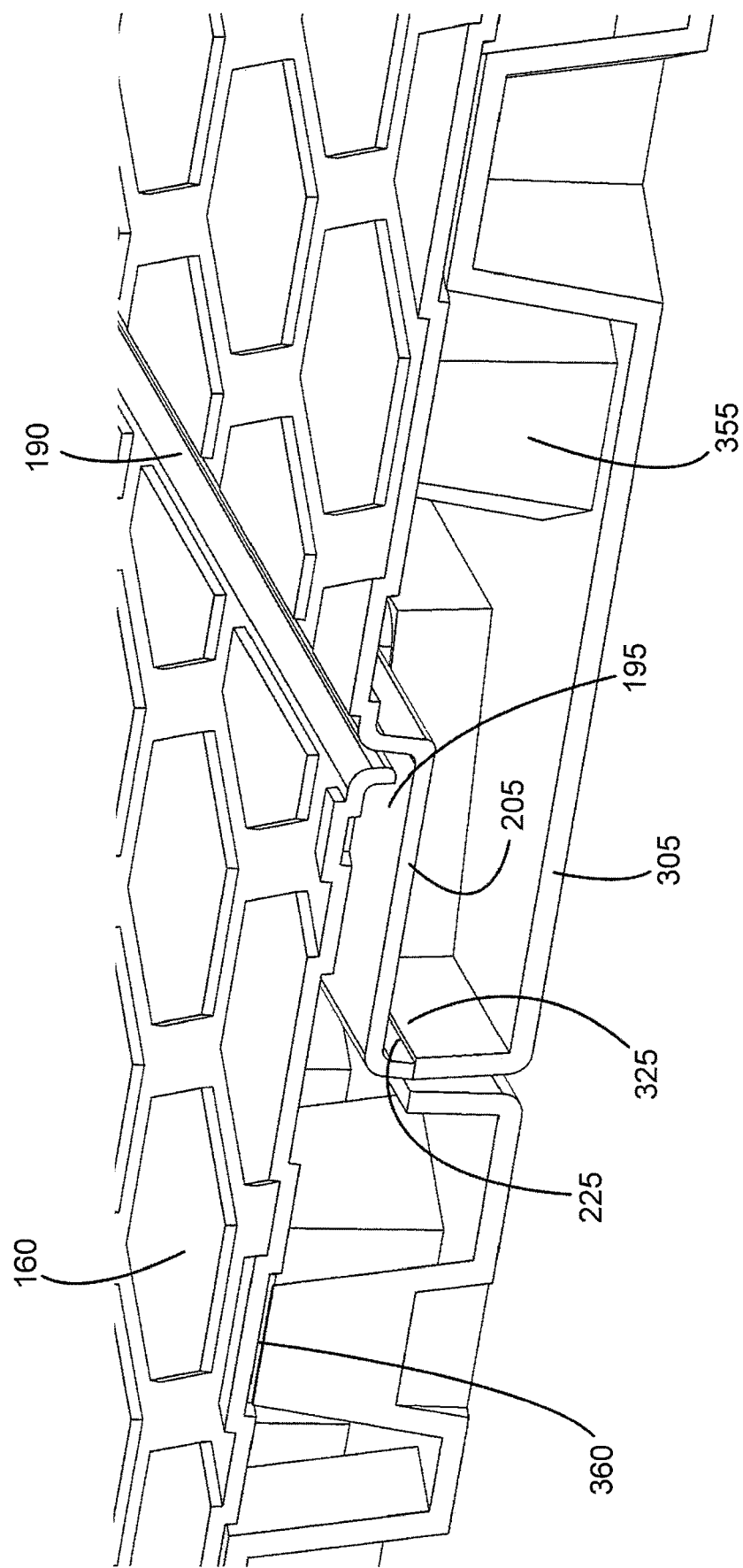
FIG. 7 is a cross-sectional detail of the mat to show a lip portion that forms with an adjacently connected mat a channel for removal of water.
Figure 8:
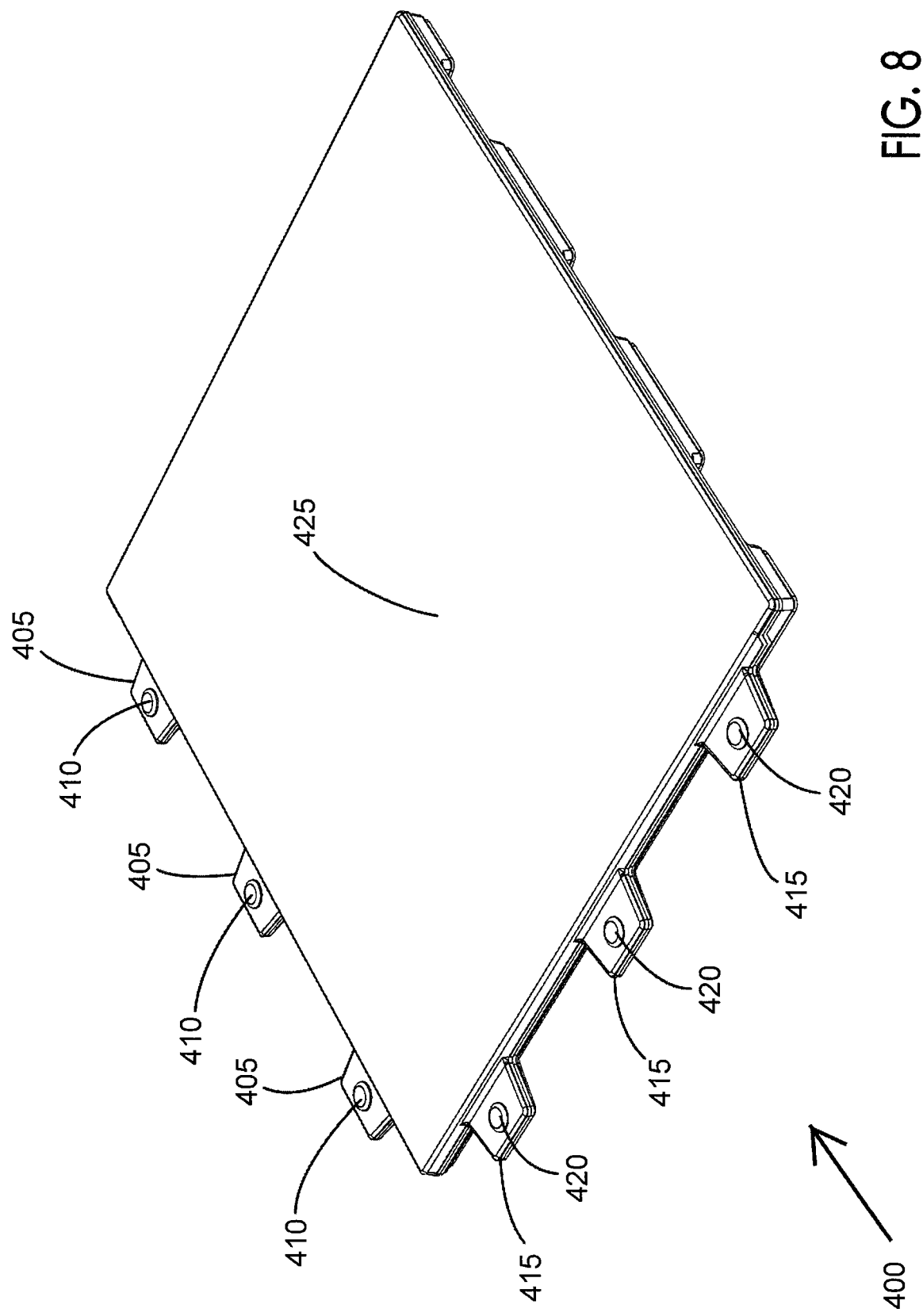
FIG. 8 is a perspective view of another panel mat according to the present invention, showing the top surface thereof.
Figure 9:
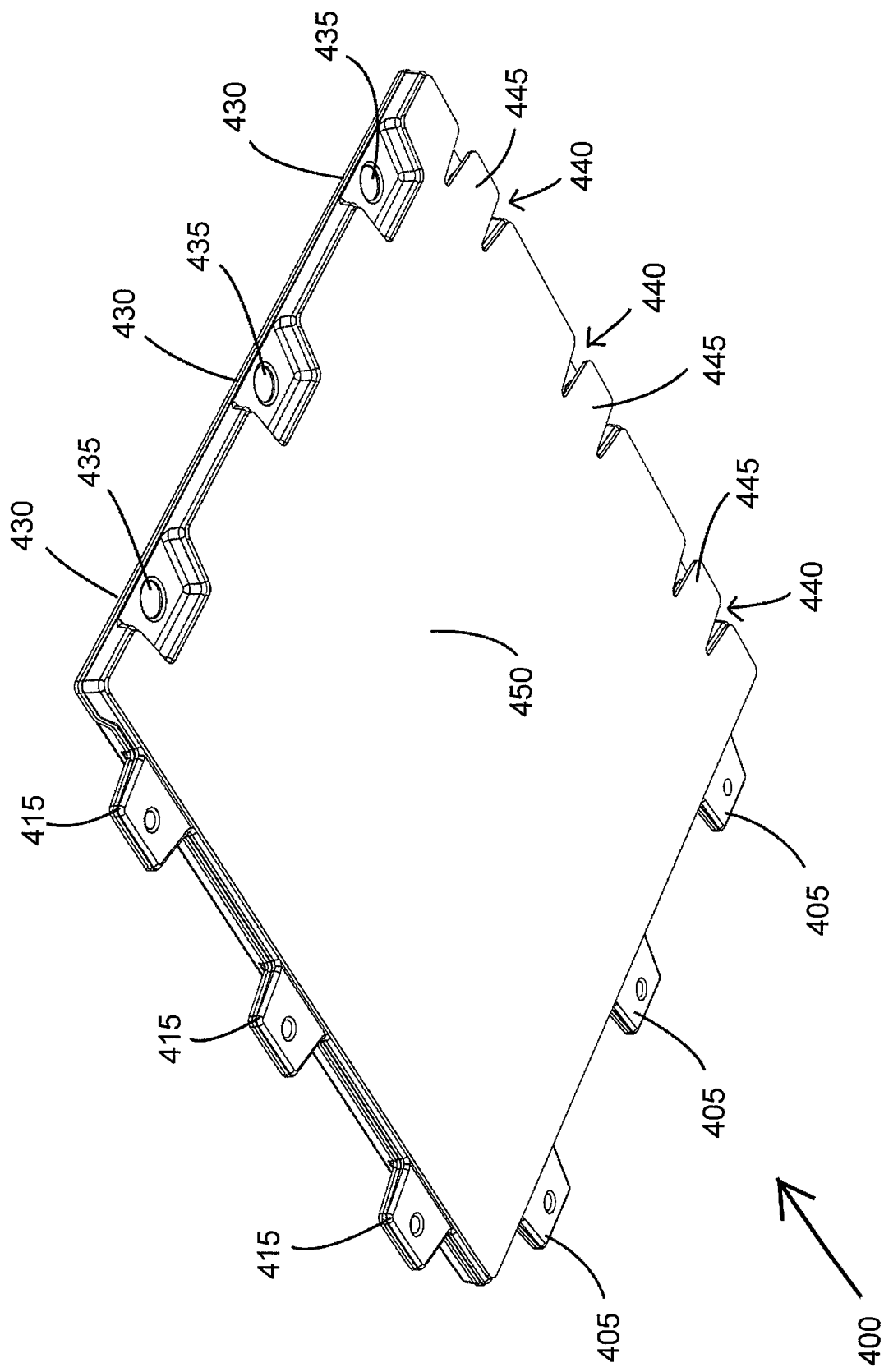
FIG. 9 is a perspective view of the panel mat of FIG. 8 showing the bottom surface thereof.

FIG. 7 illustrates tab 105 and it's insertion into opening 130. Tabular member 105 is also made by joining upper portion 205 to lower portion 305 at the peripheral boundaries 225, 325. As there is no interlocking of tab 105 into opening 130, the alignment and interconnection of the panel mats are achieved by configuring opening 130 to be of the same shape as but just slightly greater size than tab 105 so that simply sliding the tab 105 into slot 130 provides a tight fit.

FIG. 6 also illustrates the lip portion 180 that is provided on the top section 200 along one edge thereof. This contacts the end portion of the adjacent panel mat to provide a longitudinal channel 185 that allows water to drain from between the connected panel mats. Similarly in FIG. 7, lip portion 190 that is provided on the top section 200 along one edge thereof to engage the end of an adjacent panel mat to form a similar longitudinal channel 195 that performs the same function of allowing water to drain from between the connected panel mats.

FIGS. 3, 6 and 7 also illustrate the angled sidewalls of the cells that provide additional strength to support the upper surface of the first section as well as to provide compression resistance to the mat. While it is possible to use 90 degree cell wall angles, these are harder to mold into the second section and are not preferred for that reason. Instead, an angled sidewall, one that is fully or at least partially angled with respect to the upper and lower mat surfaces, provides greater rebound to the mat after the applied forces are removed. It also allows the cells to slightly compress but as each cell is adjacent another cell, the expansion is limited by the expansion of the adjacent cells. This provides good compression resistance to the mat. And as noted herein, the use of the bottom third section joined to the second section provides additional support for the cells and even more compression strength to the mat.

FIGS. 8-11 illustrate another panel mat 400 in accordance with the present invention this panel mat includes a first side that has three tabular extensions 405 each with a round protruding bump or disk 410. The second side of the mat is similarly configured with tab extensions 415 and round protruding discs 420 as shown. The mat has a flat upper surface 425 although it is possible to configure that surface with channels or other irregularities for water removal. For use indoors or in areas that are shielded from the elements (e.g., under a tent), a flat top surface is acceptable.

The opposite sides of the panel mat from tabular members are configured to receive such members. A third side of the mat includes three openings 430 each of which includes a central depression 435 which is configured, positioned and dimensioned to receive the circular bumps or disks 410 from a similarly configured panel mat to provide a snap-locking connection therebetween. To facilitate a smooth and easy connection, the depressions have a slightly greater circumference then the circular bumps or disks so that they can be received easily therein. In a preferred embodiment, the sidewall of the bumps is slightly angled so that it creates a tighter connection as it enters into the depression, but an extremely tight or nearly permanent connection is not desired, as the mats are generally used as a temporary flooring which needs to be disengaged and removed after a certain period of use. And preferably, the top surface of the bump or disc contacts the base of the depression to provide further support of that portion of the panel mat.

The fourth side of the panel mat includes similarly configured openings 440 with an additional feature of a floor or bridge element 445 which helps secure the tabular members 415 in the recess with the circular disk 420 in snap-locking engagement with the depression 455 that is present in the upper surface of the slot or recess 430. This depression 455 is best shown in FIG. 10.

Figure 10:
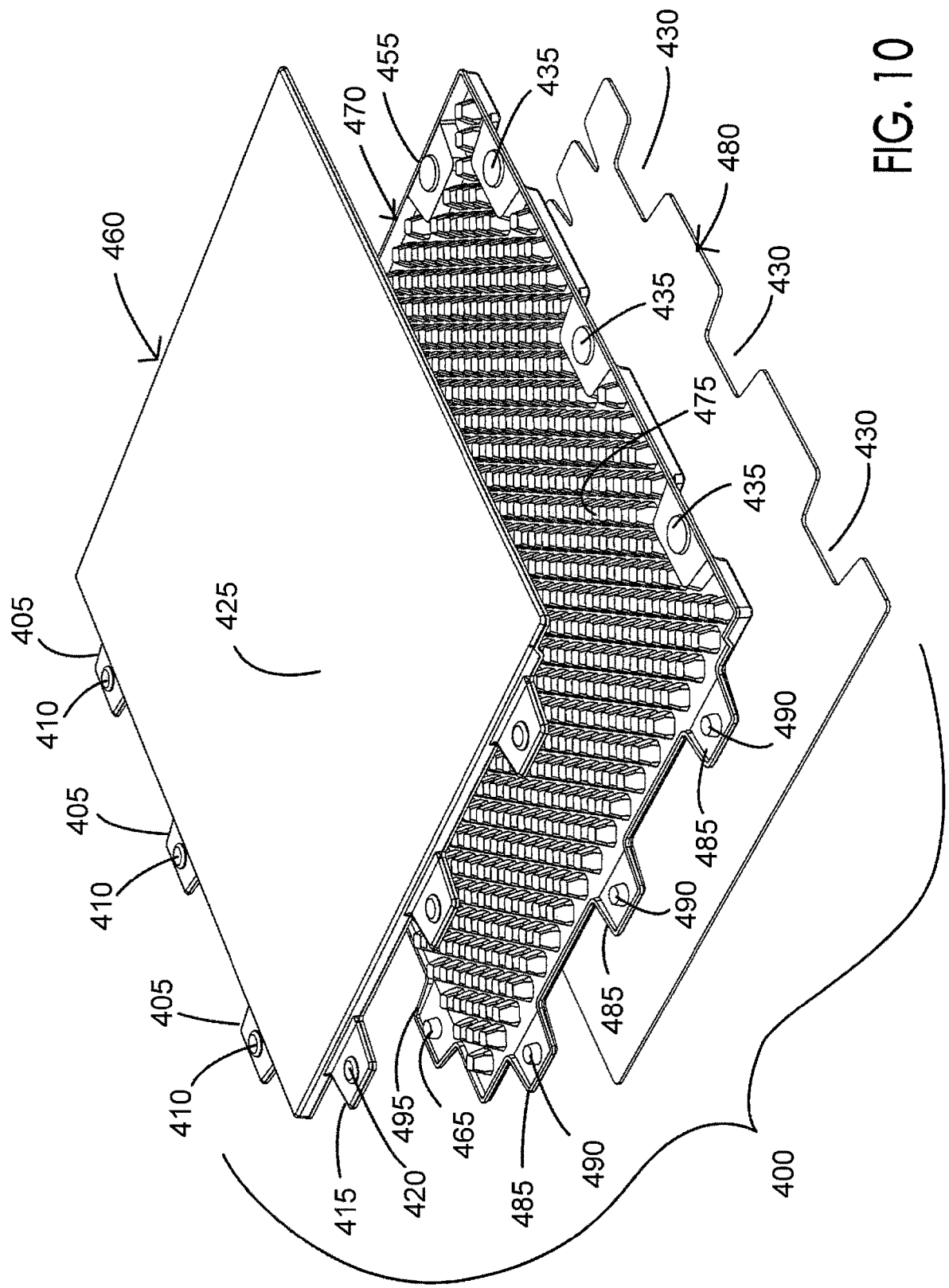
FIG. 10 is an exploded view of the panel mat of FIG. 8 looking down from the top surface.
Figure 11:
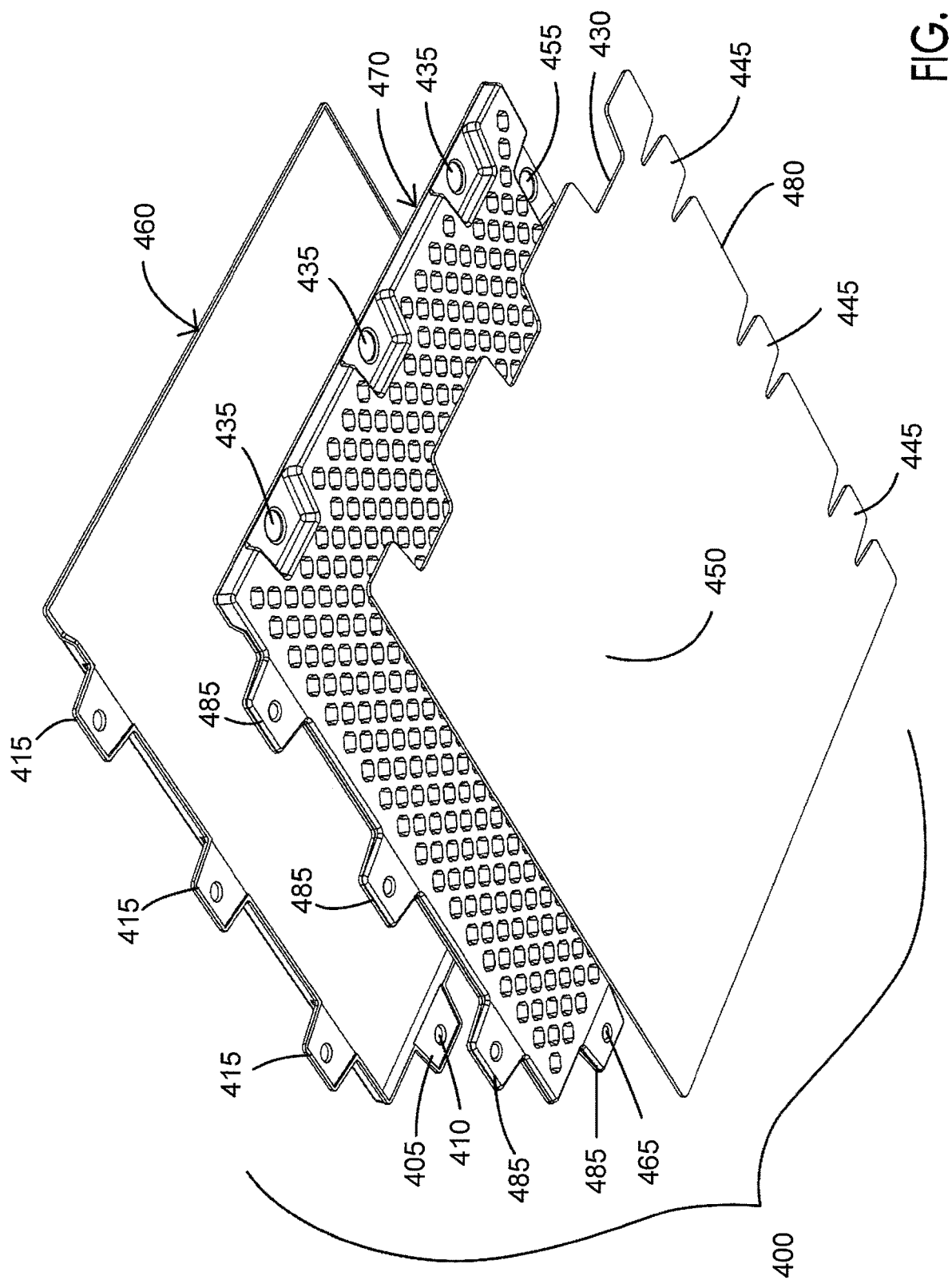
FIG. 11 is an exploded view of the panel mat of FIG. 9 looking up from the bottom surface.

FIGS. 10 and 11 also illustrate the three individual sections 460, 470, 480 which are joined together to form the panel mat 400. First or top section 460 includes part of the tabular members 410, 415 and the flat surface 425 that forms the top surface of the panel mat. Section 460 is relatively flat although it does include circumferential lip that provides a general recess beneath the top surface to receive the top surfaces of the geometric structures 475 that are present in the second section 470. These geometric structures 475 are generally cylindrical or trapezoidal in shape and have flat heads that contact and bond to the lower surface of section 460.

Second section 470 include also includes tabular members 485 and circular protruding discs 490 which are configured to be received within the back side of disks 420 of the first section 460, the back side acting as a depression, so that the tabular members can snap-lock the tabular portions 415,485 together. A similar structure is provided for the tabular members 405,495 so that they can also snap-lock together.

And the disks of the tabular members 485, 495 of the second section are designed so that they fit within the depressions of the tabular members 405, 415 of the top section 460. The sidewalls of these disks or bumps 490 can be angled to provide an easy entry into the depression followed by a more secure joint. This is of importance because the second section is adhered to, welded to, or otherwise bonded to the first section to provide an integral panel mat component of the two sections that can be used as is or that can be provided with the third section 480. While a press-fit is acceptable, the disc and recess are configured so that the top surface of the disc is seated in the bottom surface of the recess to provide further support to the tabular member.

Yet another way to join sections 460, 470 together would be to heat the sections and press them together in a mold so that the top surfaces of the geometrical elements 475 bond to the bottom surface of section 460. Similarly, the top surfaces of bumps 490 of tabular members 485 can bond to the recesses behind bumps 420 of tabular members 415. The same is true for the joining of tabular members 495 and 405. The resulting structure is an integrally joined together and cannot be easily separated.

A most preferred joining technique for the first and second sections is to prepare them in a twin-sheeting operation. This operation, which is also known as twin sheet forming, combines the process disciplines of compression molding, blow molding, and vacuum forming to mold, laminate, and trim multiple layers of materials (substrates with cover stock) in a one step process. The twin sheet molding process forms two sheets of plastic simultaneously through the use of a separate mold on the top platen and a separate mold on the bottom platen. Once the plastic sheets have been vacuum formed, they remain in their respective molds. While both sheets still remain at their forming temperature, the two molds are brought together under high pressures and the two sheets are bonded together. The result is a single product with hollow areas requiring no secondary bonding operations.

To provide a flat surface 450 for the mat, third section 480 is provided as a separate flat plate. This plate 450 may be bonded to the lower side of the second section 470 by welding, adhesives or by applying heat and pressure to the components in a mold. Third section 480 includes openings 430 and bridge members 445 which assist in allowing the tabular members to snap-lock with the recesses 455 that are provided in the lower surface of the second section 470.

FIGS. 12A-12C provide details of how the three sections are joined together. The lower surface of the top section 460 is bonded to the top surfaces of the geometric elements 475 of layer 470. Between the geometric elements, a lower portion is provided that provides another flat surface that is adhered or bound to the inside surface of lower section 480. This is best shown in FIGS. 12B and 12C. FIG. 12B also shows the construction of the tabular portion to illustrate how tabular portion 485 and disk 490 fit into the back side of protruding disc 420 of tabular member 415. Again, the top surface of bump or disk 490 is bonded to the lower surface of the recess provided on the opposite side of bump 420. FIGS. 12B and 12C also illustrate the use of partially angled sidewalls for the cells of the second section. Preferably, at least ⅓ to ½ of the cell height is provided as an angled portion wherein the angle is between 45 and 75 degrees with respect to either the top or bottom surfaces of the mat.

FIGS. 13A and B illustrate how the panel mats can be joined together with FIG. 13A a showing a top view and FIG. 13B showing a bottom view. It is preferred that the panel mats be joined in a staggered configuration so that all of the joints do not align in the temporary floor that is constructed. Also, FIGS. 13A and 13B show two square panels bonded together before a third panel is interlocked thereto in a staggered configuration. Another embodiment of the invention relates to the use of a rectangular panel and the two panels that are joined together in a linear way as shown in FIGS. 13A and 13B could instead be configured as a single rectangular panel mat. These larger rectangular panel mats would be used for larger installations as the larger rectangular size would facilitate a faster installation. The construction would be the same as disclosed herein for the square panel mats that are shown.

Figure 14:
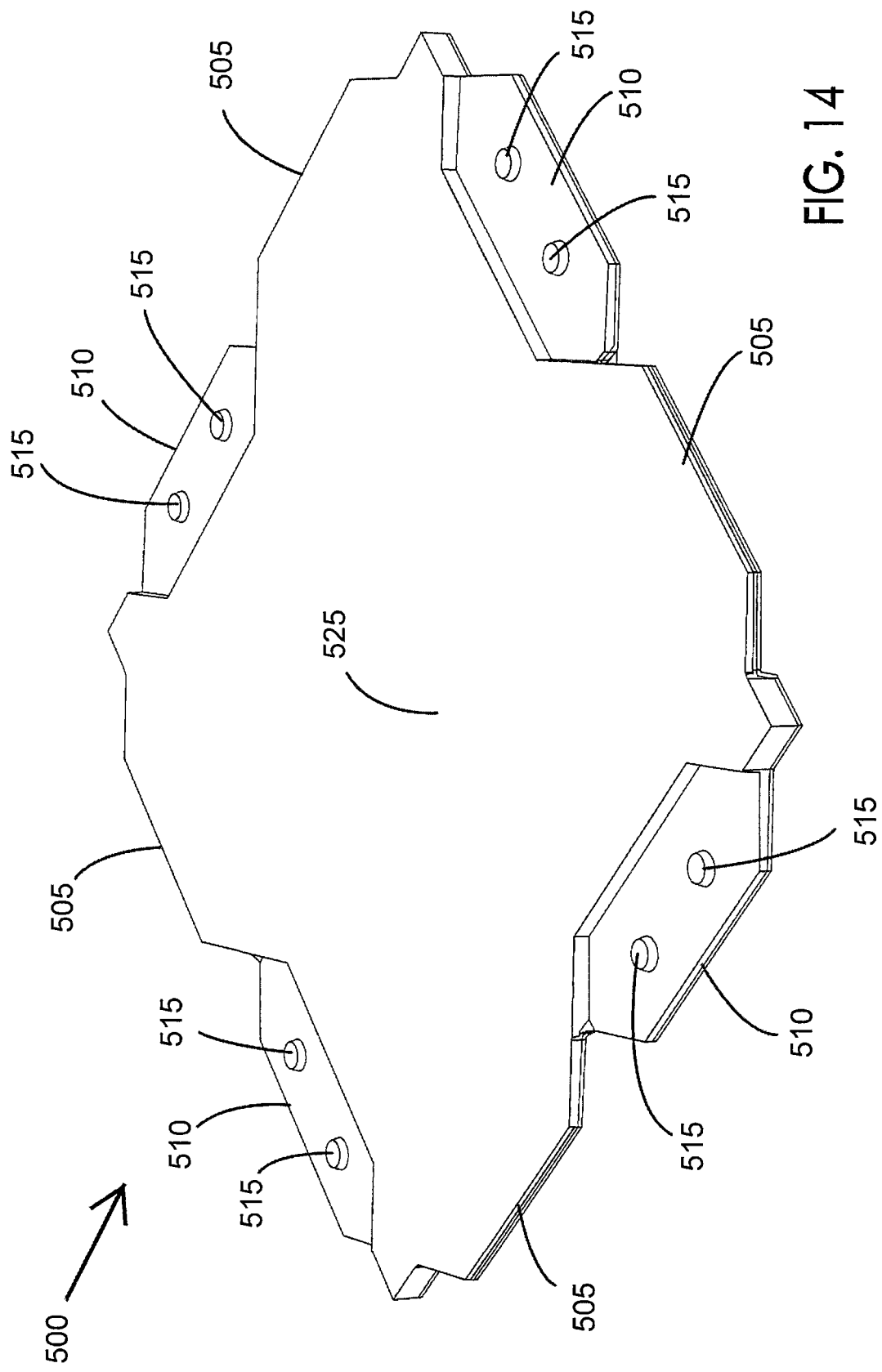
FIG. 14 is a perspective view of yet another panel mat according to the present invention when viewed from the top surface thereof.
Figure 15:
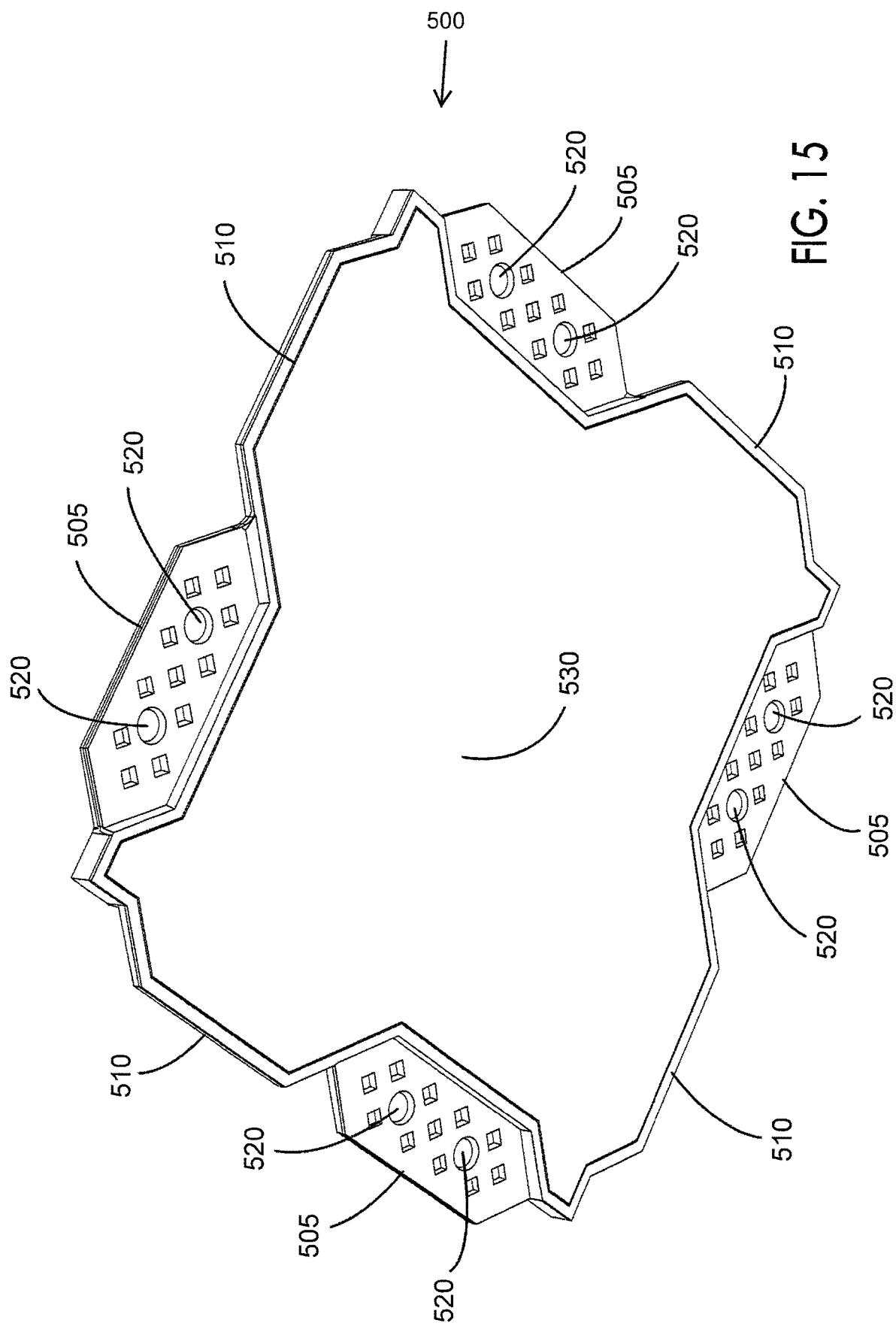
FIG. 15 is a perspective view of the panel mat of FIG. 14 when viewed from the bottom surface thereof.
Figure 16:
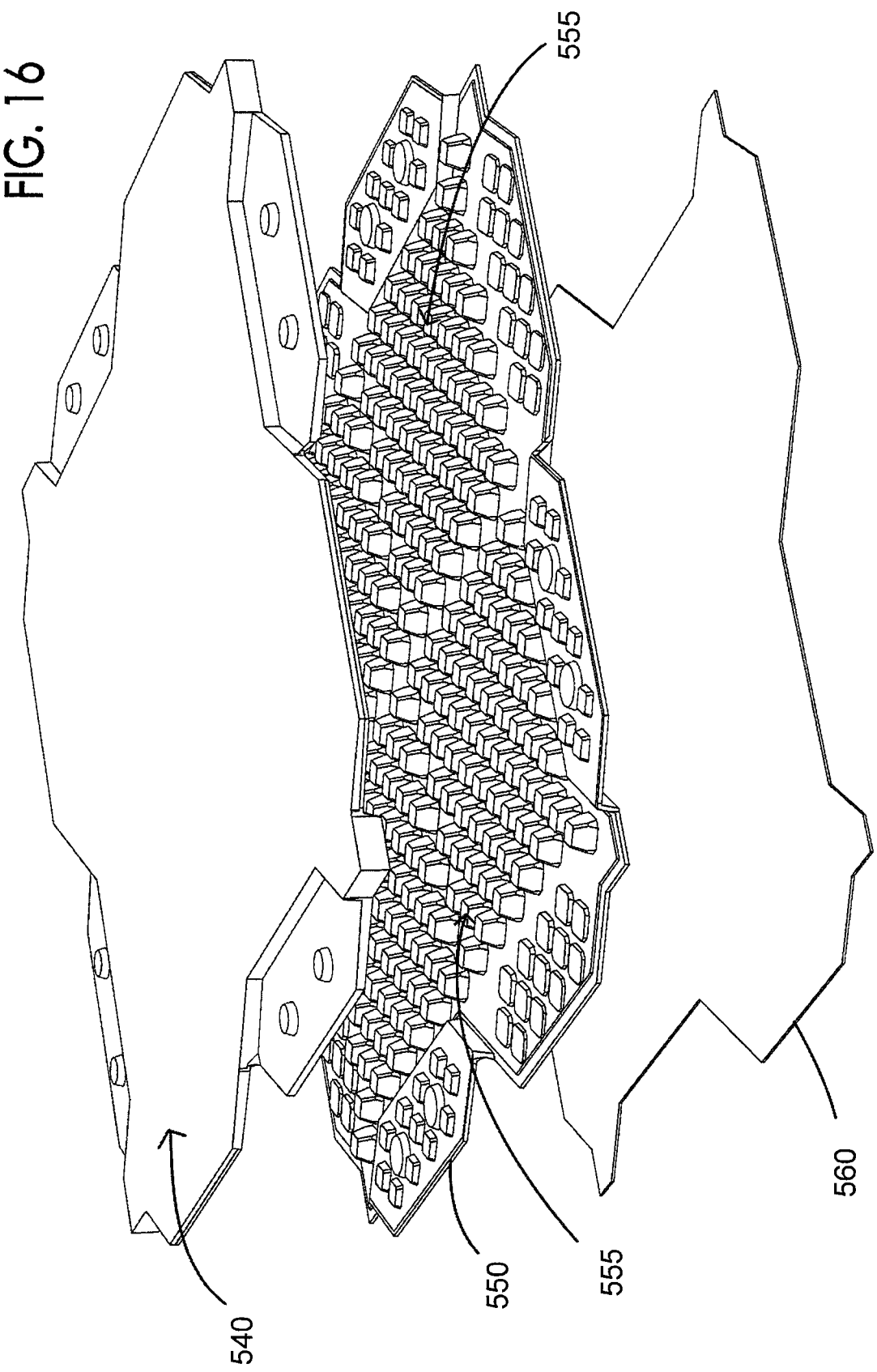
FIG. 16 is an exploded view of the panel mat of FIG. 14.

FIGS. 14-16 illustrate yet another panel mat 500 according to the present invention. This panel mat 500 has two tabular extensions on each side, one 505 in a relatively higher position and the other 510 in a relatively lower position. These dual tabular extensions are provided uniformly on each side of the panel mat 500.

The lower tabular extensions 510 have on their upper surface protruding discs or bumps 515 while the higher tabular extensions 505 have on their lower surfaces, depressions 520 which are configured dimensioned and arranged to receive therein the bumps 515 of the lower tabular extensions 510. The upper surface of the mat 525 as well as the lower surface of the mat 530 are shown as being relatively flat, but as noted herein, a textured or structured surface can also be provided when these mats are to be used outdoors where they will experience rain, snow or other forms of moisture.

FIG. 16 illustrates the three sections of panel mat 500, namely upper section 540 middle section 550 and lower section 560. As in the embodiment of FIGS. 8-11, the middle section 550 is configured with the plurality of geometric elements, shown in FIG. 16 as flat-top trapezoidal elements 555 which are designed so that their top surfaces contact the bottom surface of top section 540. Also, the middle section 550 includes supporting structures for the tabular extensions. As in the other embodiments, the top 540 and middle 550 sections are joined together securely by molding, welding, and adhesives or by the application of heat and pressure while in a press in order to securely attach the sections together. Thereafter, the lower or third section 560 can be bonded to the bottom of the second section to seal off all of the geometric elements and form a flat bottom surface for the panel mat 500.

Figure 17:
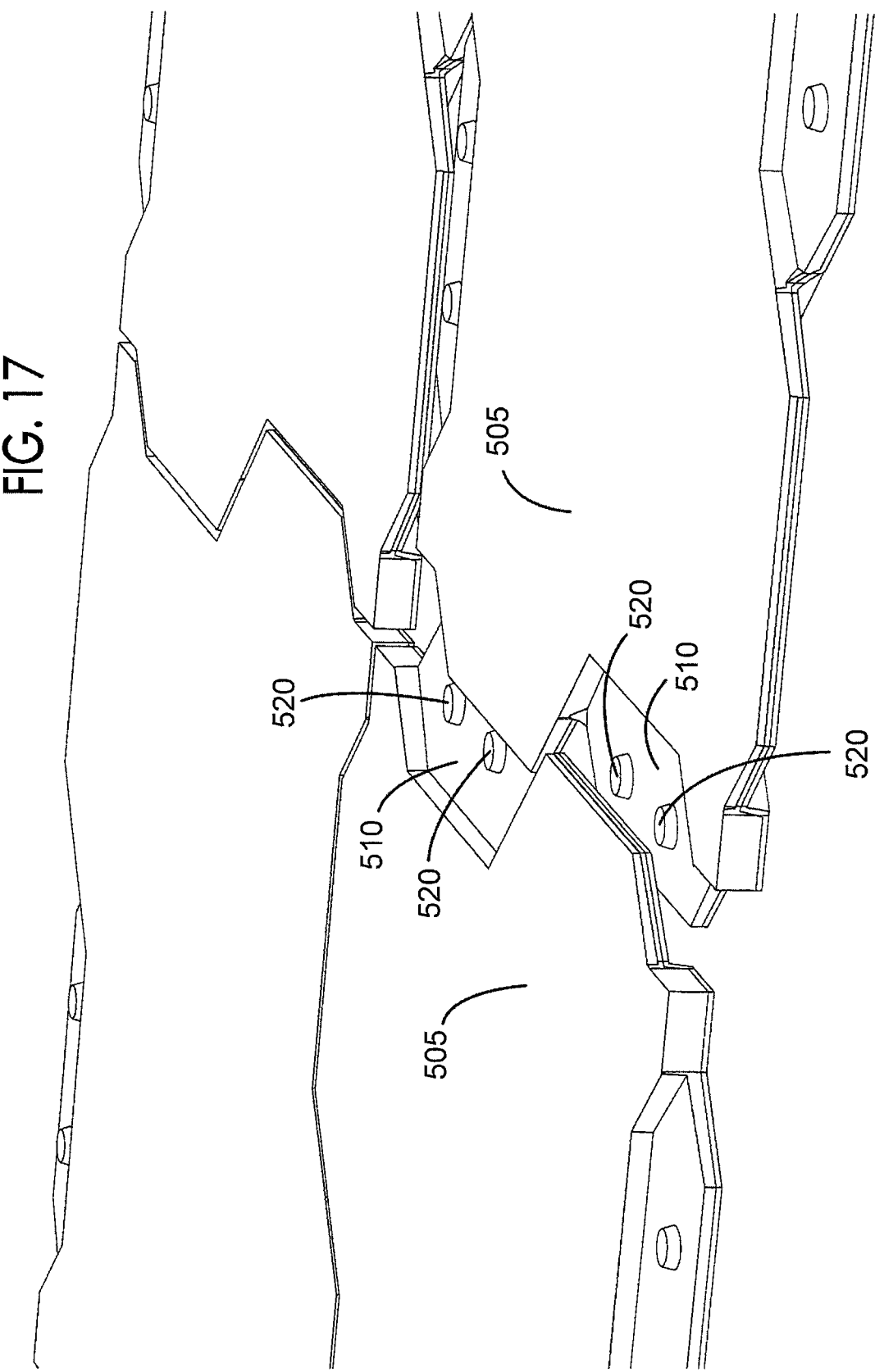
FIG. 17 is a detail view of the interlocking of four panel mats according to FIG. 14.

FIG. 17 illustrates how the panel mats can be joined together with the relative positions of tabular members 505, 510, protruding bumps 520, and mating depressions. As shown, the mat is slightly skewed during installation so that the upper tabular member 505 is slightly above tabular member 510 while the other tabular member 510 is placed below tabular member 505 of an adjacent mat. These tabular members slide easily together and provide snap-locking of the mats together. Also the tabular members are configured so that the joining line of the mats are not straight thus providing greater stability of the installed temporary flooring.

As noted, although not necessarily preferred for certain embodiments, the panel mats can be formed of a single piece of plastic or elastomeric material that is cut, drilled, milled or routered to the desired shape and configuration. For example, a solid sheet or molded plastic or rubber can be configured with the tabs, slots, openings, and surface features described herein. While this is more expensive, the costs for setting up the machining equipment would be amortized across the large number of mats that would be produced with these features. This can be used to form the first and second sections of the mat while when a flat or closed bottom surface is desired, this would be achieved by the addition of a third section of a flat plate.

And as noted, the channels that are linear or random lines or grooves on the top and bottom surfaces of the panel mat allow water to drain from the top surface while also allowing the bottom surface of the mat to be more securely placed on wet or muddy ground. And the bottom surface may include openings as shown herein for the second to partially receive gravel or other prepared ground surfaces to again more securely anchor the panel mat in place. It also can be flat by the addition of a third section.

Figure 18:
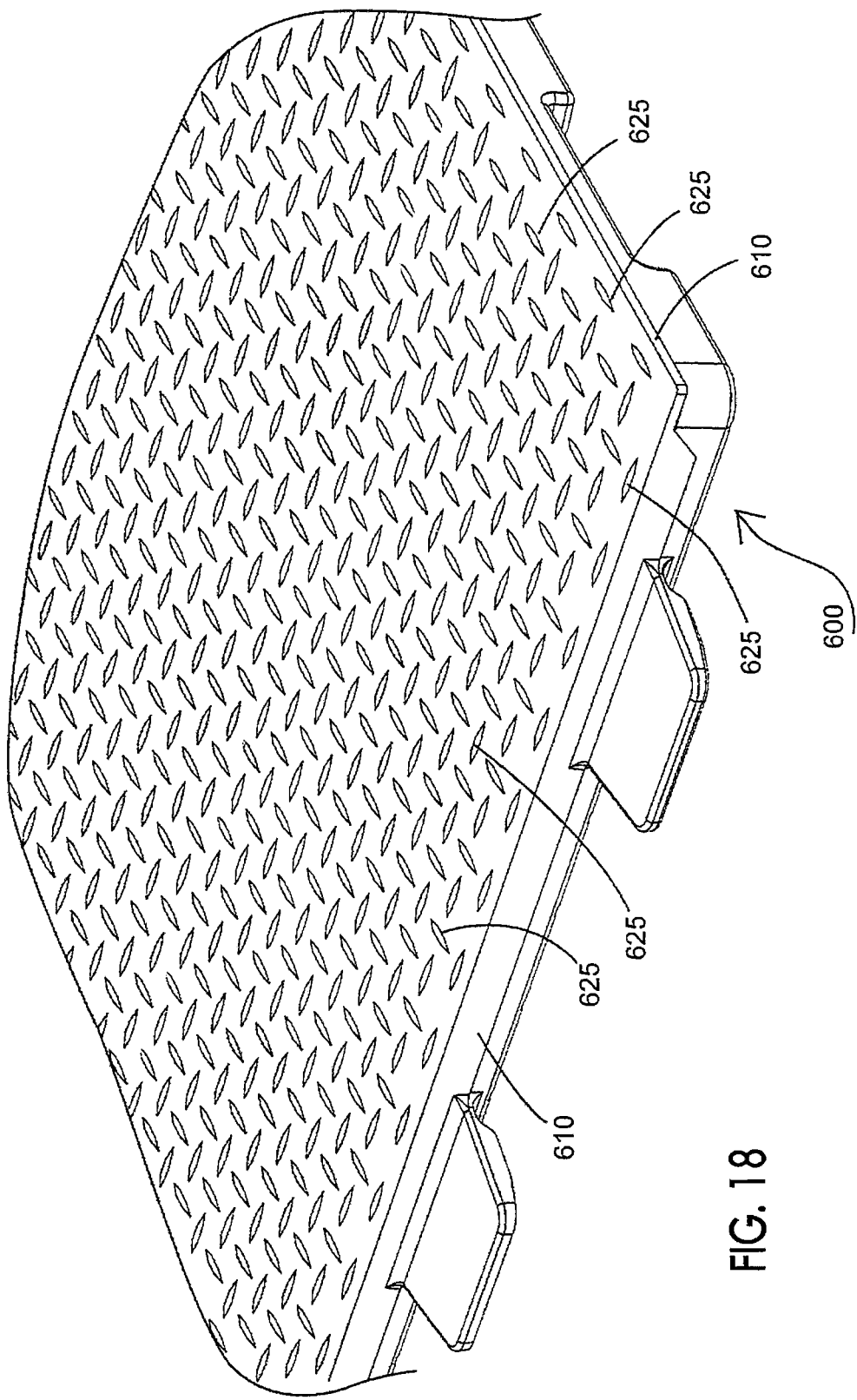
FIG. 18 illustrates a mat that has a structured upper surface in the form of a herringbone pattern.
Figure 19:
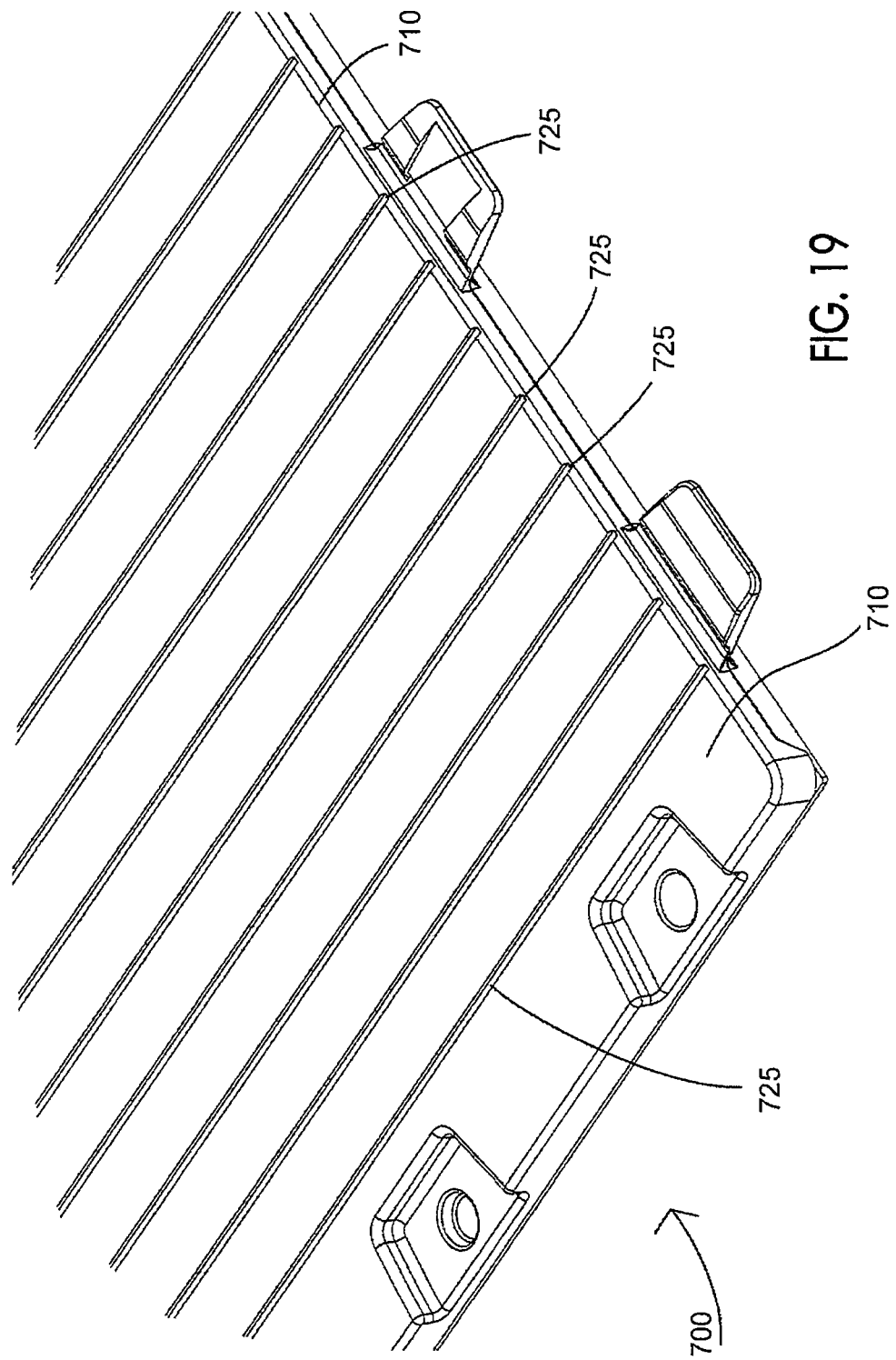
FIG. 19 illustrates the bottom surface of a mat that has linear channels provided therein.

FIGS. 18 and 19 illustrate mats that have alternative structured surfaces. FIG. 18 illustrates a mat 600 that includes an upper surface in the first section 810 with a herringbone pattern of raised elongated bumps 625. These bumps are molded into the upper surface of the top section 610 of the mat in order to provide resistance to slipping when operators or equipment move across the mat. The herringbone pattern and elongated bumps 625 provide sufficient open space between them to allow water to drain from the mat in particularly when a worker steps on the mat or a tire or other item moves across the mat when the mat is wet.

Alternatively, other designs can be used to provide a structured surface on the mat. FIG. 19 illustrates a mat 700 that has on the bottom of its third section 710 a plurality of linear channels 725 which are molded into the bottom surface of that section. These channels 725 assist in allowing moisture to drain from the mat when the mat is placed on wet or muddy ground. It also provides a more secure footing for the mat on such ground.

Figure 20:
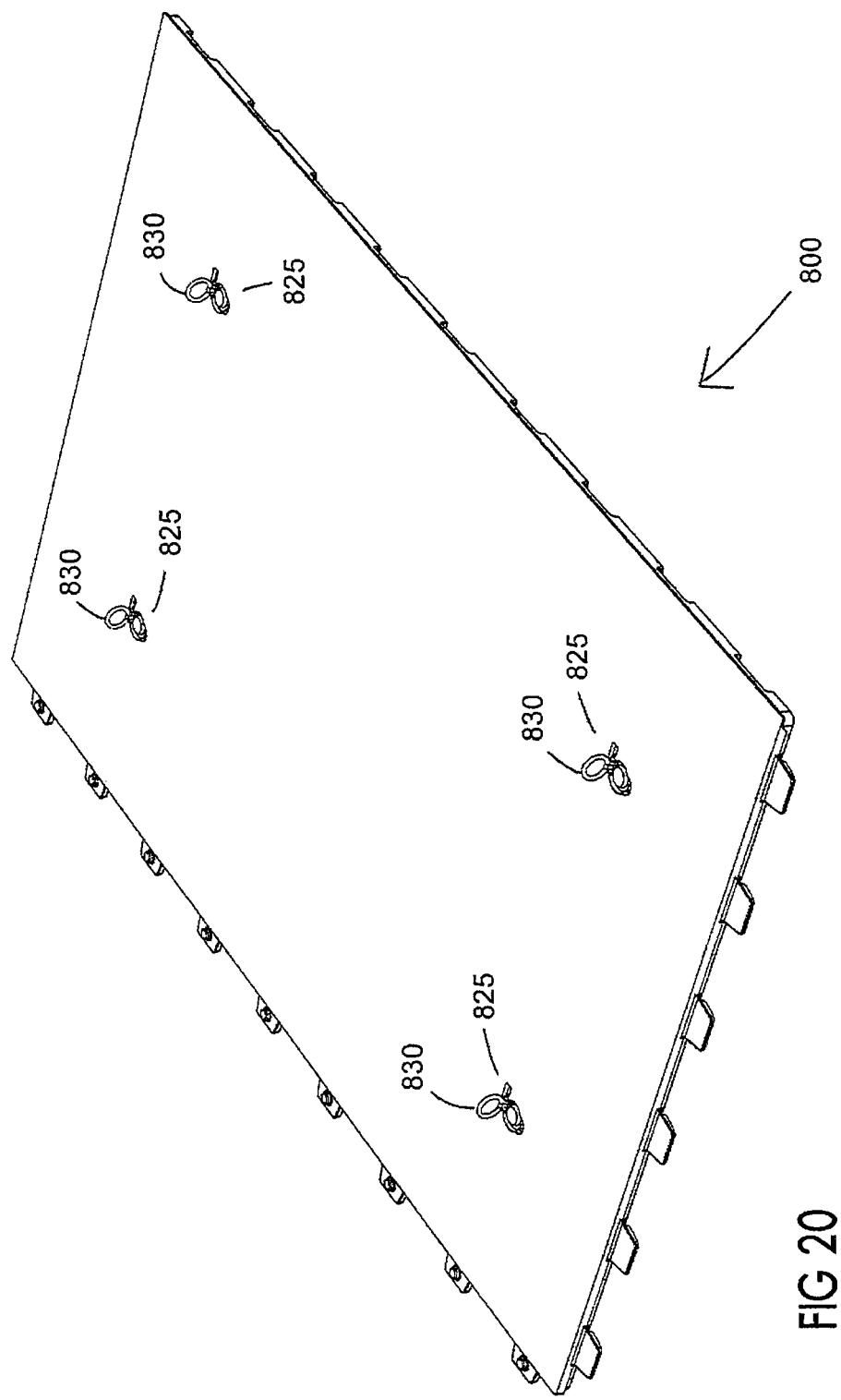
FIG. 20 illustrates a mat having four lifting elements.

And while the panel mats of the present invention are shown with tabs on one side and receiving openings or recesses on an opposite side, it is also possible to include alternating tabs and openings or recesses on any particular side of the mat. FIG. 20 illustrates a rectangular mat 800 that has six tabular members on the shorter side and 810 members on the longer side. The opposite sides to those would have six or eight openings, respectively, as described hereinabove. Mat 800 also has multiple tabular members on two sides and multiple holes on the other two sides. It is also possible to include such multiple tabs and openings on each side of the mat if desired. In such a configuration, the mats cannot be joined with each mat in an end to end or side to side alignment with an adjacent mat. Instead, these mats would be staggered so that the tabular members can be received in the openings of an adjacent mat. This results in a staggered joining of adjacent mats which is advantageous because the final joined flooring structure would not have aligned mats that would provide linear extended joints across the entire flooring. Such an arrangement is preferred because the mats would tend to remain connected and would resist disengagement compared to mats that are aligned with complete linear joints across the entire flooring installation.

When tabs are provided on two sides of the mat and openings on the opposite two sides, it is preferred, however, that tabs and openings or recesses be provided on opposite sides of the mat as this facilitates a more rapid installation. For certain installations, however, especially when larger size panel mats are used, the provision of tabs and recesses on a particular side of the mat assist in aligning multiple panel mats for installation. This is of greater interest when rectangular rather than square panel mats are used.

The third section preferably is used to provide a flat bottom surface for the panel mat. It is possible for the third section to be configures so that it also extends beneath the tabular members to further reinforce those members and help them resist damage during installation when the tabular members are inserted into the openings, slots or recesses, as well as to protect against damage from impact if the panel mats were to be dropped in a way where the tabular members would engage the ground first and bear the force of the weight of the mat.

Of course, as noted herein, when the upper surface of the first section is structured, the bottom surface of the third section can be similarly structured in a similar manner or with a different type of structure. FIGS. 18 and 19 illustrate a preferred combination of different structures wherein FIG. 18 shows a herringbone pattern on the top surface of the first section while FIG. 19 illustrates linear channels provided on the bottom surface of the third section.

FIG. 20 also illustrates lifting elements 825 four of which are provided on rectangular mat 800, which would typically have a larger size of about 8'×16'. The lifting elements 825 are shown with a lifting ring 830 which is standing vertically in an operative position to be engaged by lifting equipment.

Figure 21:
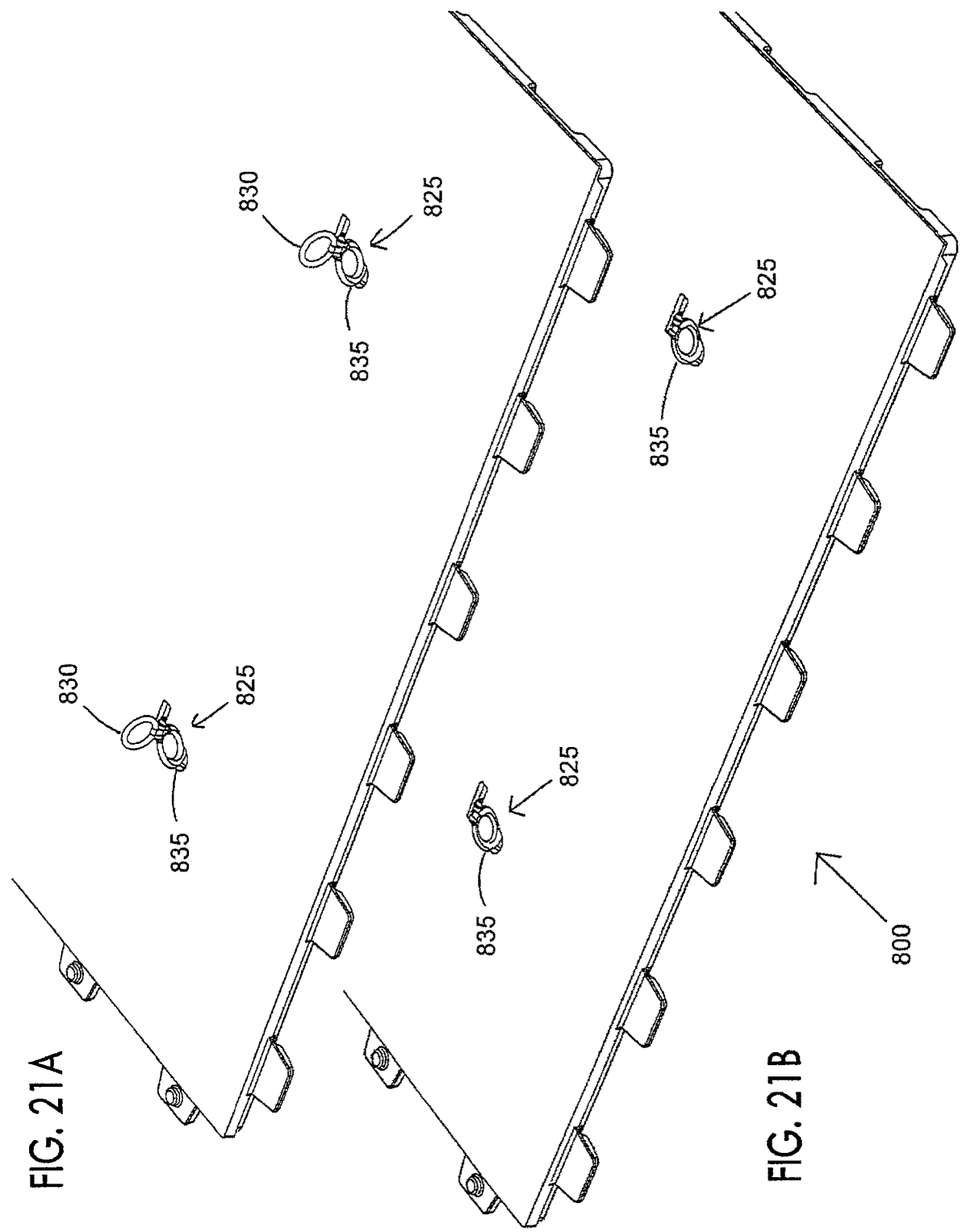
FIGS. 21A and 21B illustrate the mat of FIG. 20 with the lifting elements in an operative position in FIG. 21A and in a retracted position in FIG. 21B.

FIGS. 21A and 21B further illustrate this feature. In FIG. 21A, the lifting element is shown with ring 830 in the operative position. Also shown is recess 835 which is configured to have the same shape and depth as ring 830. FIG. 21B illustrates the ring 830 pivoted downwardly to fit within recess 835 so that the upper surface of the mat is generally planar. This would avoid workers tripping over the lifting element if it were not retracted into the surface of the mat.

Figure 22:
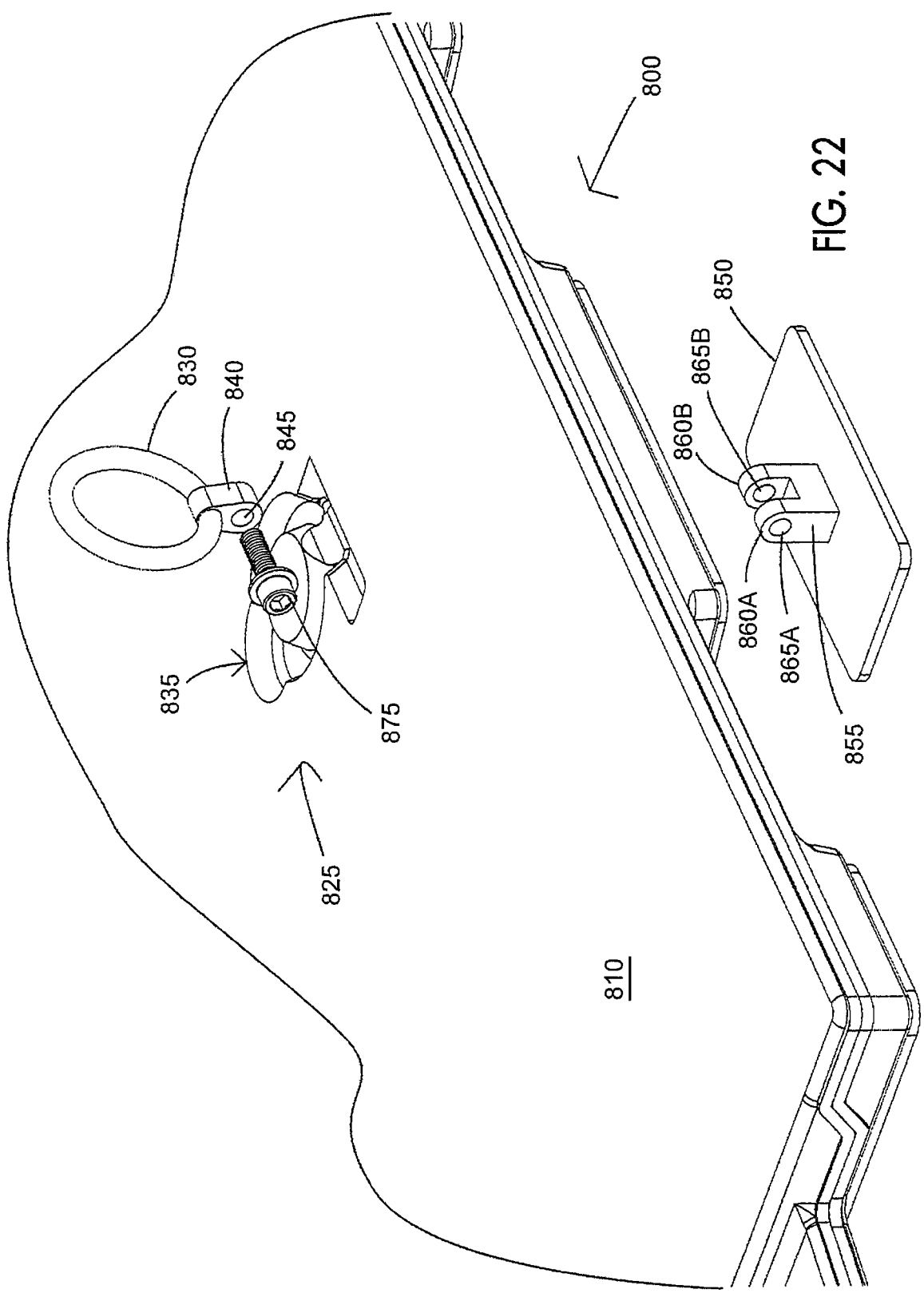
FIG. 22 illustrates a particular construction for the lifting element shown in FIG. 20.

FIG. 22 further illustrates lifting element 825. Also shown is recess 835 which receives lifting ring 830 when pivoted downward into a retracted position so that the surface of the mat is relatively flat. Lifting element 825 includes lifting ring 830 which is mounted on a base member 840 that has a central aperture 845. On the opposite side of mat 800, lifting element includes a base plate 850 with an upstanding post 855 that has two legs 860A and 860B each of which includes an aperture 865A and 865B. The base fits into an elongated opening on the lower surface of the third section 820 so that it is seated therein. Post 855 extends through the mat so that it can align with base member 840 of lifting ring 830. The base member 840 is joined to the legs of the post by a bolt member 875 that passes through apertures 845, 865A and 865B. The bolt member is secured in position either by machine threads which are provided in the apertures or by the use of a nut that engages the opposite end of the bolting member 875.

Figure 23:
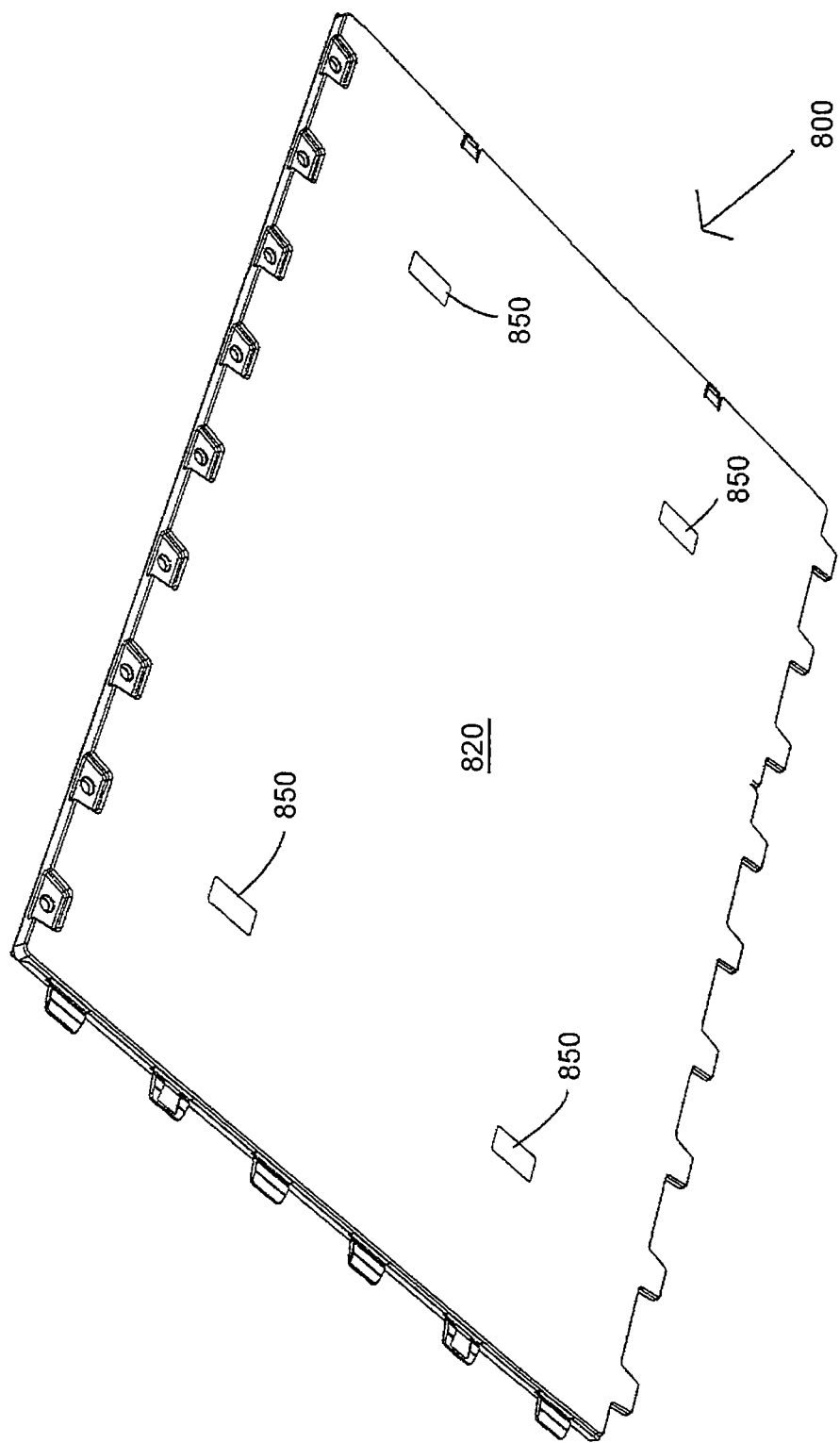
FIG. 23 illustrates the bottom surface of the mat of FIG. 20.

FIG. 23 illustrates base plate 850 in position in the surface of third section 820. While it is not critical that the plate be seated in the surface of section 820, by doing so this provides a smooth flat base for the mat 800.

FIGS. 24A, 24B, and 24C illustrate a variation of lifting element 825. In these figures, lifting element 880 includes a similar construction with lifting element 885 and with a similar base member and post with leg extensions, but the base plate 890 is configured differently. As shown, base plate 890 is circular and includes two cut out portions 895. The base plate and cut out portions are received in recess 837 that includes protrusions 838. The protrusions engage the cut out portions of the base plate so that it can be secured in the recess without rotational movement so that the lifting element can be secured to the mat 800.

FIG. 24B illustrates that this lifting ring 885 maybe positioned to sit in a slot 839 so that the ring can be held in the operative position. After the mat 800 has been lifted or installed, ring 885 can be rotated so that it can retreat back into opening 835 as in the preceding embodiment to provide a relatively flat working surface on the mat.

And while these lifting elements 825, 880 are preferred for use with the panel mats of the invention, a number of other designs for such lifting elements can be used. Instead of the circular lifting ring, a D- or U-shaped member can be used with the remaining structure and recesses adjusted accordingly. So long as the lifting element includes an engagement opening that is securely attached to the mat, skilled artisans can configure many different particular arrangements that would provide the necessary performance.

Another preferred embodiment is shown in FIGS. 25 to 49C. FIG. 25 shows a square panel mat 1100 that has a relatively flat upper surface 1105 that has three openings 1110 located on the periphery of two adjacent sides of the mat. These openings are actually provided on the upper structures 1115 described previously that have a downward sloping bottom surface.

The opposite sides of the mat have the lower structures 1120 that includes openings 1125 and an upward sloping surface that is configured and dimension to conform precisely to the downward sloped surface of the upper structure.

And while these structures can have uniform descending or ascending flat surfaces, they are preferably made with different configurations such as undulations, or other irregular surfaces with the only requirement being that the upper structure and lower structure fit together to form a uniform thickness which is the same as that of the rest of the mat.

FIG. 26 illustrates the same mat 1100 but viewed from its back side such that the same element numbers are utilized. FIG. 26 also shows a bottom plate 1130 that is used to provide a smooth bottom to the mat when desired.

FIG. 27 more clearly shows that the panel mat 1100 of FIG. 25 is initially molded in two sections, a first top section 1200 and a second bottom section 1300. The first section 1200 includes the upper structures 1115 and the second section 1300 includes the lower structures 1120. These sections are molded together to form an upper component for the mat. Alternatively, this upper component can be formed of a single molded sheet or plate and the appropriate configuration and structure can be provided by milling of the sheet or plate.

A most preferred joining technique for the first and second sections of this embodiment is to prepare them in a twin-sheeting operation. This operation, which is also known as twin sheet forming, combines the process disciplines of compression molding, blow molding, and vacuum forming to mold, laminate, and trim multiple layers of materials (substrates with cover stock) in a one step process. The twin sheet molding process forms two sheets of plastic simultaneously through the use of a separate mold on the top platen and a separate mold on the bottom platen. Once the plastic sheets have been vacuum formed, they remain in their respective molds. While both sheets still remain at their forming temperature, the two molds are brought together under high pressures and the two sheets are bonded together. The result is a single product with hollow areas requiring no secondary bonding operations.

Also illustrated in FIG. 27 are the cells 1135 of the second section. These cells 1135 are shown as trapezoidal pyramids having a flat top surface and four angled sides. The flat top surface contacts the lower surface of top section 1105 providing numerous spaced sport supporting surfaces beneath top surface 1105. And while these cells 1135 are shown as pyramids, they also can be configured to be circular, oval, or polygonal in circumference with either straight sides or angled sides as shown. And in an alternate embodiment where the top surface 1105 of the first section 1200 is provided with a structured surface, such as raised circles ovals or polygons, the cells can be configured with the upper surfaces of the same shape as the raised structure so that the upper surfaces of the cells can fit in indentations on the lower surface of section 1105. This also allows the first and second sections 1200, 1300 to join together when subjected to heat and pressure. Additionally, the upper surfaces of the cells can be configured with the recesses in the bottom surface of the first section 1200 so that a snap locking fit can be achieved.

For the second section, a number of different structures can be used to provide support for the upper surface and the first section. In one embodiment, a grid or grating structure can be used where the cells are defined by the openings of the structure, with the cell walls forming polygons or being round or oval in shape with the walls preferably oriented perpendicular to the first section flat bottom surface. Alternatively, the walls can be oriented at an angle to the first section flat bottom surface, with that angle measuring between 45 and 90 degrees and preferably between 60 and 70° with respect to the first section flat bottom surface. The perpendicular orientation provides the greatest compressive strength to the mat while the angled walls provide other benefits with regard to greater cell openings on the bottom sides of the cells and easier manufacture especially to facilitate removal from the mold that forms the cells. It is also contemplated that some or all of the cells could be closed or have flat top surfaces that would contact and support the first section flat bottom surface that is positioned on top of the cells.

The cell structure also provides a plurality of open bottom ends of the cells that face away from the first section. Having these cells remain open facilitates installation of the mats on grass surfaces wherein the entire grass surface is not contacted by the mat but only by the perimeters of the open cells. This minimizes damage to the grass during use of the mats.

Additionally, the mats can be made of transparent or translucent plastic material so that sunlight can pass through the mats and contact the grass. This facilitates grass growth and health to again reduce damage from coverage by the mats.

In some cases, it is desirable for some or all of the bottoms of the cells to have a closed bottom surface. This is desired know when the third section plate is to be included in the mat structure as the closed bottom surfaces of the cells supports the third section plate. A good compromise of open and close cells would be 50:50 for both the top and bottom portions of the second section.

It is also desirable to provide a draft angle for the sidewalls of the cells as noted above. In this regard, the top portions of the cells would be smaller than the openings on the bottom of the cells. This structure which is referred to above as angled sidewalls prevents bending and twisting and of the mat when subjected to load bearing forces. And while an angle of 90° is preferred from a strength standpoint, when the second section is molded, that angle can provide difficulty in removing the second section from the mold. Thus, a slightly lesser angle should be used to provide a draft angle that assists in removal of the molded second section from the mold. This can be in the range of 89° to 85°. As noted herein, other angles of as low as 45° can be used if desired for any particular mat configuration or temporary surface installation.

FIG. 27 illustrates the angled sidewalls of the cells that provide additional strength to support the upper surface of the first section as well as to provide compression resistance to the mat. While it is possible to instead use 90 degree cell wall angles, these are harder to mold into the second section and are not preferred for that reason. Instead, an angled sidewall, one that is fully or at least partially angled with respect to the upper and lower mat surfaces, provides greater rebound to the mat after the applied forces are removed. It also allows the cells to slightly compress but as each cell is adjacent another cell, the expansion is limited by the expansion of the adjacent cells. This provides good compression resistance to the mat. And a noted herein, the use of the bottom third section joined to the second section provides additional support for the cells and even more compression strength to the mat.

The aligned holes 1110, 1125 are also illustrated. These can be configured as described herein where the holes on the first section 1200 can include a lower protrusion that fits within the opening 1110 of the second section 1300. Alternatively, the second section 1300 can have a raised periphery around the opening which fits into a recess in the bottom of the opening 1125 of the first section 1200. The main feature of these holes are that they are in alignment to allow interlocking and connection of one mat to an adjacent, similarly configured mat.

Additionally, a third section 1400 in the form of a flat plate is later added to the support component if desired when the flat bottom surface 1130 is desired for the mat. FIGS. 27 and 28 also illustrate how the openings are not hindered by the addition of third section 1400. Openings are provided in third section 1400 either in the form of circular cut outs 1140 or by removing a corner 1145 of the plate. The third section 1400 does not extend below upper structure 1115 so that it does not interfere with the openings of the upper structure 1115 of the mat. And as explained herein, third section 1400 is an optional component which can be added to form a flat bottom surface 1130 for the mat.

The third section preferably is used to provide a flat bottom surface for the panel mat. It is possible for the third section to be configures so that it also extends beneath the tabular members to further reinforce those members and help them resist damage during installation when the tabular members are inserted into the openings, slots or recesses, as well as to protect against damage from impact if the panel mats were to be dropped in a way where the tabular members would engage the ground first and bear the force of the weight of the mat. This is typically used on flat or graded surfaces, such as those provide by cement, asphalt or clay.

The first 1200 and second 1300 sections are joined together in a first operation either by compression molding or by heating and pressing the sections together. These sections also can be joined by suitable adhesives or by welding. Third section 1400 can then be optionally added in a second operation where it is welded to the second section 1300 of the joined first 1200 and second 1300 sections. The bottom surface 1130 of the mat is selected based on the intended use of the mats.

FIG. 28 shows the bottom surface of the bottom section 1300 of the panel mat 1100 and the back sides 1260 of the raised islands. As noted these cell openings provide better securement of the mat to the ground when the ground surface is wet or muddy. When the mat is to be used on a more uniform ground surface, such as a gym floor or paved parking lot, the third section 1400 provides a bottom plate for the mat.

FIGS. 29 and 30 illustrate the first section 1200 and second section 1300 molded together as a single structure 1250 prior to the addition of third section bottom plate 1400.

FIG. 30 illustrates the cell structure in a cross sectional view to show how each cell supports upper surface 1105 of the top section. Such a configuration with multiple cells provides very good support for loads that are placed on upper surface 1105 of the mat.

And while the cells are a preferred embodiment, it is also possible to configure the second section 1300 with other structures that can support the first section 1200 and upper surface 1105 of the mat. Such other structures can include rod or bar members that are preferably rectangular and that are placed between and adhered to the first section 1200 and second section 1300 whether in the form of parallel spaced members or in the form of intersecting members that form a grid or grating-like structure that contacts the bottom of top surface 1105 for support. The particular internal configuration between the first and second sections can be selected based on the anticipated weight and forces that the upper surface 1105 of the mat will experience in use. And the formation of spacing between the bars or rods whether they are interconnected or not provide the equivalent of the cells of the current embodiment, with the top surfaces of the bars or rods providing the necessary support for the upper surface 1105 of the mat.

Figure 31:
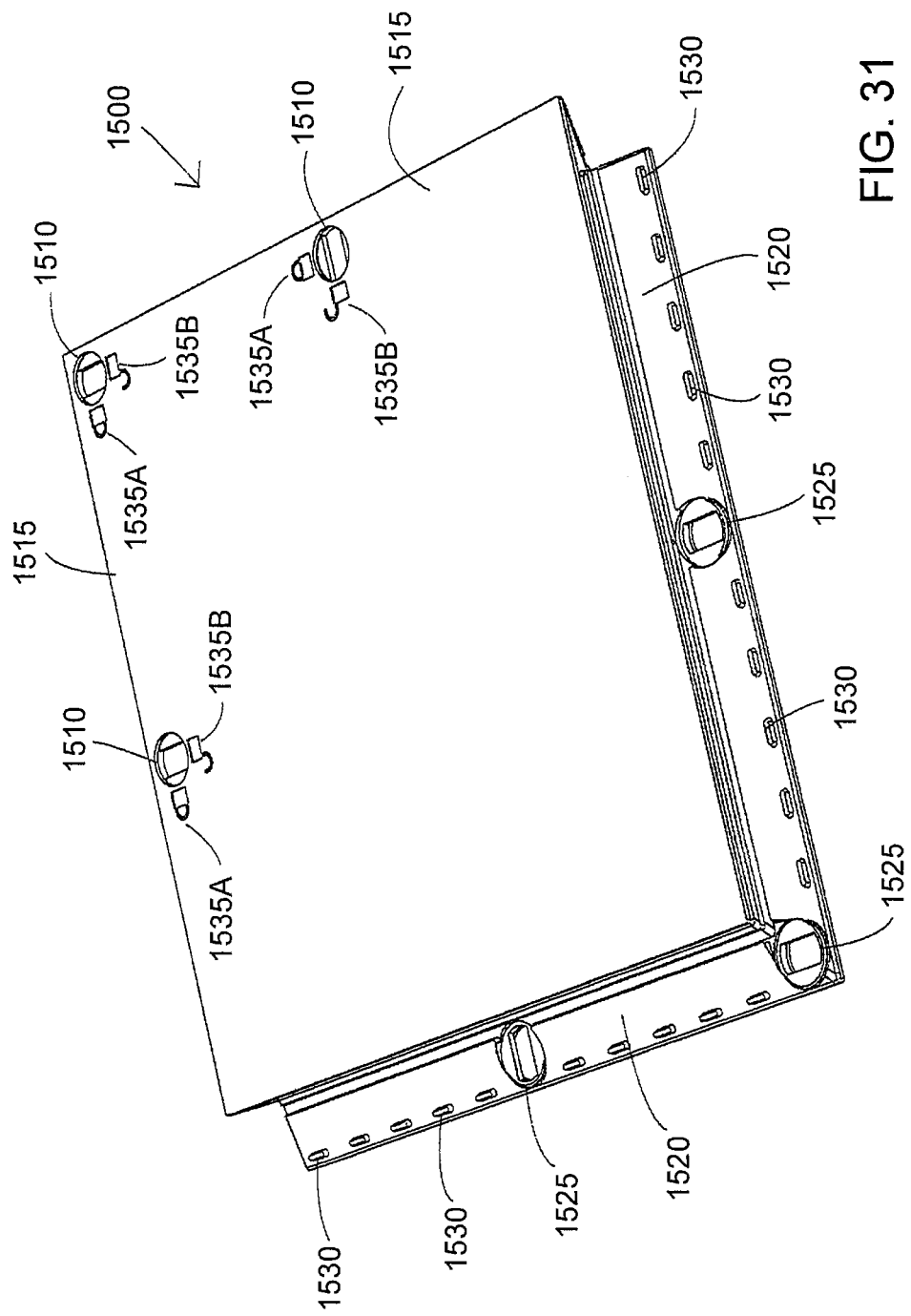
FIG. 31 is a perspective view of a panel mat according to a further embodiment of the present invention showing the top surface of the first section.
Figure 32:
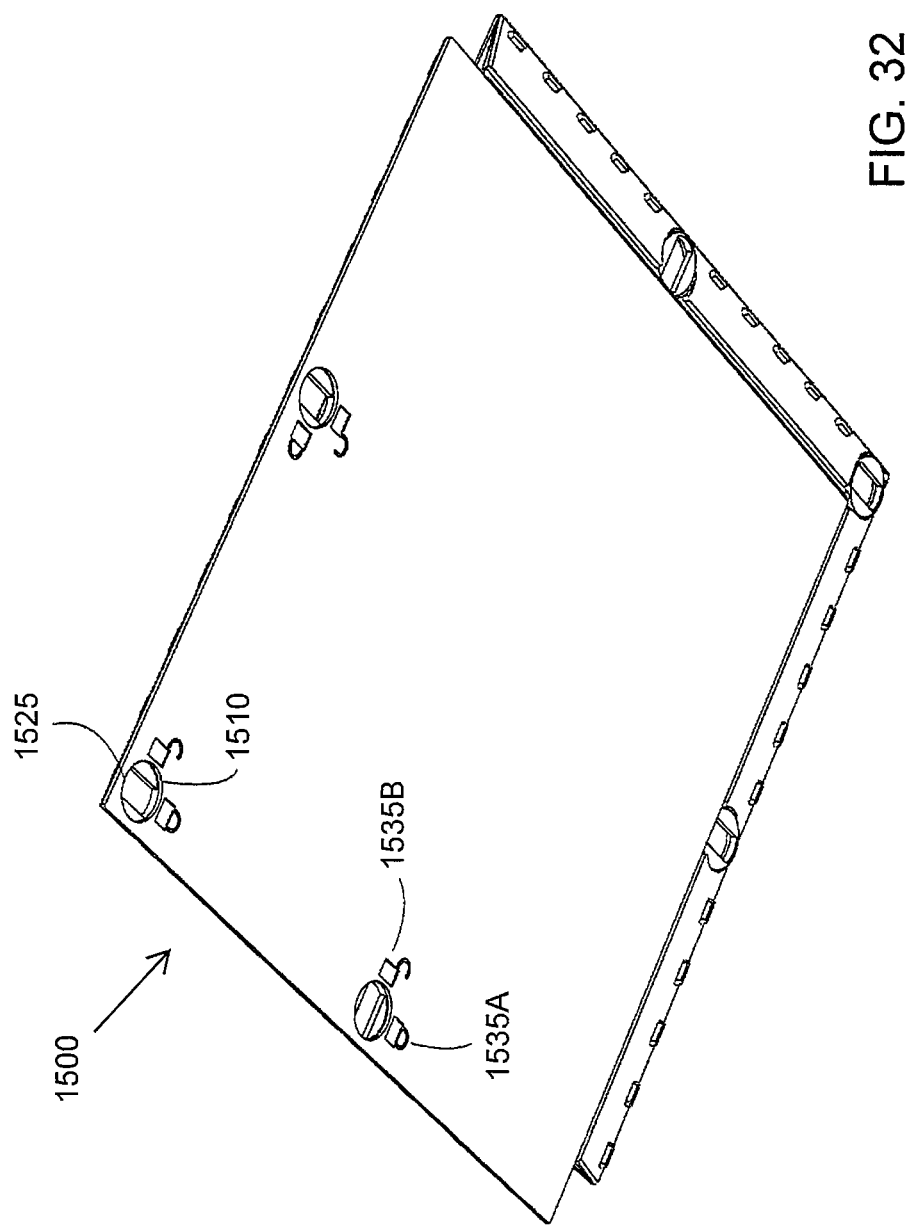
FIG. 32 is a perspective view of the mat of FIG. 31 showing a lower surface of the third section.

FIGS. 31 and 32 illustrate a second embodiment of a panel mat 1500 according to the invention. This embodiment utilizes a similar structure for the upper and lower sections and bottom plate but is provided to illustrate further embodiments for locking the mats together. Mat 1500 includes upper surface 1505 and upper structure 1515 that extend outside the core of the mat. Also provided are lower structures 1520 that extend outside of the core of the mat. Upper structure 1515 includes three openings 1510 as shown. These openings align with openings 1525 of lower structure 1520.

FIGS. 31 and 32 also show tab members 1530 that are present on the upper surface of lower structure 1520 and that are used for alignment of the mats when the mats are to be connected together as described herein. The openings on the upper surface of the mat also include indicia 1535A, 1535B which are used to indicate whether the mats are in a locked position 1535A or in an unlocked position 1535B when the mats are joined together using a fastening element of a particular cam element. Openings 1510, 1525 also are provide a clear path extending through both openings and mats to cover the situation where a stake or other ground engaging component is used to secure the first mat in a particular position upon installation.

FIGS. 31 and 32 also illustrate that the openings 1510, 1525 are configured with an elongated slot which can facilitate entry of a fastening cam that can be used to join two adjacent mats together. As described further herein in FIGS. 33-49, the fastening cam includes elongated tabular members that can fit into the slot of the holes and then be rotated to engage an internal structure of the holes to lock the mats together.

Figure 33:
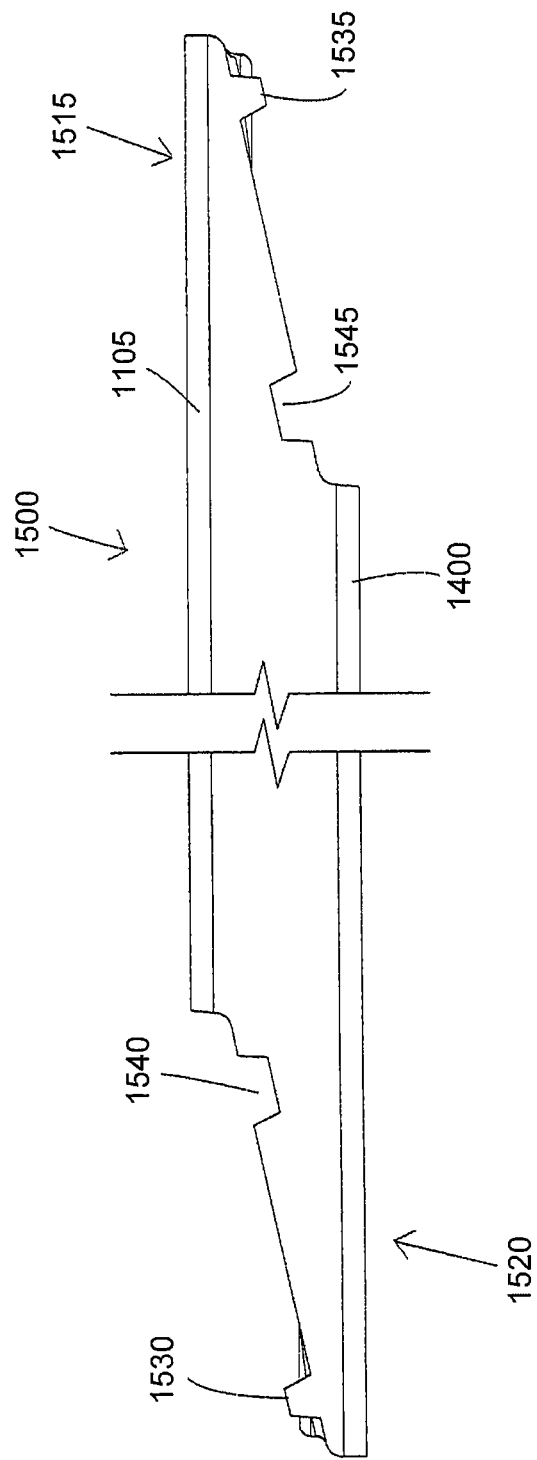
FIG. 33 is a side view of the mat of FIG. 31 showing the upper and lower structures that are configured to facilitate joining or connection to a like configured mat.

FIG. 33 is a side view of the mat 1500 to illustrate the sloped portions of the upper 1515 and lower 1520 structures that contact each other from adjacent mats upon installation. The center portion of the mat is removed from FIG. 33 for convenience in illustrating these sloped portions of the upper 1515 and lower 1520 structures. Also shown are top surface 1105 of the first section 1200 and third section 1400 bottom plate. The upper and lower structures each include a sloped surface that is configured for mating engagement with the other when adjacent mats are connected. Lower structure 1520 includes tab members 1530 as also shown in FIG. 31 which are configured in a line at the lower portion of the sloped section. An upper portion of the sloped surface includes an elongated slot 1540. Similarly the lower surface of the upper structure 1515 is also sloped and includes tab members 1535 at an upper portion of the slope and elongated slot 1545 at a lower portion of the slope. Tab members 1535 of the upper structure are configured to fit into slot 1540 of the lower structure 1520 when an adjacent mat is to be connected. As the adjacent mat is lowered into position, tab members 1530 of the lower structure 1520 are received by slot 1535 of the upper section thus allowing the upper structure 1515 of one mat to be in contact with the lower structure 1520 of the adjacent mat and form a uniformly thick surface for the joined mats. Tab members 1530, 1535 are utilized as they are more forgiving and allow lateral movement of the adjacent mat for installation with respect to the other mat, compared to the use of an elongated bar or rib member which fills in the slot and makes it is more difficult to adjust the position of the adjacent mat. In certain applications, however, a bar or rib rather than tab members would be sufficient and can be used as an alternate embodiment. Similarly, it is possible to use multiple separate openings that receive one or more of the tab members although this requires a more precise installation. Also, other arrangements of locating members where one is received in the other can be used instead of the tab members and slots or openings.

Figure 34:
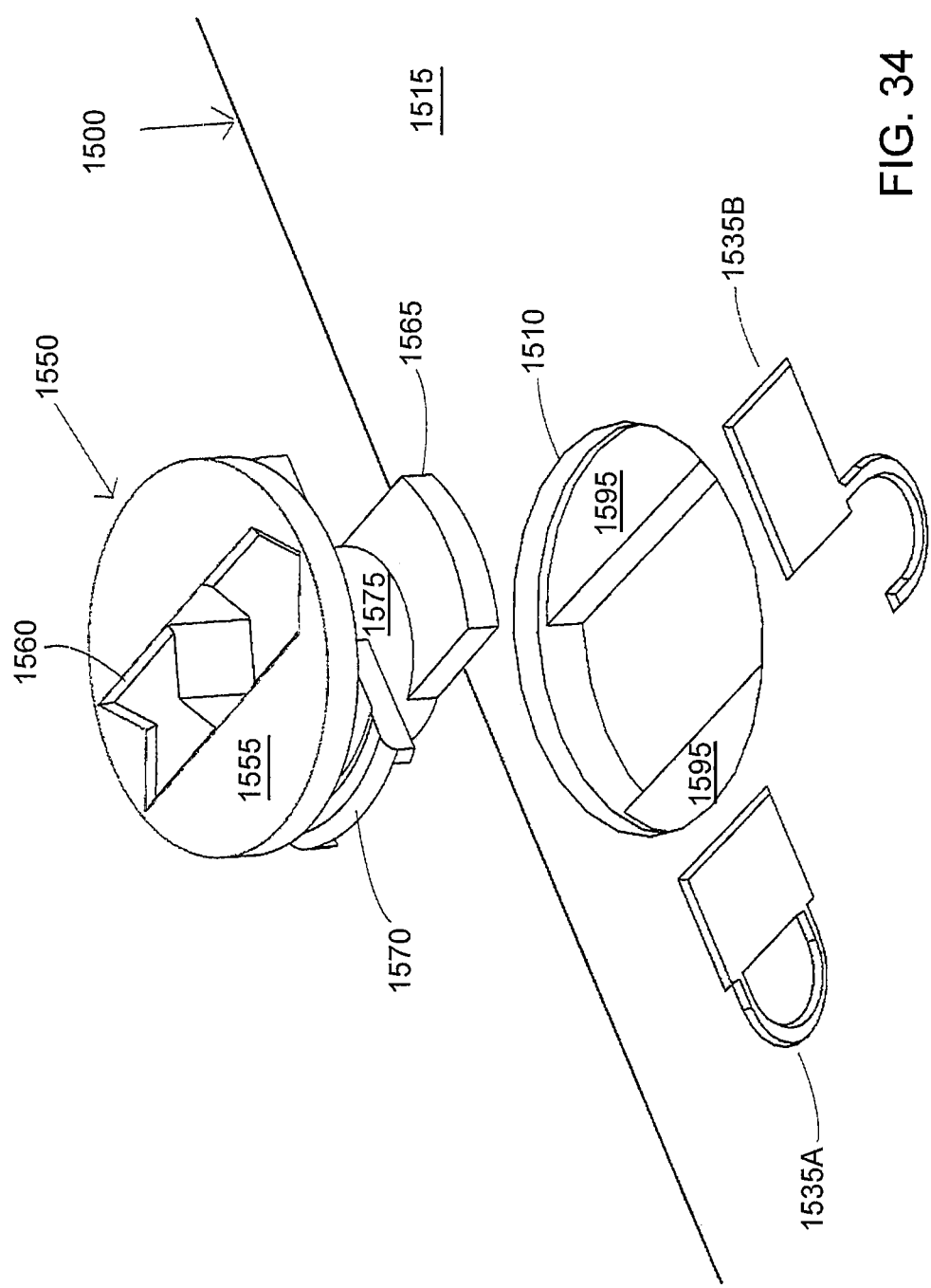
FIG. 34 is a perspective view of a fastening element in the form of a cam which has not yet been inserted into an opening of the mat.

FIG. 34 illustrates fastening cam member 1550 which is shown before it is placed into a mat opening 1510. The cam 1555 includes an upper disc shaped face 1555 that includes an opening configured in the shape of an arrow 1560. The lowermost portion of the cam 1550 includes a locking tab 1565 which extends from an internal post 1575 and which is rotated to lock the mat to an adjacent mat through engagement of a shelf member in opening 1525 of the lower structure 1520 of the adjacent mat. Also, an intermediate locking tab 1570 may be provided for certain fastening cams, and is a preferred embodiment when the fastening cam 1550 is to be secured within opening 1510 of the upper structure 1515 of mat 1500. As shown in FIG. 34, the openings 1510 in mat upper structure 1515 have various shelf members 1585, 1595 that are engaged by the tabs 1565, 1570 for locking of lower structure 1520 of an adjacent mat to upper structure 1515, and for retaining the fastening cam 1550 in upper structure 1515 prior to engagement of an adjacent mat.

FIG. 34 shows the locking and unlocking indicia 1535A, 1535B which are imprinted, embossed, or otherwise provided on the upper surface of upper structure 1515. FIG. 34 also illustrates the structure of the slot wherein upper shelf number 1595 is provided to support disc 1555 of cam member 1550. Shelf member 1595 is also engaged by tab number 1570 while shelf member 1585 is engaged by fastening tab 1565 when the cam 1555 is rotated to a locked position to interconnect adjacent mats together. Shelf members 1585 and 1595 are shown in further detail in FIGS. 39-40.

Figure 35:
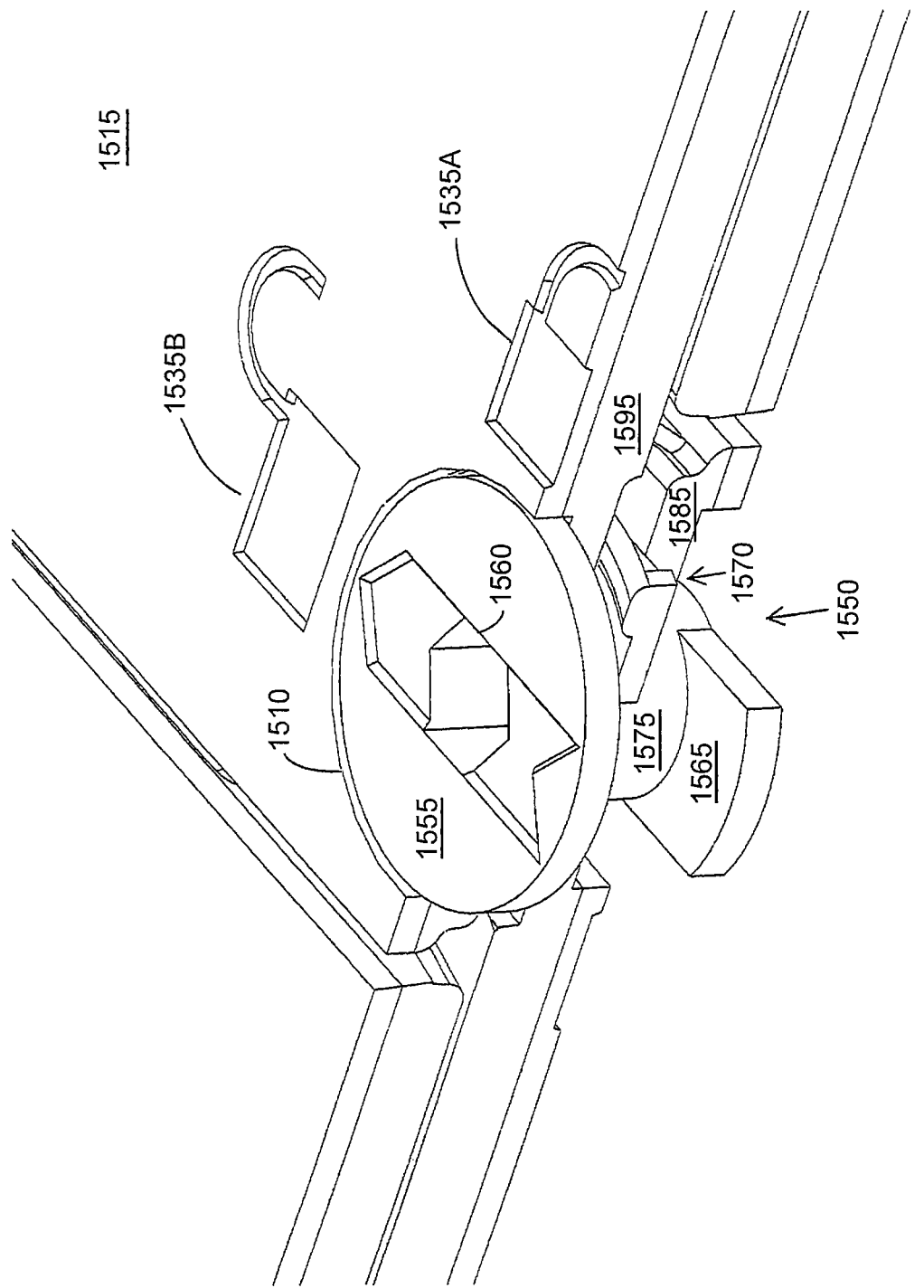
FIG. 35 is a cross-sectional view of two mats that are to be joined together by the cam of FIG. 34 wherein the cam is in the unlocked position.

FIG. 35 illustrates the fastening cam 1550 in position in opening 1510 and in an unlocked position as shown by the arrow 1560 pointing to the unlocked indicia 1535B. Fastening cam 1555 has been inserted into opening 1510 with tab members 1570 engaging shelf members 1595 to secure the fastening cam 1555 in opening 1510. This not only places fastening cam 1555 in position for engaging opening 1525 of a lower structure 1520 of an adjacent mat, but it also prevents fastening cam 1555 from falling out of the opening 1510 when mat 1500 is being moved for transport or installation or reclamation.

Figure 36:
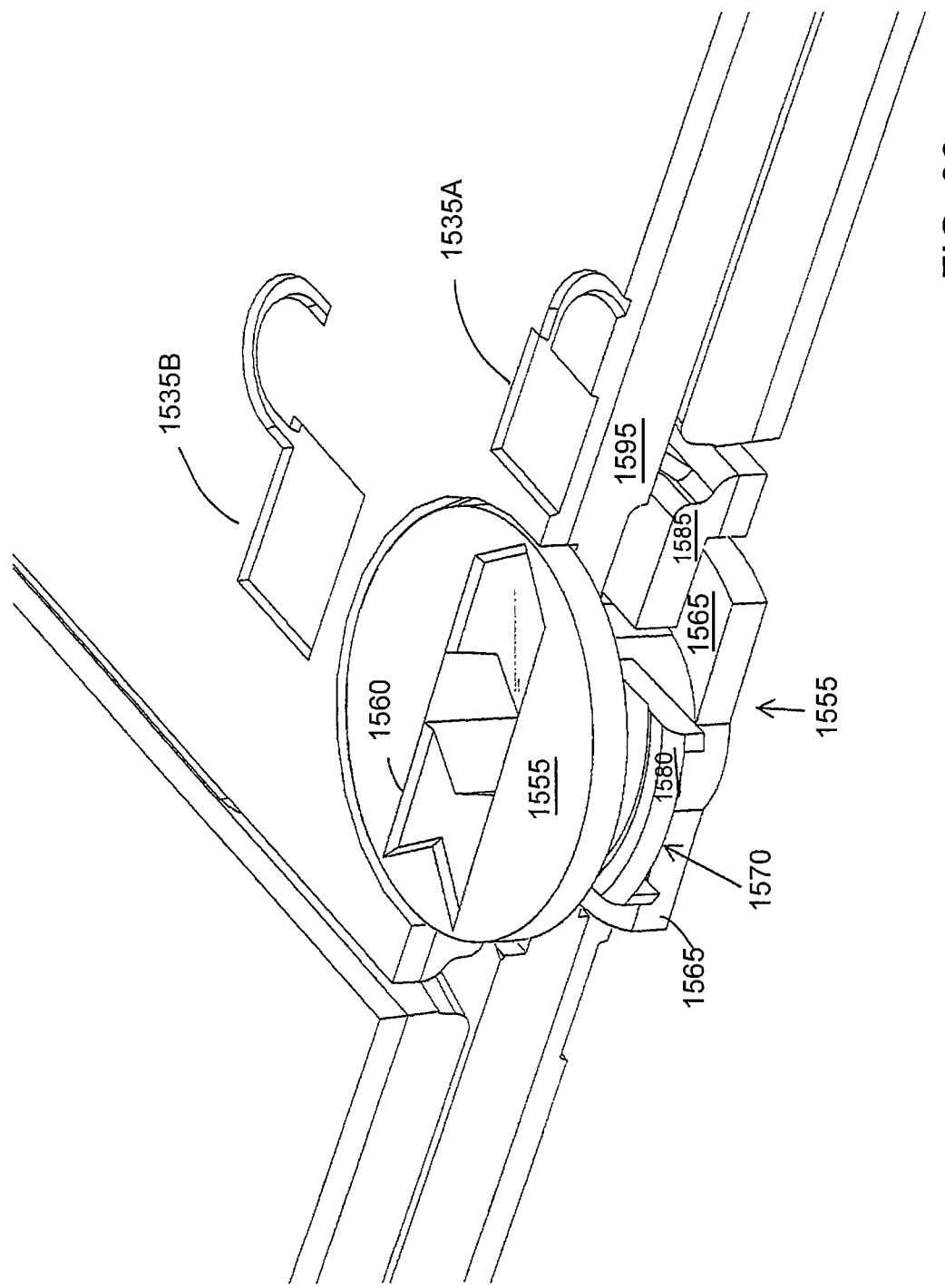
FIG. 36 is a cross-sectional view of two mats that are joined together by the cam of FIG. 34 wherein the cam is in the locked position.

FIG. 36 shows fastening cam 1555 rotated 90° into a locking position so that lower locking tabs 1565 can engage shelf member 1585 in opening 1525 of the lower structure 1520 of an adjacent mat for interlocking therewith.

Figure 37:
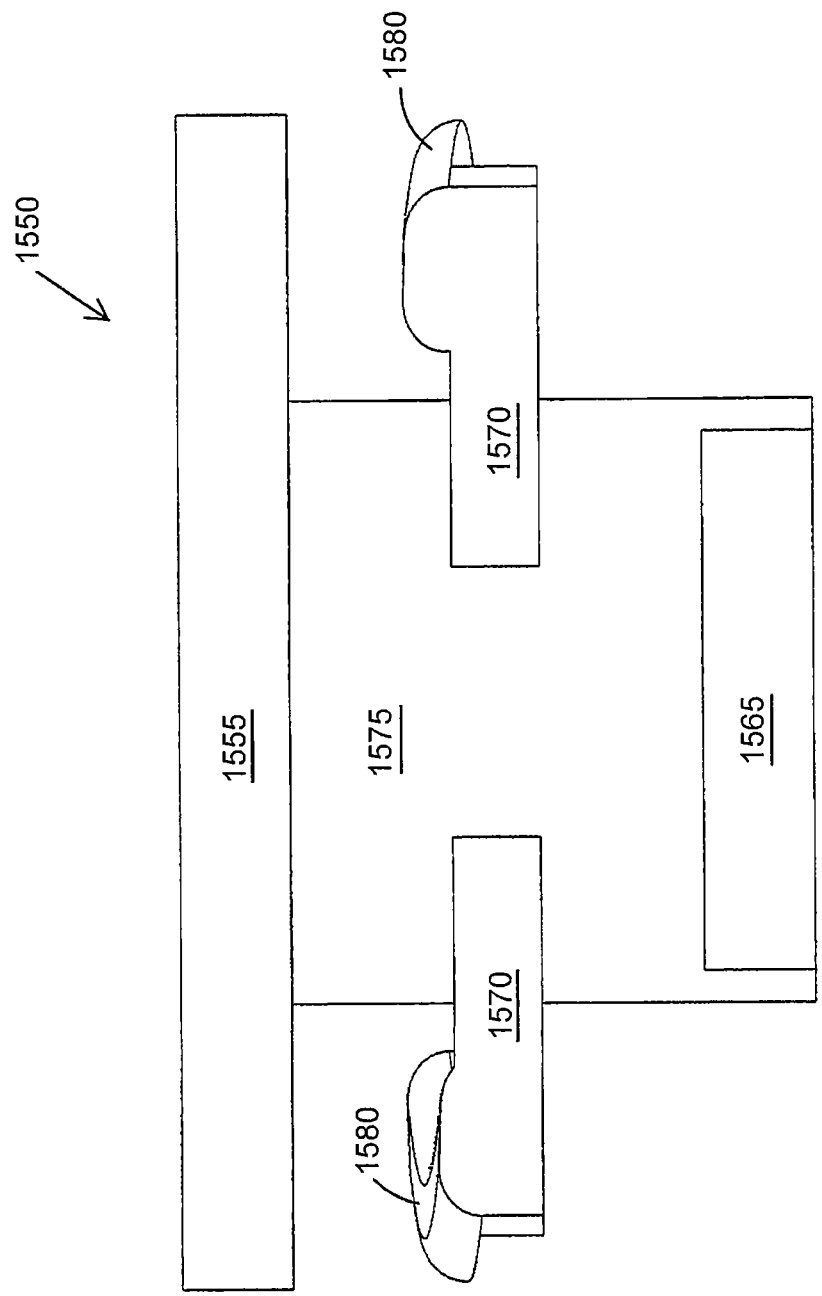
FIGS. 37 and 38 are side views of the cam fastening element of FIG. 34.
Figure 38:
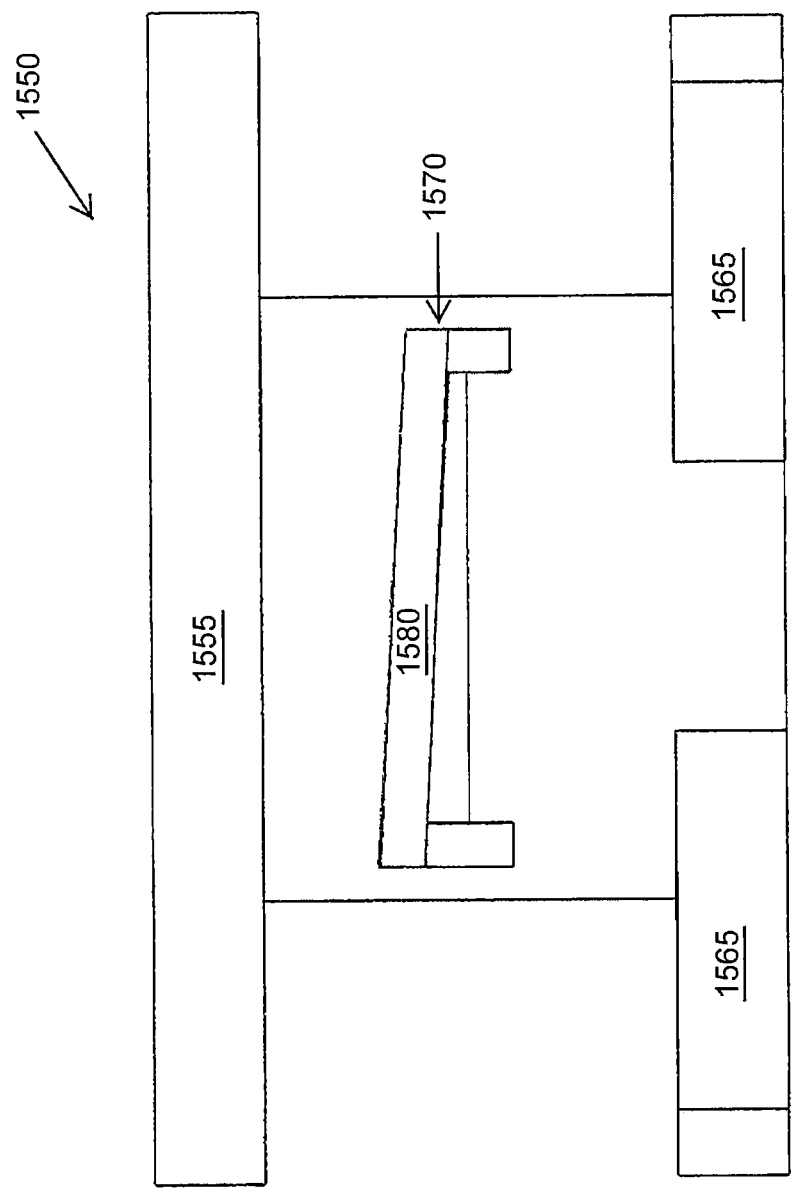

The specific configuration of the fastening cam 1550 is best shown in FIGS. 37-38. FIGS. 37-38 are side views of the fastening cam 1555 taken 90° apart. Fastening tab 1565 is relatively flat and such that rotation of the cam 1550 from the position shown in FIG. 37 to the position shown in FIG. 38 locks the opening 1525 of lower structure 1522 to opening 1510 of upper structure 1515 by engagement of locking tab 1565 with lower shelf 1585.

FIG. 38 illustrates that the intermediate tab number 1570 is configured with a sloped portion 1580 that gradually provides greater force on the upper shelf member 1595 when cam 1550 is to be secured to opening 1510 of upper structure 1515. This arrangement also loosens the cam 1550 connection to the opening 1510 to facilitate engagement of fastening tab 1565 with lower shelf 1585 of opening 1525.

FIGS. 39-40 disclose the fastening cam 1550 in unlocked and locked positions, respectively, in the openings of two adjacent mats 1500A, 1500B. The same number for the fastening cam 1550 elements are used for these figures. The interlocking of sloped portion 1580 of the intermediate tab number 1570 on the upper shelf member 1595 of upper opening 1510 is shown in FIG. 39, while the interlocking of lower fastening tab 1565 with lower shelf 1585 of opening 1525 is shown in FIG. 40.

Figure 41:
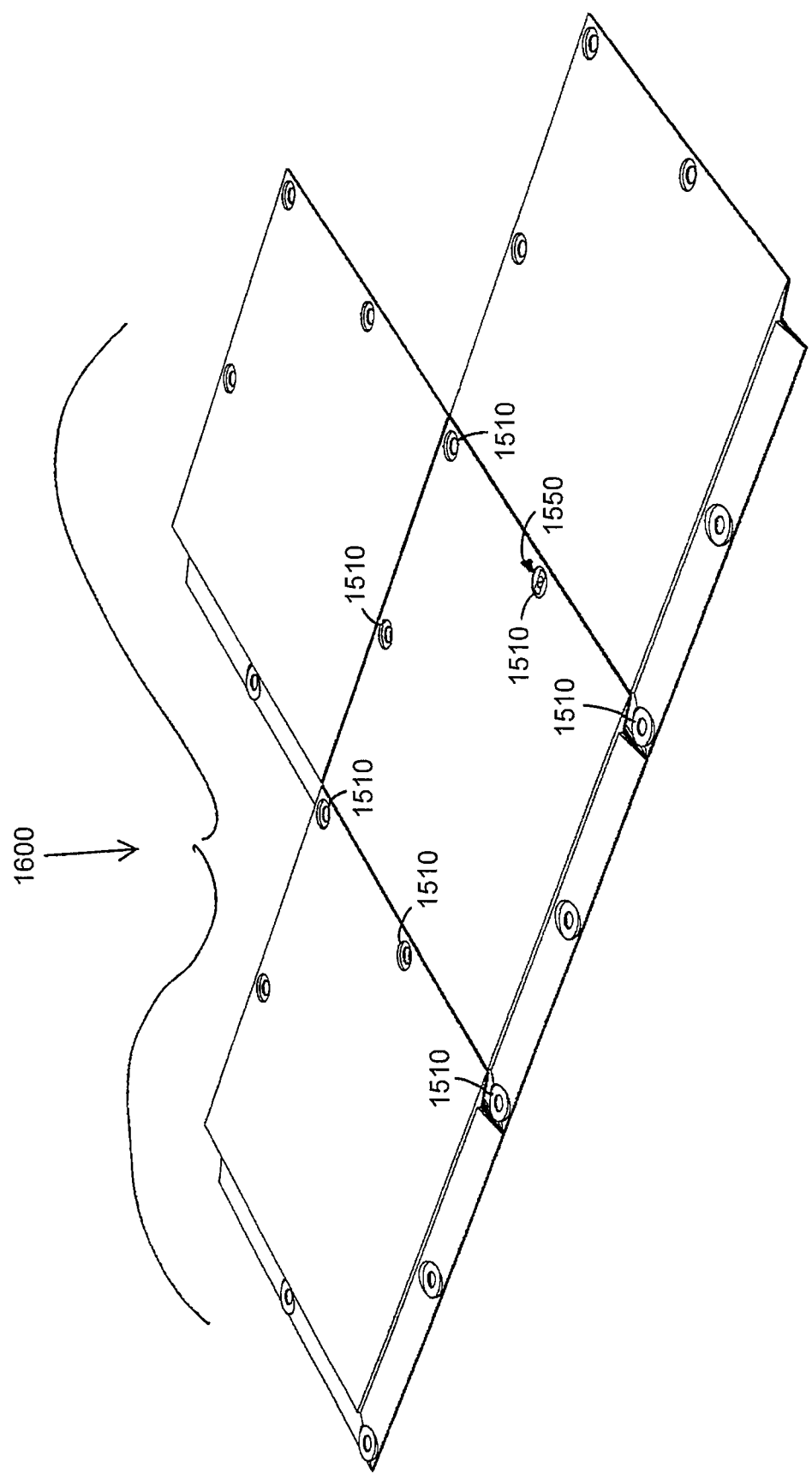
FIG. 41 is an illustration of four interconnected mats.

FIG. 41 illustrates a number of connected mats 1600 that are joined together wherein one fastening cam 1550 is illustrated. Each opening 1510 that is positioned above an opening of an adjacent mat would be provided with a fastening cam 1550 so that a sufficient interlocking arrangement is provided to avoid movement of one mat to another. The details of this cam and the interlocking connection is that which is previously described in FIGS. 39-40.

The mat 1500 may have a flat upper surface 1105 although it is possible to configure that surface with channels or other irregularities for water removal. For use indoors or in areas that are shielded from the elements (e.g., under a tent), a flat top surface is acceptable.

To provide a bottom flat surface 1130 for the mat, third section 1400 is provided as a separate flat plate. This plate 1400 may be bonded to the lower side of the second section by welding, adhesives or by applying heat and pressure to the components in a mold. Third section 1400 includes cut outs so that the openings of the upper and lower structures are not blocked.

Figure 42:
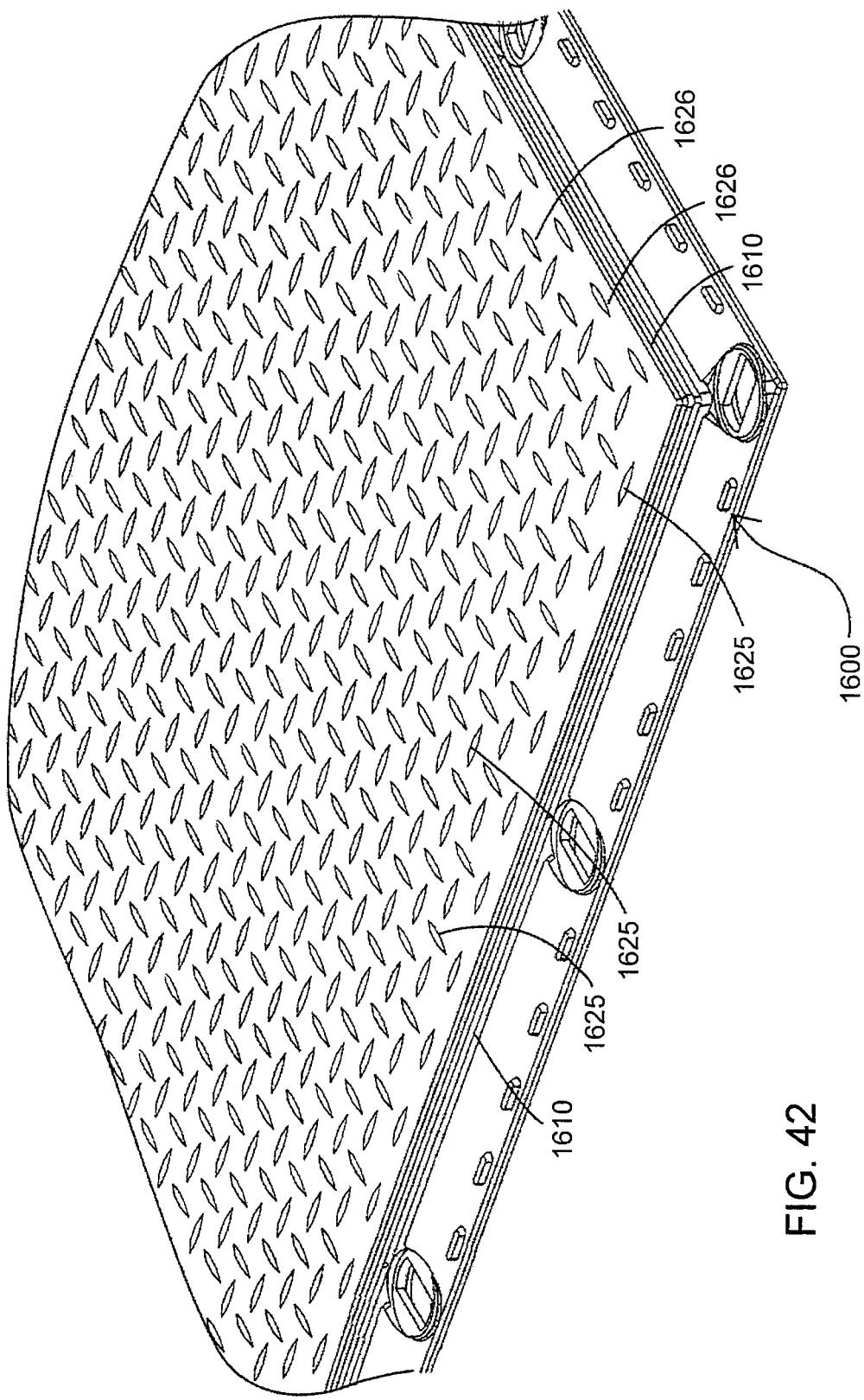
FIG. 42 illustrates a mat that has a structured upper surface in the form of a herringbone pattern.
Figure 43:
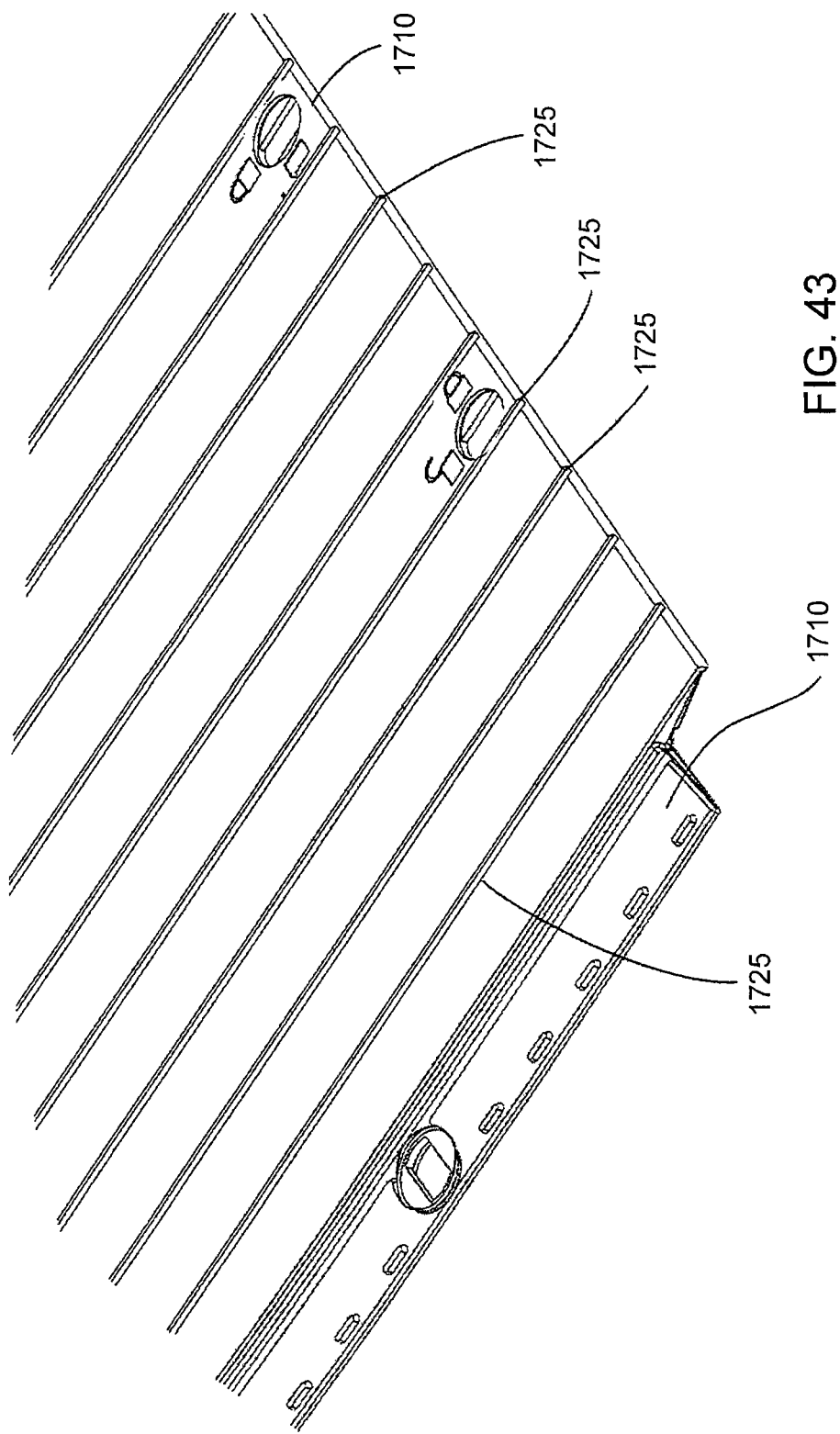
FIG. 43 illustrates the bottom surface of a mat that has linear channels provided therein.

FIGS. 42, 43 and 44 illustrate mats that have alternative structured surfaces. FIG. 42 illustrates a mat 1600 that includes an upper surface in the first section 1610 with a herringbone pattern of raised elongated bumps 1625. These bumps are molded into the upper surface of the top section 1610 of the mat in order to provide resistance to slipping when operators or equipment move across the mat. The herringbone pattern and elongated bumps 1625 provide sufficient open space between them to allow water to drain from the mat in particularly when a worker steps on the mat or a tire or other item moves across the mat when the mat is wet.

Alternatively, other designs can be used to provide a structured surface on the mat. FIG. 43 illustrates a mat 1700 that has on the bottom of its third section 1710 a plurality of linear channels 1725 which are molded into the bottom surface of that section. These channels 1725 assist in allowing moisture to drain from the mat when the mat is placed on wet or muddy ground. It also provides a more secure footing for the mat on such ground.

Figure 44A:
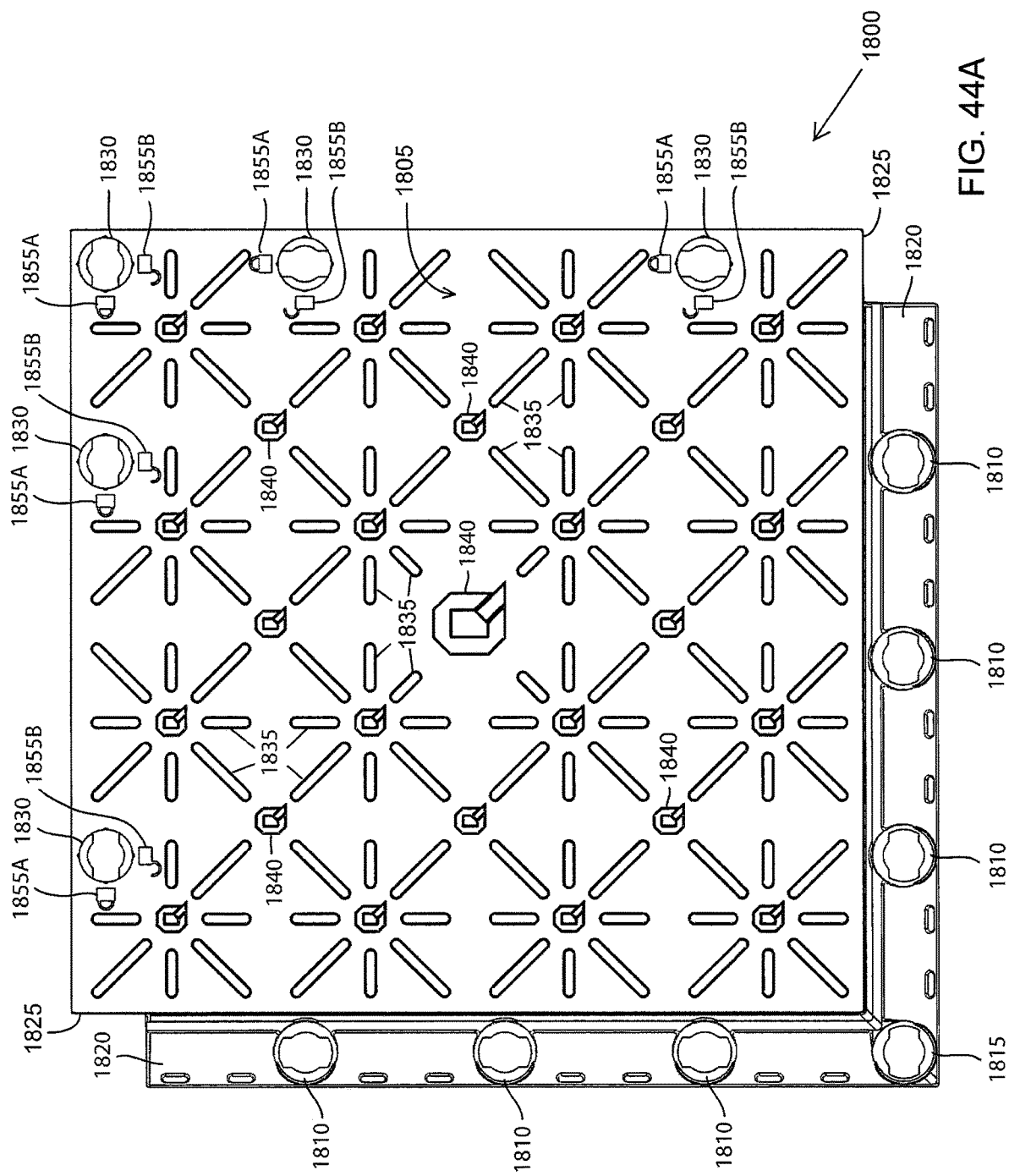
FIG. 44A illustrates a mat that has a different structured upper surface.
Figure 44B:
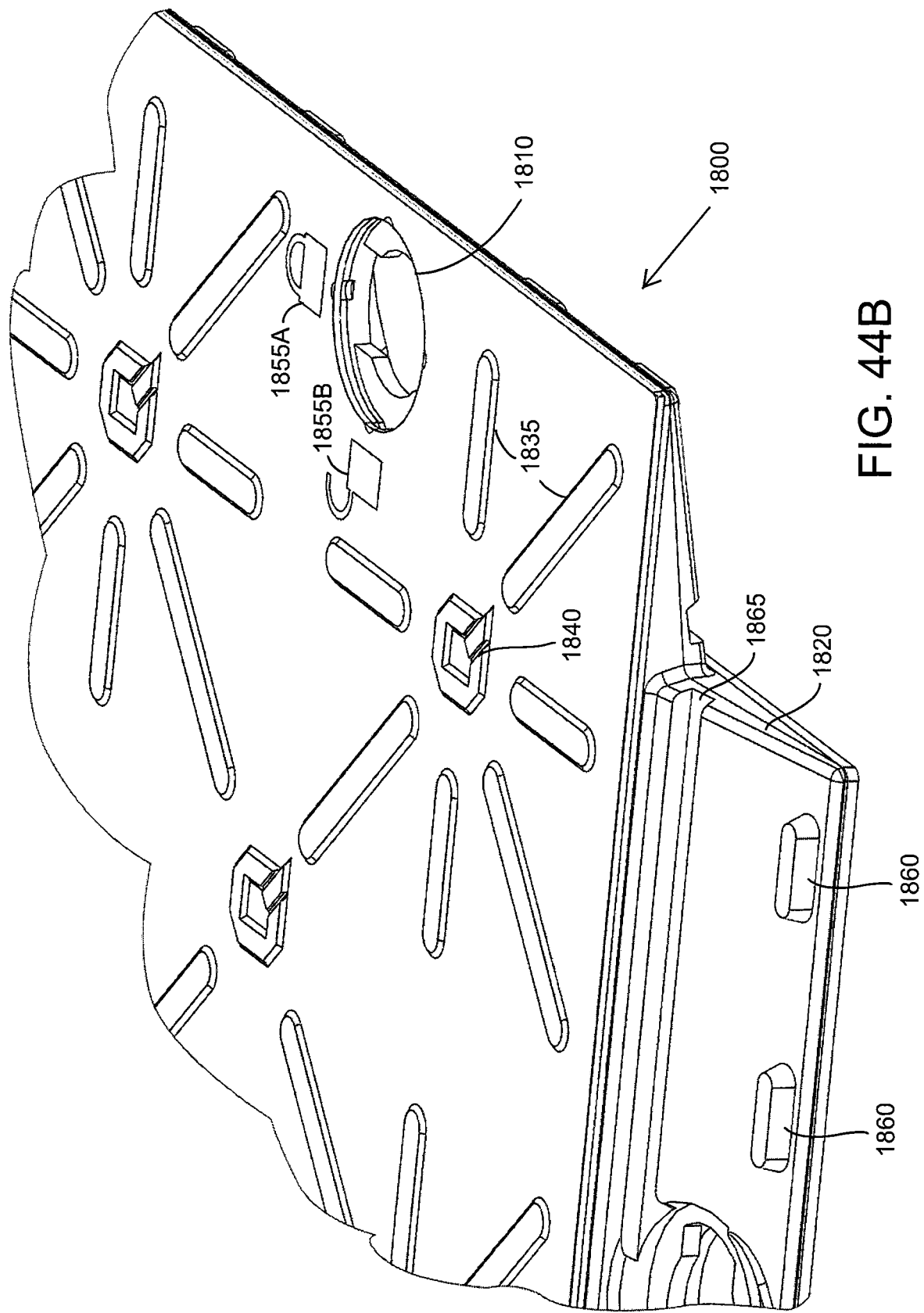
FIG. 44B is an exploded view of a corner of the mat of FIG. 44A.

FIGS. 44A and 44B illustrate a mat 1800 that includes an upper surface 1805 in the first section that has three openings 1810 located on the periphery of two adjacent sides of the mat and one opening 1815 in the corner between the two sides. These openings are actually provided on the lower structures 1820 described previously that have a downward sloping bottom surface.

The opposite sides of the mat have the upper structures 1825 that includes openings 1830 and an upward sloping surface that is configured and dimension to conform precisely to the downward sloped surface of the upper structure 1825. The openings on the upper surface of the mat also include indicia 1855A, 1855B which are used to indicate whether the mats are in a locked position 1855A or in an unlocked position 1855B when the mats are joined together using a fastening element of a particular cam element.

FIG. 44B illustrates the tab members 1860 which are configured in a line at the lower portion of the sloped section of lower structure 1820. An upper portion of the sloped surface includes an elongated slot 1865. Similarly the lower surface of the upper structure is also sloped and includes the same type of tab members at an upper portion of the slope and the same type of elongated slot at a lower portion of the slope. The tab members of the upper structure are configured to fit into slot 1865 of the lower structure 1820 when an adjacent mat is to be connected. As the adjacent mat is lowered into position, the tab members 1860 of the lower structure 1820 are received by the slot of the upper structure thus allowing the upper structure of one mat to be in engagement with the lower structure 1820 of the adjacent mat and form a uniformly thick connection for the joined mats. As noted above, tab members are utilized as they are more forgiving and allow lateral movement of the adjacent mat for installation with respect to the other mat, compared to the use of an elongated bar or rib member which fills in the slot and makes it is more difficult to adjust the position of the adjacent mat. In certain applications, however, a bar or rib rather than tab members would be sufficient and can be used as an alternate embodiment. Similarly, it is possible to use multiple separate openings that receive one or more of the tab members although this requires a more precise installation. Also, other arrangements of locating members where one is received in the other can be used instead of the tab members and slots or openings.

The upper surface of the mat has a plurality of elongated bumps 1835 which are arranged in a radially expanding manner from a number of central raised members 1840 that are preferably distributed uniformly on the mat. These bumps 1835 can be of the same length or of different lengths as shown. The central raised members 1840 can be in the form of an identifying letter, such as the Q which is shown, to indicate the source of the mat, here Quality Mat. Other indicia or names can be used for raised members 1840. Additionally, instead of identifying indicia, openings can be provided which would act as a drain to allow water to be removed from the upper surface through the openings and through the mat. As shown, the openings on upper structures 1825 do not conform precisely to the openings 1810, 1815 of the lower structures 1820. This prevents connection of the mats in an aligned adjacent manner and instead forces the installer to stagger the mats by aligning the openings on the upper structure with those of the lower structures so that the can receive locking cams. Also, to facilitate installation, there are a lesser number of openings on the upper structures 1825 than the lower structures, so that a lesser number of locking cams are needed compared to the number of openings on the lower structures 1830. This allows the mat designer to select any number of holes on the upper structures for locking into the holes of the lower structures.

Generally, two openings on the upper structures are connected to two openings on the lower structure, namely the corner opening 1815 and the adjacent opening on the upper structure, with two adjacent openings on the lower structure. The present panel mat design thus allows many different connecting options that are configured for increasing the strength of the entire installation so that it acts as a single flooring unit. The arrangement of an odd number of openings in the mat, and in particular with more openings on the lower structures than the upper ones, allow for the mats to be assembled uniformly and if desired staggered.

As shown in FIG. 44A, five openings are provided on the top or upper structures and seven openings provided on the bottom or lower structures. These allow adjacent mats to be assembled by aligning at least some of the openings of the upper structure over the openings of the lower structure. A full adjacent relation occurs when one mat is placed directly adjacent another with two or all three upper openings provided with a locking pin or cam to connect the openings of the upper structure to the openings of the lower structure. As the full adjacent assembly relation results in a line or seam between multiple rows of connected mats, a staggered configurations are preferred. For these, a ⅓, ½ or ⅔ extension overlap can be made depending upon which two openings on the lower structure are overlaid with the corner opening and adjacent opening of the upper structure before providing a locking cam in each pair of openings. And as noted it is not necessary to place a cam in each superimposed opening but only to use as many as needed to obtain a secure connection. This is typically two or possibly three cams per joined structures of the adjacent mats.

The corner opening 1815 is important because it helps provide a secure connection between adjacent mats. By holding the corners down through the use of a locking cam in this corner opening 1815, the mats are held in a flat condition which avoids the issue of toe jams due to bucking corners which occurs in other mats that do not provide a corner opening to lock.

Another feature of the invention is the arrangement of the top face of the cam 1845 and its orientation in the opening 1815 as well as with respect to the sides of the mat. The cam 1845 has a slot 1850 in its upper face to receive a tool or flat head rod that facilitates rotation of the cam. The cam 1845 is initially placed into the opening 1815 with the slot at a 45 degree angle to the nearest end of the mat. The tool is used to rotate the cam 1845 by 90 degrees to lock the mats together. The opening and its internal structure along with the structure of the cam prevent rotation by more than 90 degrees. In particular, the opening 1815 in the mat has a stop feature that prevents the cam 1845 from turning more than 90 degrees. The cam 1845 itself has the same stop feature, so that the cam 1845 can only turn 90 degrees from the locked to unlocked positions. The mats are locked together when the pin slot is oriented at an angle of 135 degrees (or −45 degrees) with regard to the nearest end of the mat. This 45 degree association of the pin slots in the body of the cam and mat allow for flexibility in assembly because it minimizes restrictions on the array of assembled mats. Of course, the lock/unlock graphics that are positioned outside of the perimeter of the openings on the top surface of the mat may be located at any point and can be rotated from what is shown. Also, when necessary, the cams 845 can be fully removed from the opening 1815 for maintenance, change or alterations.

The staggered arrangements are also useful in controlling the overall width of a floor installation. For a 9 foot square mat, the full connection results in widths that are multiples of 9, while the ⅓ staggered connection results in a 12 foot width for two joined mats, a 15 foot width for three joined mats, etc. For a ⅔ staggered connection, the multiples are 15 feet for two joined mats and 21 feet for three joined mats. For a ½ staggered connection, the multiples are 13.5 feet for two joined mats, 18 feet for three joined mats, etc. The staggering allows different width and length dimensions to be achieved for any particular installation. It is also possible to cut the last mats to be installed to fit to a different width or length dimension that cannot be achieved by the different staggering arrangements. This allows the joined mats to fit the geometry of the site, which typically would be a football field or gymnasium.

The mats can also be joined to form a temporary flooring installation that is discontinuous, i.e., one that leaves certain openings between joined mats. This allows the mats to be placed around trees, light towers or other obstacles that exist in the area that is to be provided with a temporary flooring of joined mats. In particular, it is relatively easy to leave openings such as by simply omitting one or more mats to provide open space in the floor structure. This can serve a number of purposes, such as allowing the floor structure to be installed around a column, pole, post or other upstanding structure, as well as to leave open space for a light tower, camera tower, and video screen support or speaker support tower. Furthermore, in the event that a mat is damaged after installation, it can be unlocked, disconnected and removed for replacement by another similarly sized and configured mat without having to remove all further mats that are connected together in the installation.

Of course, when the upper surface of the first section is structured, the bottom surface of the third section can be similarly structured in a similar manner or with a different type of structure. FIGS. 42 and 43 illustrate a preferred combination of different structures wherein FIG. 42 shows a herringbone pattern on the top surface of the first section while FIG. 43 illustrates linear channels provided on the bottom surface of the third section and FIG. 44A can optionally include openings for removal of water.

The surface patterns and arrangements that are shown in FIG. 20A can be arranged as shown or in any other particular design configuration or arrangement. The indicia can indicate a particular owner or user of the mat and the raised portions can be of different sizes shapes or arrangements provided that the upper surface of the mat is not uniformly flat. The designs can provide a tread surface on the mat to facilitate movement of personnel or equipment over the mat.

The top patterns or structures that are applied to the mats also provide the capability to change out the center section to customize the mat with any particular design for a purchaser of the mat. This enables the costumer to advertise its company name or logo as well as to indicate the user or manufacturer of the mat. And furthermore, it is possible to add wraps, fabrics or coatings of a particular logo onto the upper surfaces of the mat. The logo can be applied to each mat or portions of a logo can be applied to different mats such that when they are connected, a much larger logo is made to provide enhanced visibility.

Figure 45:
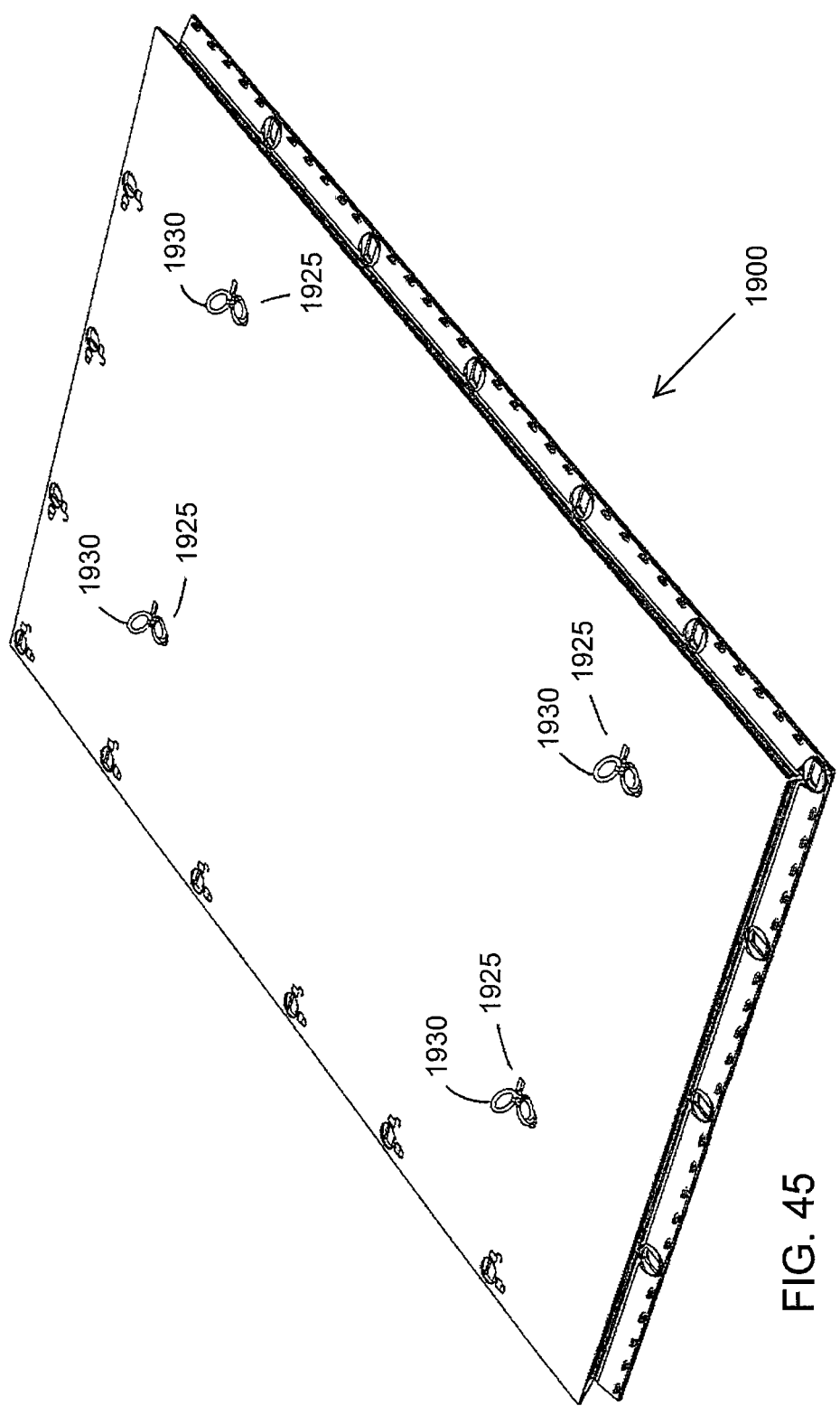
FIG. 45 illustrates a mat having four lifting elements.
Figure 46:
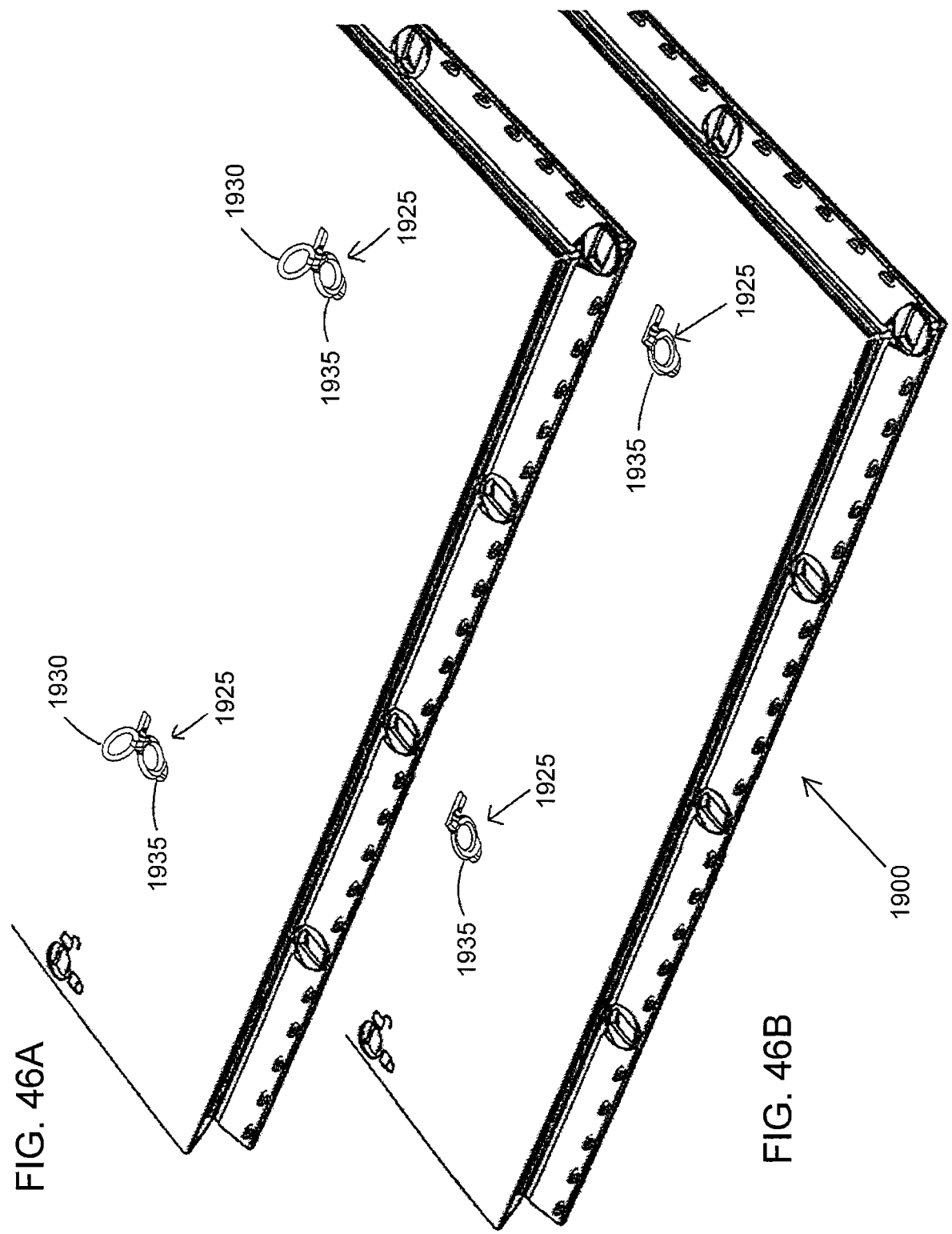
FIGS. 46A and 46B illustrate the mat of FIG. 45 with the lifting elements in an operative position in FIG. 46A and in a retracted position in FIG. 46B.

FIG. 45 illustrates lifting elements 1925 four of which are provided on rectangular mat 1900, which would typically have a larger size of about 8'×16'. The lifting elements 1925 are shown with a lifting ring 1930 which is standing vertically in an operative position to be engaged by lifting equipment.

FIGS. 46A and 46B further illustrate this feature. In FIG. 46A, the lifting element is shown with ring 1930 in the operative position. Also shown is recess 1935 which is configured to have the same shape and depth as ring 1930. FIG. 46B illustrates the ring 1930 pivoted downwardly to fit within recess 1935 so that the upper surface of the mat is generally planar. This would avoid workers tripping over the lifting element if it were not retracted into the surface of the mat.

Figure 47:
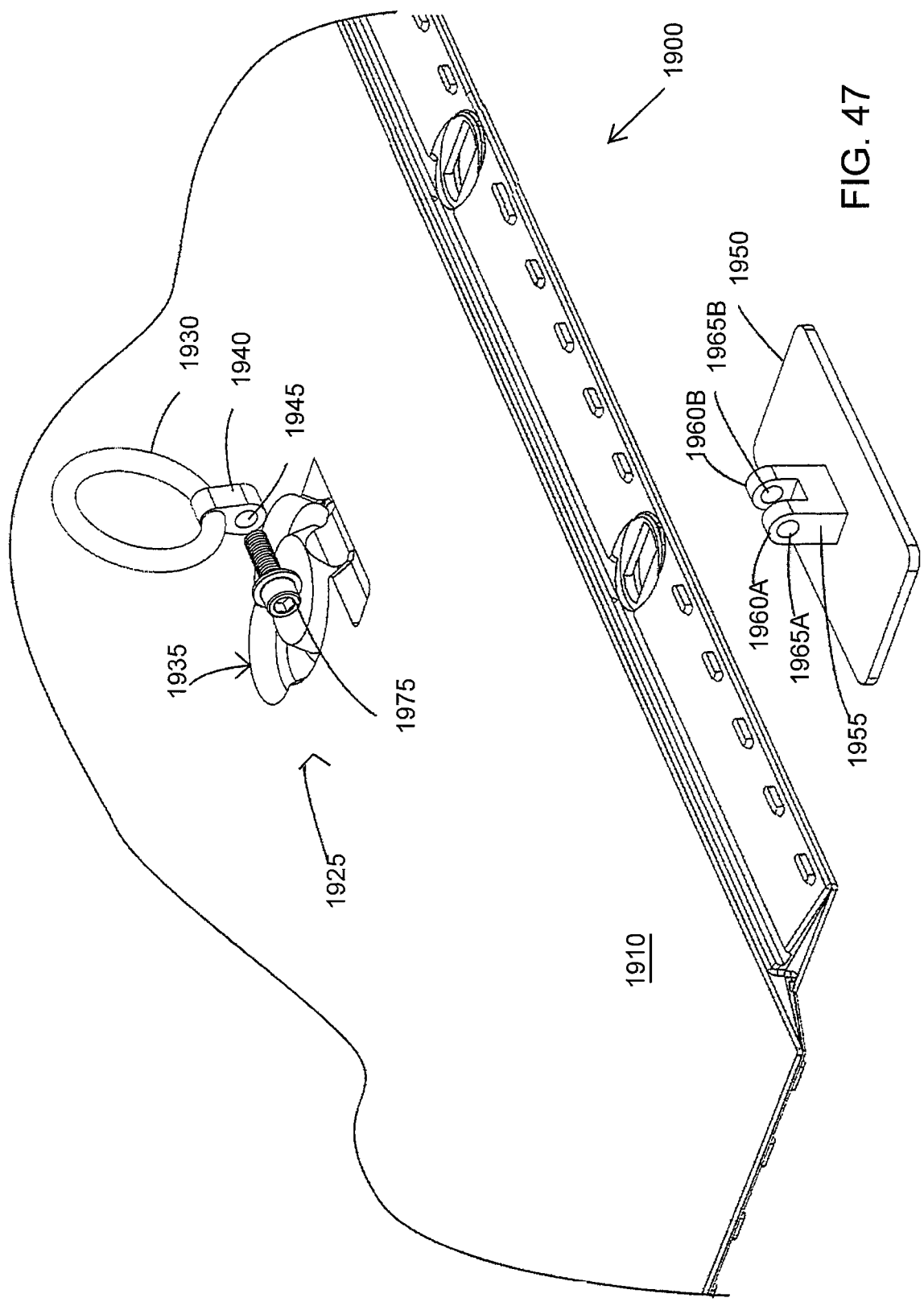
FIG. 47 illustrates a particular construction for the lifting element shown in FIG. 45.

FIG. 47 further illustrates lifting element 1925. Also shown is recess 1935 which receives lifting ring 1930 when pivoted downward into a retracted position so that the surface of the mat is relatively flat. Lifting element 1925 includes lifting ring 1930 which is mounted on a base member 1940 that has a central aperture 1945. On the opposite side of mat 1900, lifting element includes a base plate 1950 with an upstanding post 1955 that has two legs 1960A and 1960B each of which includes an aperture 1965A and 1965B. The base fits into an elongated opening on the lower surface of the third section 1920 so that it is seated therein. Post 1955 extends through the mat so that it can align with base member 1940 of lifting ring 1930. The base member 1940 is joined to the legs of the post by a bolt member 1975 that passes through apertures 1945, 1965A and 1965B. The bolt member is secured in position either by machine threads which are provided in the apertures or by the use of a nut that engages the opposite end of the bolting member 1975.

Figure 48:
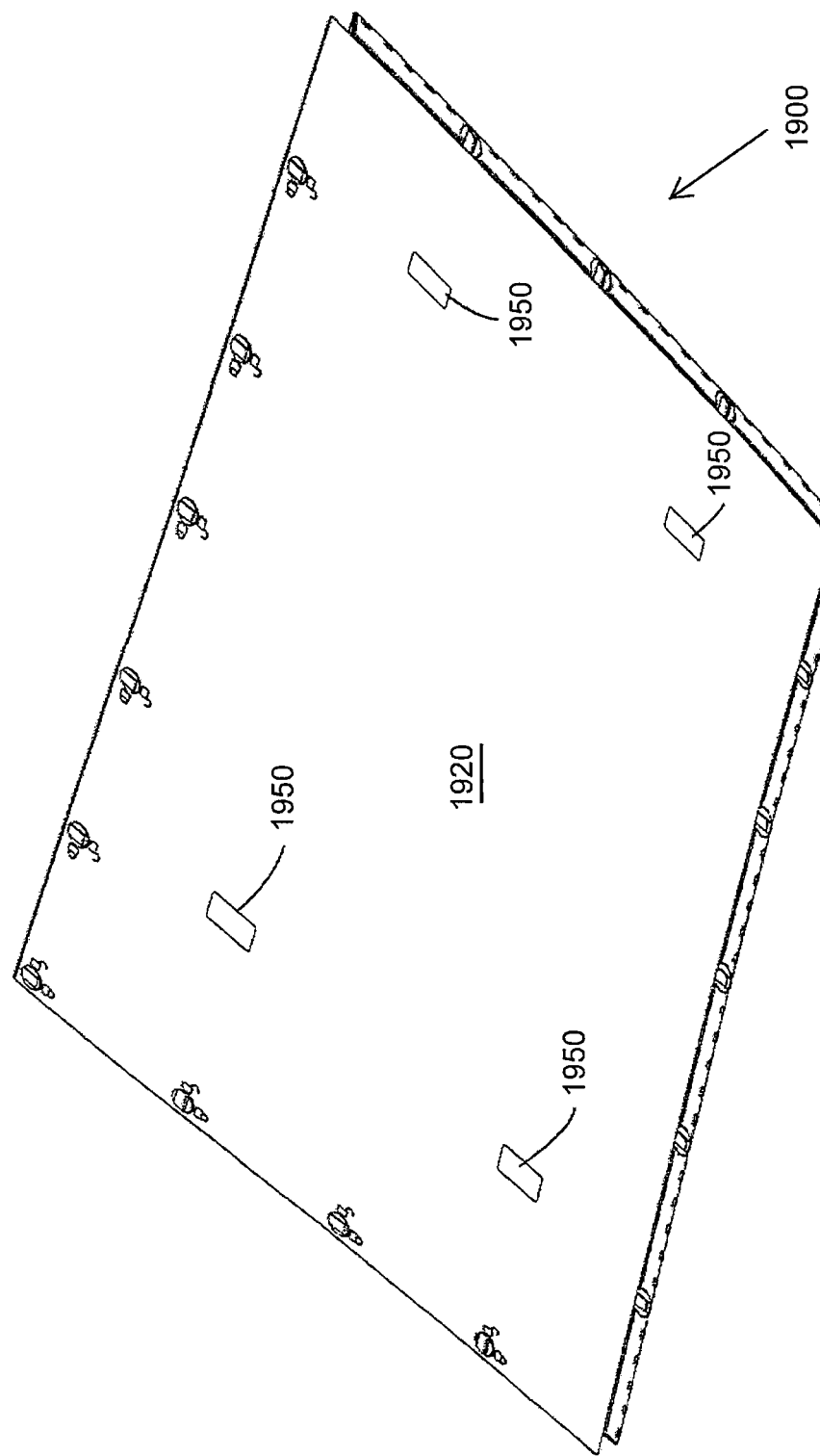
FIG. 48 illustrates the bottom surface of the mat of FIG. 45.

FIG. 48 illustrates base plate 1950 in position in the surface of third section 1920. While it is not critical that the plate be seated in the surface of section 1920, by doing so this provides a smooth flat base for the mat 1900.

FIGS. 49A, 49B, and 49C illustrate a variation of lifting element 1925. In these figures, lifting element 1980 includes a similar construction with lifting element 1985 and with a similar base member and post with leg extensions, but the base plate 1990 is configured differently. As shown, base plate 1990 is circular and includes two cut out portions 1995. The base plate and cut out portions are received in recess 1937 that includes protrusions 1938. The protrusions engage the cut out portions of the base plate so that it can be secured in the recess without rotational movement so that the lifting element can be secured to the mat 1900.

FIG. 49B illustrates that this lifting ring 1985 maybe positioned to sit in a slot 1939 so that the ring can be held in the operative position. After the mat 1900 has been lifted or installed, ring 1985 can be rotated as shown in FIG. 49C so that it can retreat back into opening 1935 as in the preceding embodiment to provide a relatively flat working surface on the mat.

And while these lifting elements 1925, 1980 are preferred for use with the panel mats of this embodiment of the invention, a number of other designs for such lifting elements can be used. Instead of the circular lifting ring, a D- or U-shaped member can be used with the remaining structure and recesses adjusted accordingly. So long as the lifting element includes an engagement opening that is securely attached to the mat, skilled artisans can configure many different particular arrangements that would provide the necessary performance.

Figure 50A:
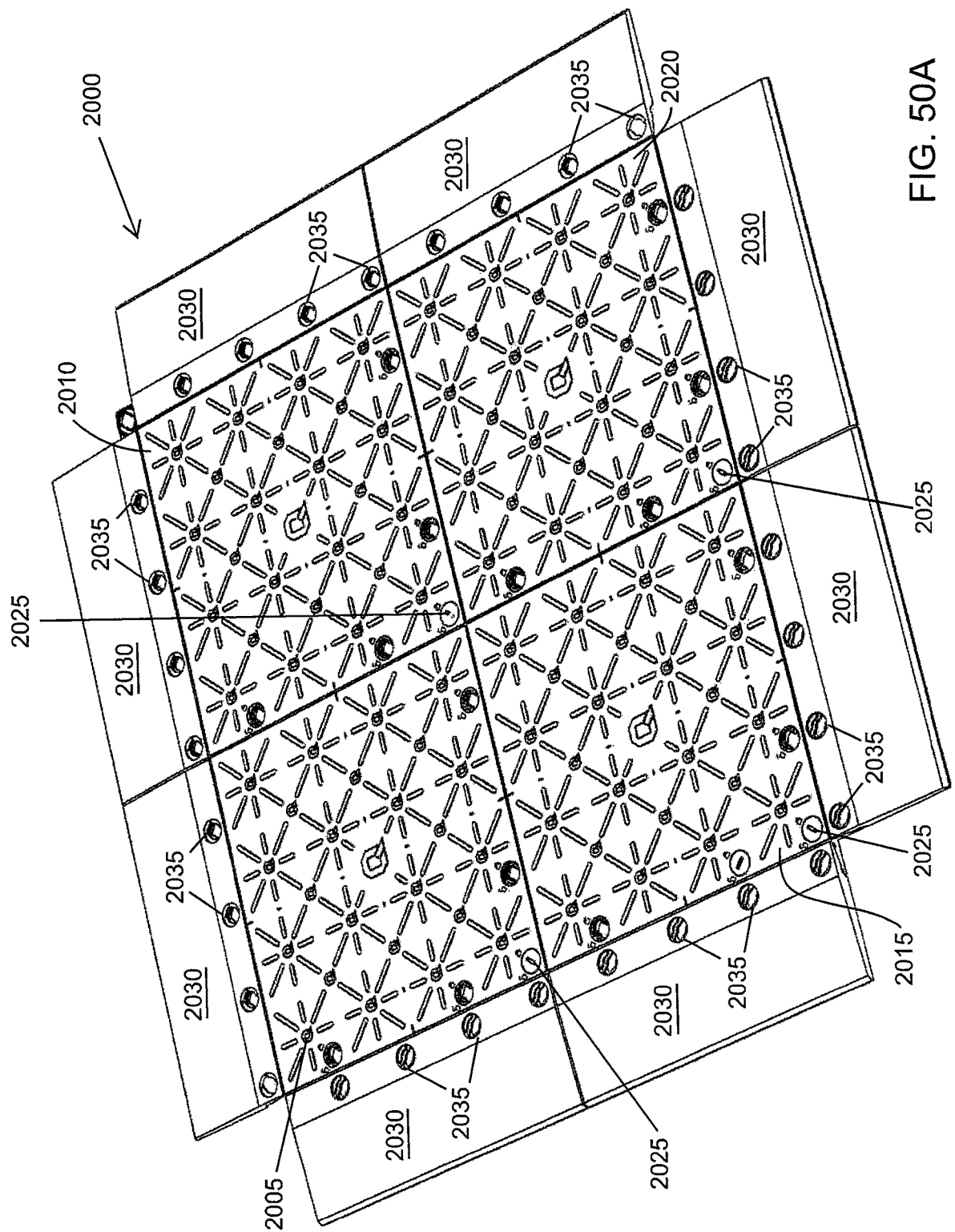
FIG. 50A is a perspective view of a four mat installation that includes side ramps and adapters for connecting the side ramps to the sides of the mats.
Figure 50B:
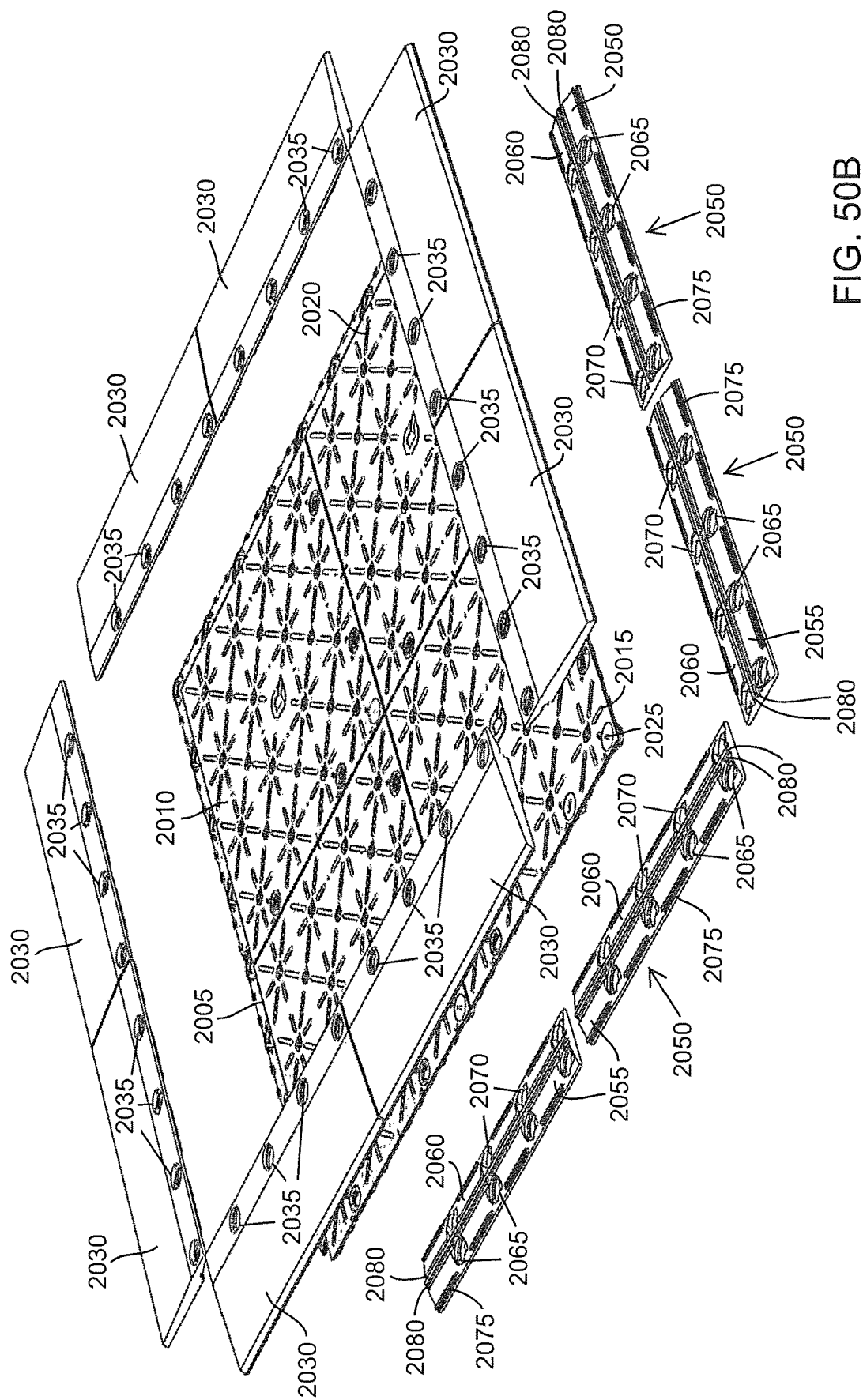
FIG. 50B is an exploded view of a four mat installation of FIG. 50A.

FIGS. 50A and 50B illustrate a temporary flooring installation 2000 made by joining four mats together wherein the mats are configured as shown in FIG. 44A. To prepare this installation, each of the mats 2005, 2010, 2015, 2020 are placed adjacent each other with the upper structures of mats 2005 and 2010 on the bottom sides contacting the lower structures of the top sides of adjacent mats 2015 and 2020 respectively. Also, the upper structures of mats 2010 and 2020 on the left sides contact the lower structures of the right sides of adjacent mats 2005 and 2015 respectively, with locking cams 2025 located in the lower left corners to connect to the mats below.

Each of the four mats includes a side ramp 2030, with eight side ramps being shown so that the upper surface of the temporary flooring made by the four connected mats can be accessed from any side of the structure. These side ramps 2030 provide a slope of 1/12 to meet American Disability Act requirements, with the length of the ramp determined based on that slope and mat thickness. These side ramps allow and temporary floor structure to be provided with access for wheelchairs or other wheeled devices, such as hand trucks, golf carts, and the like. For mats that have stronger compressive force properties, a forklift or crane can more easily enter onto the mat via the side ramps. Also, the side ramps include a back end 2040 that is configured in the same way as the upper structures of the mats.

To connect the side ramps to the mats, two different options are possible. The lower structures of the top sides of mats 2005 and 2010 receive the sloped upper structures of the back ends 2040 of the side ramps. The same arrangement is possible for the lower structures of the right sides of adjacent mats 2010 and 2020 to respectively connect those to the sloped back ends 2040 of additional side ramps 2030. The back ends 2040 include a number of openings 2045 that are configured in the same manner as openings 1810 and 1830 of the mats. This allows the pin or locking cam 2025 to join the ramps to those sides of the mats. Thus, ramps are joined to four sides of the mats of the floor structure in this manner, namely, the top sides of mats 2005 and 2010 and the right sides of mats 2010 and 2020.

Figure 51:
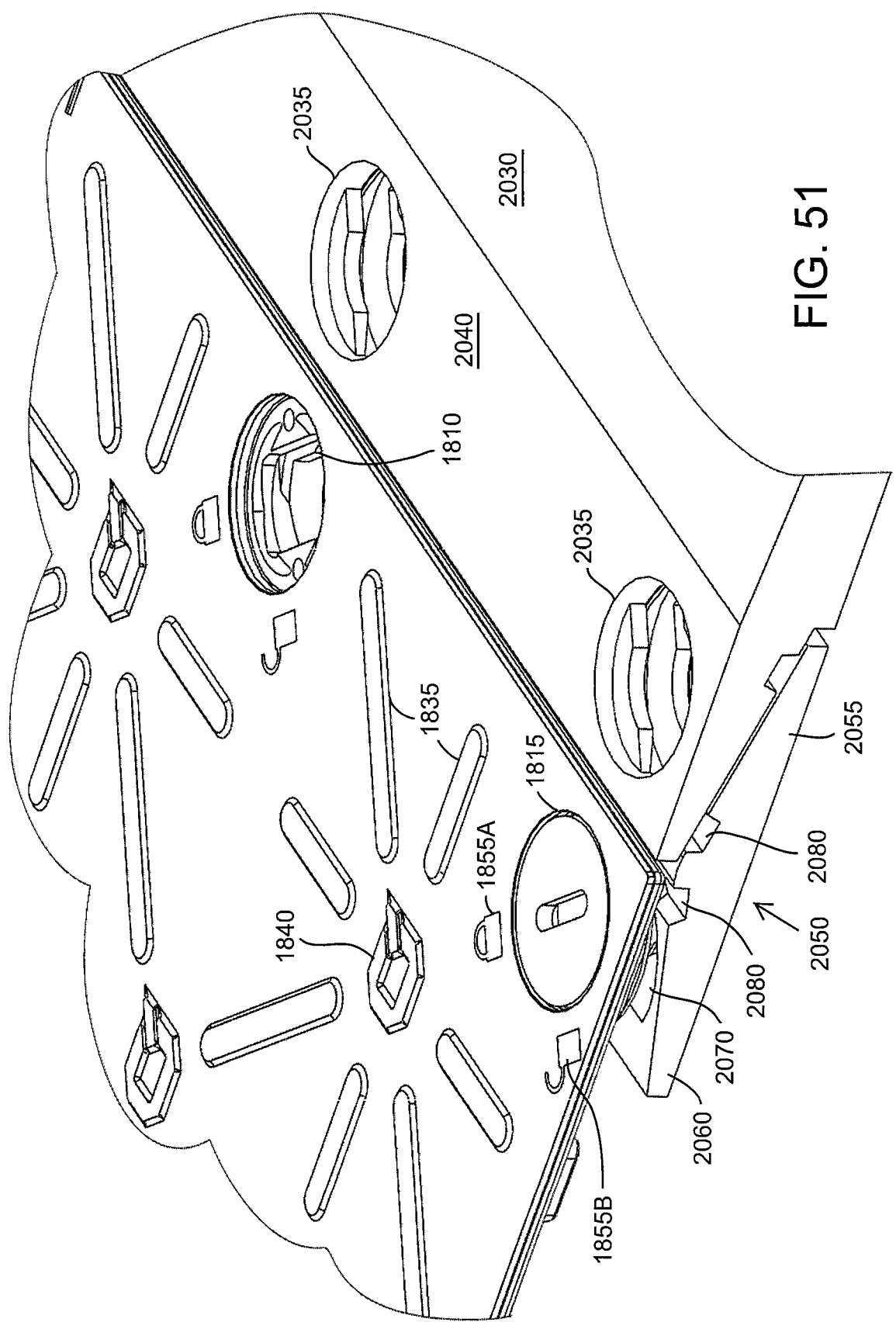
FIG. 51 is a detailed side view of a portion of one mat, adapter and side ramp from the installation shown in FIGS. 50A and 50B.

The other four sides of the floor structure, namely, the left sides of mats 2005 and 2020 and the bottom sides of mats 2015 and 2020 have upper structures which are configured essentially in the same manner as the left side portion 2060 of the side ramps 2030. Therefore, in order to join these mat structures and ramps together, adapters 2050 as shown in FIGS. 50, 51 and 52 are provided.

The adapters 2050 include right and left side portions 2055, 2060 which are configured in the same manner as the lower structures of the mats. These include tab members 2065, 2070 and slots 2080 to receive the corresponding items of the lower side of the upper structures of the mats. Accordingly, the adapters are placed with one side portion 2060 under the mat where it receives the upper structure of the mat and with the other side portion 2065 receiving the lower side of the back end 1040 of the side ramp 2030. Also, the adapter has openings 2065, 2070 which are configured in the same manner as openings 1810, 1830 of the mats. This allows the pin or locking cam 2025 to join the mats and side ramps to the respective side portions 2055, 2060 of the adapter 2050. Thus, ramps are joined to four sides of the mats of the floor structure through the adapter 2050 in this manner, namely, the bottom sides of mats 2015 and 2020 and the left sides of mats 2005 and 2015.

The use of the adapters allows different rows of mats to be installed in different directions. Instead of overlapping an upper structure of one mat over a lower structure of an adjacent mat, the adapter 2050 allows the upper structures of two adjacent mats to be connected together through the adapter 2050. This is helpful in large installations such as on a football field wherein one row of mats can be installed on one side of the 50 yard line moving towards the goal line on that side of the field while another row of mats can be placed on the other side of the 50 yard line and installed towards the other goal line. The adapter for this example would be located on the 50 yard line. The adapter is typically not necessary for smaller installations of 4 to 20 mats or even more, but the adapter provides greater flexibility for larger or more complex installations where continuing a single expansion of adjacent mats is more difficult.

The adapters are also helpful in providing support at the ends of the mat for the upper structures. This prevents the upper surface of the mats above the upper structures from having any weak areas on the sides that have upper structures that are not connected above the lower structure of an adjacent mat. The adapter can be used as shown to leave a shorter ramp-type structure or as noted a side ramp can be attached thereto. If the upper surface of the mat is to be supported without extending beyond the end of the mat, a "half adapter" can be used, this being one side of a standard adapter that has been cut in half along a longitudinal center line.

These arrangements protect the upper structures of the mats from damage. They also make a nice, smooth transition for the ramps to the ground for foot or rolling traffic. They make all sides of the mat look similar functionally and aesthetically, as the adapter allows the addition of a side ramp on the sides of the mat that have the upper structures. And as noted, the use of an adapter along the center line of an installation allows bi- or multi-directional installations of a temporary flooring system that connects the mats together so that the installation can proceed in all directions without having to tuck the end of one mat beneath the end of an adjacent mat.

As shown in FIGS. 50A and 50B, each adapter is placed along one side of the mat with ½ of the adapter beneath the mat overhang whereas the ramp extension is provided on the other half of the adapter. When a second adapter is provided on an adjacent side of the mat, there would be an overlap of the adapters at the corner of the mat beneath the corner opening. In this situation, the opening of one of the adapters in the corner can be simply removed by cutting. Alternatively a shorter adapter which does not have structure or a connector opening beneath the corner opening of the mat can instead be used. For each mat, only one of these shorter adapters is needed as the adapter on the adjacent side of the mat can include an opening beneath the corner opening to lock the ramp to the mat. And if a shorter length adapter is not available, the end of a standard adapter can be cut off so that it does not extend beneath the corner opening of the mat.

It is also possible to configure longer length adapters such as an adapter that would have the length of equal to two adjacent mats to facilitate installation. Additionally, an L shaped adapter that has either a single length of the mat or at length of two mats on each leg of the L can be used in certain situations. Generally, however, it is easier to simply have single adapter elements to reduce the number of different links and configurations when transporting such materials to the job site. Also, there are only a maximum of four corners on any particular installation where the adapters would overlap and as noted an adapter with a shorter length that does not extend to and beneath the corner opening would be a more efficient arrangement.

Similarly, it is also possible to configure the side ramps to be of a double length, i.e., the length of two adjacent mats, as that can speed up the installation. As there could be some alignment problems on uneven ground, however, the single length ramps (i.e., that are the same length as the side of the mat) are preferred.

For manufacture or the adapters and side ramps, these can be extruded from the desired plastic or elastomeric material to the appropriate shape and thereafter the openings can be machined or cut into the adapter or ramp.

And while the illustration of the temporary flooring system of FIG. 50A illustrates four connected mats forming a continuous upper surface, a skilled artisan would realize that essentially any number of mats can be combined to provide the desired flooring system. Furthermore, the mats can also be joined to form a temporary flooring installation that is discontinuous, i.e., one that leaves certain openings between joined mats. This allows the mats to be placed around trees, light towers or other obstacles that exist in the area that is to be provided with a temporary flooring of joined mats. The use of the adapters on the sides of the mats that have upper structures adjacent the openings allows those portions of the mats to be more robustly supported. For this, a half adapter can also be used if the flooring system is to terminate exactly at the end of the mat.

And while FIGS. 50 to 52 illustrate the ramps and adapters for use with the mats of FIGS. 44A and 44B, it is also within the scope of the invention to design the ramps and adapters for use with the mats of FIGS. 1 to 4. For those, the connecting side of the ramps would be configured with tabular elements or recesses that correspond to and are matable with the sides of those mats while the other side of the ramp includes the sloped ramp surface. Similarly, each longitudinal half of the adapter would be configured with tabular elements or recesses that correspond to and are matable with the sides of those mats.

The mats themselves can be modified to fit any particular installation. For example, for installing a temporary floor indoors in a gymnasium or on basketball court, there may be situations where the final mats are too wide to fit within the structure. For this, the mats can be cut in half, thirds, quarters, etc. so that the appropriate dimensions are achieved. This can be done prior to shipping the mats to the jobsite or it can be done on-site as the plastic mats can generally be cut easily with a hand or electric saw.

Also, the temporary floor installer would generally know how many mats are needed for a particular installation, as well as the width and length of the area to be protected by the temporary flooring, along with what types of openings may be needed to go around trees, poles, towers, etc. Thus, the installer can provide a kit with the requisite number and sizes of mats, adapters, half adapters, short adapters and side ramps and appropriate locking elements or cams so that the installer or purchaser would obtain everything needed for the installation. Generally, at least 3 cams are provided per mat to join the two upper structures to lower structures of an adjacent mat or to an adapter. One cam would be located in the corner opening of the mat, and one each would be located on the two adjacent sides. The lower structures on the other two sides of the mat are connected from the upper mat structure or side ramp that is placed above it, generally with two cams. Of course, more locking elements could be used depending upon the expected use of the temporary flooring system or to at least have a few spare locking elements in case some are damaged during installation. The kit could also include installation instructions showing how to start the laying and connecting of the mats.

The plastic and elastomeric materials disclosed herein generally have sufficient strength for many applications, but their strength and rigidity can be enhanced by reinforcing the material with appropriate fillers or other materials, such a glass fibers, other particular matter as is generally known in the art. The additional placement of a metal wire, bar, rod or plate into the mold that is used to prepare the sections or in between the sections before they are sealed together can provide further strengthening of the panel mats. Typical metals for such use would be steel, stainless steel or aluminum.

In some embodiments, the panel mats can be made translucent. When these panel mats are to be used outdoors and the mat materials are not sufficiently resistant to withstand long term exposure to sunlight, appropriate additives to improve the UV resistance of the material can be included.

The panel mats can be provided in different sizes, but generally, square mats or rectangular mats having longitudinal sides that are twice as long as the mat width are preferred. The thickness of the mat can vary depending upon the intended use of the mat. As noted herein, the thickness also determines the size of the side ramp angled portion. Also, the thickness is determined based on the thickness of each of the first, second and third sections. These can be varied as desired for the intended application, with thicker first and third sections and perpendicular cell walls in the second section being used for heavier load bearing installations.

The panel mats can be made with different materials and reinforcements for different applications. As the outer surfaces of the mats may be very similar in appearance, it is not readily observable as to which panel mat has a particular construction. For this reason, another aspect of the invention relates to the providing of each mat with identification means that indicates the material, reinforcement and construction of the panel mat. Thus, when a number of different panel mats are maintained in an inventory, the identification means enables operators to readily determine which mats have the particular materials and properties needed for a particular end use, so that the correct mats can be selected and provided to a jobsite for use by the customer. This would be necessary whether the mats are being purchased by the customer or whether the mats are being leased for use.

There are a number of ways to identify the different materials and properties of a mat depending upon the specific type of identification means that are applied to the mat. The preferred types of identification means include an external color code, a radio frequency identification (RFID) tag, or an alphanumeric indicator applied to an outer surface of the mat or that is provided upon a plate that is applied to an outer surface of the mat. The simplest identification means to use is an external color code that is placed upon the mat, preferably in an area that does not receive much abrasion or wear. Different colors or strips or color combinations can be used to identify different materials. And it is highly useful to apply the color code to the same relative positions on each mat for easy identification. For example, placing the external color code along a longitudinal side of each mat allows the color coding to be visible when the mats are stacked upon each other. This simple visual confirmation can be used to make sure that the proper mats are selected: even when the mats are just stacked in the work yard, one can see which ones have the correct color code for the desired core construction.

Another use of color can be to identify certain panel mats that are to be used only by a particular customer. This would assist in making sure that the mats are properly collected and delivered. This color can be an additional color beyond that which is used to identify the mat core, or the mats can have a single unique color or color pattern (e.g., stripes, dots etc.) that identifies both the customer and the mat core. And further, the color can be provided in a particular location or area to confirm who the customer is to assist in quality control regarding the correct shipping and delivery of the mats.

A simpler type of identification means is one that comprises an external alphanumeric indicator that is applied to an outer surface of the mat or that is provided upon a plate that is applied to an outer surface of the mat. These can be carved, burnished or stamped into or onto the mat again is a location that is not expected to experience severe abrasion or wear. This can also be used to identify a particular customer.

For installations over a grass field or yard, the mat can be made to be transparent or translucent so that sunlight is able to pass through the mat to help condition the grass. Additionally, no third section is generally provided for such applications as to open bottoms of the cells provide a smaller "footprint" on the grass to minimize compression of the entire grass surface as would occur if a mat having a bottom plate or sheet would be used. These and the other panel mats disclosed herein are useful to provide temporary flooring for concerts, sporting events, commencement and graduation events, and the like that require a smaller footprint than a full football or baseball field.

And as noted herein, in addition to the mat identification means, each mat can further be provided with a surface color that indicates a potential use or non-use of the mat. This can assist in allowing personnel to properly operate on the mat and to promote safety. These colors can include, for example, red to indicate that portions of the mat need to be kept free of equipment, yellow for indicating that caution is needed, green to indicate portions of the mat that are designed to accommodate travel or movement by trucks or heavy equipment over the mat.

Of course other colors can be used in any of the foregoing embodiments according to a particular code or correspondence of each color to a specific use or prohibited use. These colors can be tailored to the mat user's particular requirements so that work operations upon or around the mats can be optimized for safety, efficiency and expediency. Coloring can also be used to define certain areas of the worksite or to help the mats blend into surrounding areas, so that the jobsite can look as clean and undisturbed as possible. For these reasons the use of conventional paints and other surface coatings enhance the usefulness of the mats for any particular application. These paints or coatings would need to be compatible to bond with the materials of the mat. If necessary, appropriate primers or other chemicals can be used to assure strong bonding of the paints or coatings to the mats.

And in another embodiment, the upper surface of the mat may be provided with a portion of a word or design, such as the name, nickname or abbreviation, mascot or emblem of a school or university. Typically, the desired word or design is incorporated into the material that forms the top section of the mat. This can be done in any one of a number of ways that are known to skilled artisans in the plastic or elastomeric molding field. Thus, after the mats are installed, the word or design can be visible on the temporary flooring. For example, installation on a football field can include the school name or emblem on the temporary flooring in the same location as it would be on the field, so that person observing the installation from the stands can view the name or emblem. This is particularly useful for graduations or other events requiring a large temporary flooring area for chair seating or marching processions wherein the temporary flooring protects the field.

Alternatively, for mats that are to be re-used, the portions of the words or designs on a particular mat that makes up the temporary flooring can be painted onto the mat, built into the plastic during molding of the mat, or provided as a wrapping or film that is applied onto the mat. When painted onto the mat surface, a clear protective layer can be provided above the painted surface to protect the design from abrasion due to movement of chairs or people over the mat.

Additionally, the words or designs can be logos or artwork applied on top of the mats. These can be provided as a film or sheet that is adhered to the mat surface. Preferably, for outdoor use, the film or sheet would also provide a non-skid surface and would be strong enough to bond and not peel off when exposed to various weather conditions.

Of course for any particular word, logo emblem of other design that is to be provided, a specific arrangement of the mats during installation is required. This can be achieved by numbering the mats so that they are installed in the right order and location so that the logo appears properly and correctly. And if the mats are to be used for different installations at different schools, only the mats that contain the emblem or logo need to be changed out and replaced with a different logo or emblem to customize the mat for use at the different school.

The preferred sizes of the panel mats of the invention generally range from 1'×1' to 12'×12' with rectangular and preferable square arrangements preferred. In certain instances, larger size mats of as large as 8 feet wide by 16 feet long may be provided for a specific end use. These larger size mats will need to be moved and installed by equipment rather than individual workers. For this, they would include lifting elements of the types disclosed herein. They also may require specific vehicles for shipping and transport of the panel mats to and from a job site. For this reason, the smaller sizes of the mats (from 2 by 2 feet to 4 by 4" square or 2 by 4 to 4 by 8 feet rectangular mats are preferred as being the most versatile for many manually installed applications. In addition to being sufficiently lightweight to be installed by personnel, they also are easy to ship via conventional vehicles such as trucks or tractor trailers.

Therefore, in sum, it is to be realized that the optimum dimensional relationships for the parts of the invention can include variations and tolerances in size, materials, shape, form, function and use are deemed readily apparent and obvious to the skilled artisan, and all equivalent relationships to those illustrated in the drawings and described in the specification are intended to be encompassed by the claims appended hereto.

Unless defined otherwise, all technical and scientific terms used herein have same meaning as commonly understood by one of ordinary skill in the art to which this invention belongs. Also, as used herein and in the appended claims, the singular form "a", "and", and "the" include plural referents unless the context clearly dictates otherwise. All technical and scientific terms used herein have the same meaning.

The foregoing detailed description is considered as illustrative only of the principles of the invention. Further, since numerous modifications and changes will readily be apparent to those having ordinary skill in the art, it is not desired to limit the invention to the exact constructions demonstrated. Accordingly, all suitable modifications and equivalents may be resorted to falling within the scope of the invention.

What is claimed is:

1. A lightweight universal panel mat made of plastic or elastomeric material and designed to be interlocked with additional panel mats of similar side configurations, comprising:
   a first section having an upper surface that forms a top surface of the panel mat and is relatively flat, textured or structured to facilitate movement over the upper surface;
   a second section having geometry that includes a plurality of cells that support the first section and open lower surfaces, wherein the cells have angled sidewalls and tops of the cells are open or at least some of the cells are closed by a flat top surface, wherein the angled sidewalls are angled with respect to the upper surface and the open lower surfaces and wherein the cells are upward facing protrusions;
   first, second, third and fourth sides wherein the first and second sides are configured and dimensioned to be complementary to and matable with the third and fourth sides, so that (a) a first or second side of a first mat can be interlocked with a third or fourth side of a second mat (b) a third side of the first mat can be interlocked with a first or second side of a third mat, and (c) a fourth side of the first mat can be interlocked with a first or second side of a fourth mat;
   wherein the upper surface of the first section is generally rectangular of length L and width W where L and W each may be any value between 1 foot and 12 feet;
   wherein the first and second sections are welded or bonded together to form a unitary panel mat,
   wherein each of the first and second sides of the first mat comprises more than one tabular extensions, and
   wherein the first section includes recesses, and the protrusions of the second section are adapted to be received by the recesses.

2. The panel mat of claim 1, wherein the first and second sections are part of an integral component that is molded together, or the protrusions, extensions, receiving structures, openings or recesses are milled or routered in a solid plastic or elastomeric component, with the mat optionally including metal wire, bar or plate reinforcement located in the second section of between or within the first and second sections.

3. The panel mat of claim 1, wherein the first section at the third and fourth sides of the panel mat is configured to include a lip portion that covers edges of the respective first and second sides of adjacently connected similarly configured panel mats and provides channels that assist in allowing drainage of water from the top surface of the panel mat through the panel mat.

4. The panel mat of claim 1, further comprising a third section located below and welded, molded, bonded, joined or sealed together to the second section, the third section configured and dimensioned to form a bottom surface for the panel mat that is relatively flat, textured or structured with the panel mat being able to withstand point loads of between 300 and 500 psi and spread loadings of 40,000 to 50,000 pounds per square foot.

5. The panel mat of claim 1, which is either rectangular wherein W=2L or square wherein W=L, and wherein L is preferably 2.5, 3, 3.5, 4, 4.5, 5, 6, 7, or 8 feet and W is preferably 2.5, 3, 3.5, 4, 4.5, 5, 6, 7, 8, 9, 10, 12, 14 or 16.

6. The panel mat of claim 1, further comprising one, two, three or four lifting elements that are affixed to the mat to allow lifting and installation or reclamation of the mat, with the lifting element including (a) a ring or U or D shaped member that is movable between first and second positions, wherein the first position is one where the member is received in a ring or U or D shaped recess and resides below the surface of the mat and the second position is an operative position where the ring or U or D shaped member is exposed for engagement with lifting equipment, and (b) a structure that secures the ring or U or D shaped member to the mat.

7. A temporary support surface, deck, walkway or roadway comprising a plurality of connected panel mats according to claim 1, wherein the mats are configured to be joined together in an aligned manner or in a manner that provides a staggered configuration that avoids generating a long straight seam between rows of joined mats.

8. The temporary support surface, deck, walkway or roadway of claim 7, wherein each upper and lower structure of the mats further includes spaced openings with the openings of the upper and lower structures configured to be in alignment when overlapping the respective lower and upper structures of adjacent mats; and wherein the openings are configured to interlock or to receive a fastening device therein to assist in more securely holding overlapped mats together, and wherein in each upper and lower structure one opening is located in a corner of the mat between the adjacent first and second sides and another opening is located in a corner of the adjacent third and fourth sides.

9. The temporary support surface, deck, walkway or roadway of claim 8, wherein the openings are configured to interlock or to receive a fastening device, and wherein five openings are provided on the upper structures and seven openings are provided on the lower structures to allow adjacent mats to be assembled by aligning at least some of the openings of the upper structure over the openings of the lower structure in full adjacent relation, or in a staggered configuration wherein adjacent mats are arranged in a ⅓, ½ or ⅔ extension overlap depending upon which two openings on the lower structure are overlaid with the corner opening and adjacent opening of the upper structure before receiving a fastening device therein in each overlaid pair of openings.

10. The temporary support surface, deck, walkway or roadway of claim 7, further comprising one or more side ramps that facilitate smooth access to the upper surface of a mat by wheelchairs or other wheeled articles; and a separate adapter for each ramp wherein each adapter is connected to both the mat and the side ramp, wherein the ramps have sloped bottom surfaces that align with the upwardly sloped upper surface of the lower structure and the adapter has an upper surface with two sloped portions, one that aligns with the downwardly sloped lower surface of the upper structure of the mats and the other that aligns with the sloped bottom surfaces of the ramps.

11. The panel mat of claim 1, wherein the open lower surfaces are in a form of holes that are molded into the second section.

12. The panel mat of claim 1, wherein the open lower surfaces form inner surfaces of the angled sidewalls or the flat top surface of the cells.

13. The panel mat of claim 1, wherein the cells are non-intersecting.

14. The panel mat of claim 4, wherein the top surface of the first section, the bottom surface of the third section, or both surfaces include a structured surface that includes a raised pattern of spaced elements in a pattern, or channels that assist in allowing drainage of water from that surface of the mat, with the channels molded therein or formed between a plurality of raised islands, elongated bumps or protrusions, raised indicia, other surface features, or combinations thereof.

15. The panel of claim 1 wherein the cells are adapted to have geometric shape.

16. The panel of claim 1 wherein the top of the cells of the second section is configured to support the bottom surface of the first section.

* * * * *